(12) United States Patent
Dantus et al.

(10) Patent No.: US 8,311,069 B2
(45) Date of Patent: Nov. 13, 2012

(54) DIRECT ULTRASHORT LASER SYSTEM

(75) Inventors: Marcos Dantus, Okemos, MI (US);
Vadim V. Lozovoy, Holt, MI (US);
Bingwei Wu, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 257 days.

(21) Appl. No.: 12/809,481

(22) PCT Filed: Dec. 19, 2008

(86) PCT No.: PCT/US2008/087707
§ 371 (c)(1),
(2), (4) Date: Jun. 18, 2010

(87) PCT Pub. No.: WO2009/086122
PCT Pub. Date: Jul. 9, 2009

(65) Prior Publication Data
US 2012/0147911 A1    Jun. 14, 2012

Related U.S. Application Data

(60) Provisional application No. 61/015,976, filed on Dec. 21, 2007.

(51) Int. Cl.
*H01S 3/10* (2006.01)
(52) U.S. Cl. ......... 372/25; 372/21; 372/22; 372/29.023; 372/30
(58) Field of Classification Search .............. 372/21, 372/22, 25, 29.023
See application file for complete search history.

(56) References Cited

U.S. PATENT DOCUMENTS

| | | | |
|---|---|---|---|
| 3,214,563 A | 10/1965 | Ford |
| 3,611,182 A | 10/1971 | Treacy |
| 3,919,881 A | 11/1975 | Metherell |
| 3,988,704 A | 10/1976 | Rice et al. |
| 4,167,662 A | 9/1979 | Steen |
| 4,288,691 A | 9/1981 | Horton |
| 4,394,780 A | 7/1983 | Mooradian |
| 4,477,905 A | 10/1984 | Sweeney |
| 4,512,660 A | 4/1985 | Goldberg |

(Continued)

FOREIGN PATENT DOCUMENTS
EP     0605110 A2     7/1994
(Continued)

OTHER PUBLICATIONS

"BNS Liquid Crystal Solutions Spatial Light Modulators 1×12,288 Linear Series," brochure, Apr. 2006, Boulder Nonlinear Systems, Inc., pp. 1-4.

(Continued)

*Primary Examiner* — Dung Nguyen
(74) *Attorney, Agent, or Firm* — Harness, Dickey & Pierce, P.L.C.

(57) ABSTRACT

A direct ultrashort laser system is provided. In another aspect of the present invention, a method of measuring laser pulse phase distortions is performed without requiring an adaptive pulse shaper or interferometry. In yet another aspect of the present invention, a system, a method of operating, a control system, and a set of programmable computer software instructions perform Multiphoton Intrapulse Interference Phase Scan processes, calculations, characterization and/or correction without requiring an adaptive pulse shaper.

26 Claims, 16 Drawing Sheets

U.S. PATENT DOCUMENTS

| | | | |
|---|---|---|---|
| 4,621,006 A | 11/1986 | Terry et al. |
| 4,655,547 A | 4/1987 | Heritage et al. |
| 4,746,193 A | 5/1988 | Heritage et al. |
| 4,772,854 A | 9/1988 | Silberberg |
| 4,812,776 A | 3/1989 | Sasaki |
| 4,819,239 A | 4/1989 | Sharp et al. |
| 4,834,474 A | 5/1989 | George et al. |
| 4,853,065 A | 8/1989 | Terry et al. |
| 4,856,860 A | 8/1989 | Silberberg et al. |
| 4,866,699 A | 9/1989 | Brackett et al. |
| 4,913,934 A | 4/1990 | Sharp et al. |
| 4,928,316 A | 5/1990 | Heritage et al. |
| 4,999,840 A | 3/1991 | Negus |
| 5,021,282 A | 6/1991 | Terry et al. |
| 5,034,613 A | 7/1991 | Denk et al. |
| 5,048,029 A | 9/1991 | Skupsky et al. |
| 5,077,619 A | 12/1991 | Toms |
| 5,095,487 A | 3/1992 | Meyerhofer et al. |
| 5,130,994 A | 7/1992 | Madey et al. |
| 5,132,512 A | 7/1992 | Sanders et al. |
| 5,132,824 A | 7/1992 | Patel et al. |
| 5,154,963 A | 10/1992 | Terry |
| 5,166,818 A | 11/1992 | Chase et al. |
| 5,239,607 A | 8/1993 | da Silva et al. |
| 5,341,236 A | 8/1994 | Stappaerts |
| 5,359,410 A | 10/1994 | Diels et al. |
| 5,406,408 A | 4/1995 | Ellingson et al. |
| 5,414,540 A | 5/1995 | Patel et al. |
| 5,414,541 A | 5/1995 | Patel et al. |
| 5,463,200 A | 10/1995 | James et al. |
| 5,526,155 A | 6/1996 | Knox et al. |
| 5,526,171 A | 6/1996 | Warren |
| 5,530,544 A | 6/1996 | Trebino et al. |
| 5,541,947 A | 7/1996 | Mourou et al. |
| 5,585,913 A | 12/1996 | Hariharan et al. |
| 5,589,955 A | 12/1996 | Amako et al. |
| 5,615,673 A | 4/1997 | Berger et al. |
| 5,631,758 A | 5/1997 | Knox et al. |
| 5,637,966 A | 6/1997 | Umstadter et al. |
| 5,682,262 A | 10/1997 | Wefers et al. |
| 5,684,595 A | 11/1997 | Kato et al. |
| 5,689,361 A | 11/1997 | Damen et al. |
| 5,704,700 A | 1/1998 | Kappel et al. |
| 5,719,650 A | 2/1998 | Wefers et al. |
| 5,754,292 A | 5/1998 | Kane et al. |
| 5,759,767 A | 6/1998 | Lakowicz et al. |
| 5,774,213 A | 6/1998 | Trebino et al. |
| 5,793,091 A | 8/1998 | Devoe |
| 5,798,867 A | 8/1998 | Uchida et al. |
| 5,822,097 A | 10/1998 | Tournois |
| 5,828,459 A | 10/1998 | Silberberg |
| 5,832,013 A | 11/1998 | Yessik et al. |
| 5,883,309 A | 3/1999 | Vossiek et al. |
| 5,936,732 A | 8/1999 | Smirl et al. |
| 5,956,173 A | 9/1999 | Svelto et al. |
| 5,994,687 A | 11/1999 | Chanteloup et al. |
| 6,002,480 A | 12/1999 | Izatt et al. |
| 6,008,899 A | 12/1999 | Trebino et al. |
| 6,042,603 A | 3/2000 | Fisher et al. |
| 6,057,919 A | 5/2000 | Machida et al. |
| 6,058,132 A | 5/2000 | Iso et al. |
| 6,072,813 A | 6/2000 | Tournois |
| 6,080,148 A | 6/2000 | Damasco et al. |
| 6,081,543 A | 6/2000 | Liu et al. |
| 6,111,251 A | 8/2000 | Hillenkamp |
| 6,130,426 A | 10/2000 | Laukien et al. |
| 6,166,385 A | 12/2000 | Webb et al. |
| 6,184,490 B1 | 2/2001 | Schweizer |
| 6,191,386 B1 | 2/2001 | Albright et al. |
| 6,219,142 B1 | 4/2001 | Kane |
| 6,259,104 B1 | 7/2001 | Baer |
| 6,272,156 B1 | 8/2001 | Reed et al. |
| 6,288,782 B1 | 9/2001 | Worster et al. |
| 6,296,810 B1 | 10/2001 | Ulmer |
| 6,327,068 B1 | 12/2001 | Silberberg et al. |
| 6,337,606 B1 | 1/2002 | Brombaugh et al. |
| 6,344,653 B1 | 2/2002 | Webb et al. |
| 6,396,856 B1 | 5/2002 | Sucha et al. |
| 6,402,898 B1 | 6/2002 | Brumer et al. |
| 6,421,154 B1 | 7/2002 | Diels et al. |
| 6,479,822 B1 | 11/2002 | Nelson et al. |
| 6,480,656 B1 | 11/2002 | Islam et al. |
| 6,498,801 B1 | 12/2002 | Dudelzak et al. |
| 6,504,612 B2 | 1/2003 | Trebino |
| 6,515,257 B1 | 2/2003 | Jain et al. |
| 6,577,782 B1 | 6/2003 | Leaird et al. |
| 6,610,351 B2 | 8/2003 | Shchegolikhin et al. |
| 6,610,977 B2 | 8/2003 | Megerle |
| 6,621,613 B2 | 9/2003 | Silberberg et al. |
| 6,625,181 B1 | 9/2003 | Oshemkov et al. |
| 6,678,450 B1 | 1/2004 | Franson |
| 6,697,196 B2 | 2/2004 | Suzuki |
| 6,757,463 B2 | 6/2004 | Hutchinson et al. |
| 6,795,456 B2 | 9/2004 | Scaggs |
| 6,801,318 B2 | 10/2004 | Fu et al. |
| 6,801,551 B1 | 10/2004 | Delfyett et al. |
| 6,804,000 B2 | 10/2004 | Roorda et al. |
| 6,879,426 B1 | 4/2005 | Weiner |
| 6,885,325 B2 | 4/2005 | Omelyanchouk et al. |
| 6,915,040 B2 | 7/2005 | Willner et al. |
| 6,930,779 B2 | 8/2005 | McGrew |
| 6,963,591 B2 | 11/2005 | Tulloch et al. |
| 7,033,519 B2 | 4/2006 | Taylor et al. |
| 7,049,543 B2 | 5/2006 | Roos et al. |
| 7,096,125 B2 | 8/2006 | Padmanabhan et al. |
| 7,105,811 B2 | 9/2006 | Dantus et al. |
| 7,132,223 B2 | 11/2006 | Schroeder et al. |
| 7,169,709 B2 | 1/2007 | Koide |
| 7,170,030 B2 | 1/2007 | Haight et al. |
| 7,170,598 B2 | 1/2007 | Walla et al. |
| 7,256,885 B2 | 8/2007 | Silberberg et al. |
| 7,276,103 B2 | 10/2007 | Woste et al. |
| 7,289,203 B2 | 10/2007 | Frankel |
| 7,342,223 B2 | 3/2008 | Ohkubo et al. |
| 7,348,569 B2 | 3/2008 | Feurer et al. |
| 7,369,773 B2 | 5/2008 | Weiner |
| 7,403,282 B2 | 7/2008 | Silberberg et al. |
| 7,411,166 B2 | 8/2008 | Wolleschensky et al. |
| 7,439,497 B2 | 10/2008 | Dantus et al. |
| 7,450,618 B2 | 11/2008 | Dantus et al. |
| 7,474,467 B2 | 1/2009 | Trebino |
| 7,609,731 B2 | 10/2009 | Dantus et al. |
| 7,826,051 B2 | 11/2010 | Silberberg et al. |
| 2001/0015990 A1 | 8/2001 | Miyai |
| 2001/0017727 A1 | 8/2001 | Sucha et al. |
| 2002/0025490 A1 | 2/2002 | Shchegolikhin et al. |
| 2002/0086245 A1 | 7/2002 | Zait et al. |
| 2002/0097761 A1 | 7/2002 | Sucha et al. |
| 2003/0063884 A1 | 4/2003 | Smith et al. |
| 2003/0099264 A1 | 5/2003 | Dantus et al. |
| 2003/0123051 A1 | 7/2003 | McGrew |
| 2003/0194165 A1 | 10/2003 | Silberberg et al. |
| 2003/0210400 A1 | 11/2003 | Joffre et al. |
| 2004/0012837 A1 | 1/2004 | Kaplan et al. |
| 2004/0021243 A1 | 2/2004 | Shih et al. |
| 2004/0031906 A1 | 2/2004 | Glecker |
| 2004/0058058 A1 | 3/2004 | Shchegolikhin et al. |
| 2004/0089804 A1 | 5/2004 | Dantus et al. |
| 2004/0128081 A1 | 7/2004 | Rabitz et al. |
| 2004/0145735 A1 | 7/2004 | Silberberg et al. |
| 2004/0155184 A1 | 8/2004 | Stockman et al. |
| 2004/0233944 A1* | 11/2004 | Dantus et al. .................. 372/25 |
| 2004/0240037 A1 | 12/2004 | Harter |
| 2004/0263950 A1 | 12/2004 | Fermann et al. |
| 2005/0021243 A1 | 1/2005 | Dantus et al. |
| 2005/0036202 A1 | 2/2005 | Cohen et al. |
| 2005/0103759 A1 | 5/2005 | Li et al. |
| 2005/0155958 A1 | 7/2005 | Arai et al. |
| 2005/0161669 A1 | 7/2005 | Jovanovich et al. |
| 2005/0185188 A1 | 8/2005 | McGrew |
| 2005/0226287 A1 | 10/2005 | Shah et al. |
| 2005/0230365 A1 | 10/2005 | Lei et al. |
| 2005/0232313 A1 | 10/2005 | Fermann et al. |
| 2006/0000988 A1 | 1/2006 | Stuart et al. |
| 2006/0006964 A1 | 1/2006 | Huang et al. |
| 2006/0019171 A1 | 1/2006 | Hosono et al. |
| 2006/0028655 A1 | 2/2006 | Cordingley et al. |

| | | | |
|---|---|---|---|
| 2006/0032841 A1 | 2/2006 | Tan et al. | |
| 2006/0039419 A1 | 2/2006 | Deshi | |
| 2006/0051025 A1 | 3/2006 | Mizuuchi et al. | |
| 2006/0056468 A1 | 3/2006 | Dantus et al. | |
| 2006/0058683 A1 | 3/2006 | Chance | |
| 2006/0066848 A1 | 3/2006 | Frankel | |
| 2006/0071803 A1 | 4/2006 | Hamburger et al. | |
| 2006/0096426 A1 | 5/2006 | Park | |
| 2006/0096962 A1 | 5/2006 | Park | |
| 2006/0119743 A1 | 6/2006 | Lin | |
| 2006/0120412 A1 | 6/2006 | Liu | |
| 2006/0134004 A1 | 6/2006 | Gellermann et al. | |
| 2006/0169677 A1 | 8/2006 | Deshi | |
| 2006/0187974 A1 | 8/2006 | Dantus | |
| 2006/0207975 A1 | 9/2006 | Ehrmann et al. | |
| 2006/0207976 A1 | 9/2006 | Bovatsek et al. | |
| 2006/0243712 A1 | 11/2006 | Haight et al. | |
| 2006/0274403 A1 | 12/2006 | Kaplan et al. | |
| 2006/0285071 A1 | 12/2006 | Erickson et al. | |
| 2007/0034615 A1 | 2/2007 | Kleine | |
| 2007/0093970 A1 | 4/2007 | Padmanabhan et al. | |
| 2007/0103778 A1 | 5/2007 | Kaplan et al. | |
| 2008/0170218 A1 | 7/2008 | Dantus et al. | |
| 2008/0309931 A1 | 12/2008 | Silberberg et al. | |
| 2009/0122819 A1 | 5/2009 | Dantus et al. | |
| 2009/0188901 A1 | 7/2009 | Dantus | |
| 2009/0207869 A1 | 8/2009 | Dantus et al. | |
| 2009/0238222 A1 | 9/2009 | Dantus et al. | |
| 2009/0256071 A1 | 10/2009 | Dantus et al. | |
| 2009/0257464 A1* | 10/2009 | Dantus et al. | 372/25 |
| 2009/0296744 A1 | 12/2009 | Dantus et al. | |

FOREIGN PATENT DOCUMENTS

| | | |
|---|---|---|
| EP | 1742311 A1 | 1/2007 |
| JP | 2003155256 A | 5/2003 |
| WO | WO-9957318 A2 | 11/1999 |
| WO | WO-0070647 A1 | 11/2000 |
| WO | WO-0154323 A2 | 7/2001 |
| WO | WO-02061799 A2 | 8/2002 |
| WO | WO-2004023413 A2 | 3/2004 |
| WO | WO-2005088783 A1 | 9/2005 |
| WO | WO-2005111677 A2 | 11/2005 |
| WO | WO-2006079083 A2 | 7/2006 |
| WO | WO-2006138442 A2 | 12/2006 |
| WO | WO-2007001308 A2 | 1/2007 |
| WO | WO-2007145702 A2 | 12/2007 |
| WO | WO-2009092901 A1 | 7/2009 |

OTHER PUBLICATIONS

"Direct Drive" Piezoelectric Actuators NA-25, NA-80, brochure, dsm Mission Critical Motion Control™, (believed to have been published prior to Jun. 18, 2010).

"Femtosource Scientific," brochure, FEMTOLASERS Productions GmbH (believed to be published prior to Jan. 15, 2009) 2 pages.

"Shape Your Pulses. Control Your Experiment." advertisement, Laser Focus World, (Dec. 1997) p. 26, CRI, Inc.

A. Apolonski et al.; "Controlling the Phase Evolution of Few-Cycle Light Pulses"; Physical Review Letters, vol. 85, No. 4; Jul. 24, 2000; pp. 740-743.

A. Assion et al.; "Coherent control by a single phase shaped femtosecond laser pulse"; Chemical Physics Letters 259; Sep. 13, 1996; pp. 488-494.

A. Baltuska et al.; "Attosecond control of electronic processes by intense light fields"; Nature magazine, vol. 421; Feb. 6, 2003; pp. 611-615.

A. Efimov et al.; "Minimization of dispersion in an ultrafast chirped pulse amplifier using adaptive learning"; Appl. Phys. B 70 (Supply; 2000; pp. S133-S141.

A. Glass et al.; "Control of the photodissociation of CsCl"; Applied Physics B 71; 2000; pp. 267-276.

A. Pe're et al.; Optical Code-Division Multiple Access Using Broad-Band Parametrically Generated Light; J. of Lightwave Tech.; vol. 22, No. 6; Jun. 2004; pp. 1463-1471.

A. Poppe et al; "Few-cycle optical waveform synthesis"; Applied Physics B 72; 2001; pp. 373-376.

A. Powe et al.; "Molecular Fluorescence, Phosphorescence, and Chemiluminescence Spectrometry"; Anal. Chem., vol. 76, No. 15; Aug. 15, 2004; pp. 4614-4634.

A. Prakelt et al.; "Phase control of two-photon transition with shaped femtosecond laser-pulse sequences"; Physical Review A 70; 2004; pp. 063407-1-06407-10.

A.J. Wurzer et al.; "Highly localized vibronic wavepackets in large reactive molecules"; Applied Phys. B 71, 2000; pp. 405-409.

A.M. Weiner et al.; "Femtosecond Pulse Sequences Used for Optical Manipulation of Molecular Motion"; Reports; Mar. 16, 1990; pp. 1317-1319.

A.N. Naumov et al.; "Frequency-time and time-space mappings for single-shot coherent four-wave mixing with chirped pulses and broad beams"; Journal of Raman Spectroscopy, 2001; pp. 960-970.

A.V. Sokolov; "Subfemtosecond compression of periodic laser pulses"; Optics Letters, vol. 24, No. 17, Sep. 1, 1999; pp. 1248-1250.

Akozbek, N. et al.; "Continuum Generation of the Third-Harmonic Pulse Generated by an Intense Femtosecond IR Laser Pulse in Air;" Applied Physics B (Lasers and Optics), Springer-Verlag, Germany, vol. B77, No. 2-3, XP002476096; Sep. 2003, pp. 177-183.

Alexeev, I. et al., "Ultraviolet Light Generation by Intense Laser Filaments Propagating in Air," Conference on Lasers & Electro-Optics (CLEO), Baltimore, Maryland, USA, XP010876479; May 22-27, 2005, pp. 189-191.

Alfred Kwok et al.; "Frequency-Resolved Optical Gating Using Cascaded Second-Order Nonlinearities"; Journal of Selected Topics in Quantum Electronics, vol. 4, No. 2; Mar./Apr. 1998; pp. 271-277.

Allen J. Bard et al.; "Holy Grails in Chemistry"; American Chemical Society, vol. 28, No. 3; Mar. 1995.

Allison Albrecht Ferro et al.; "Complete femtosecond linear free induction decay, Fourier algorithm for dispersion relations and accuracy of the rotating wave approximation"; Journal of Chemical Physics, vol. 114, No. 10; Mar. 8, 2001; pp. 4649-4656.

Allison W. Albrecht et al.; "Experimental distinction between phase shifts and time delays: Implications for femtosecond spectroscopy and coherent control of chemical reactions"; Journal of Chemical Physics, vol. 111, No. 24; Dec. 22, 1999; pp. 10934-10955.

Alois Renn et al.; "Multidimensional Holography by Persistent Spectral Hole Burning"; The Journal of Physical Chemistry A, vol. 106, No. 13; Apr. 4, 2002; pp. 3045-3060.

Amichay Vardi et al.; "Laser catalysis with pulses"; Physical Review A, vol. 58, No. 2; Aug. 1998; pp. 1352-1360.

Anderson, M.E. et al.; "The effects of noise on ultrashort-optical-pulse measurement using SPIDER"; Appl. Phys. B 70 (Suppl); 2000; pp. S85-S93.

Andrius Baltuska et al.; "Second-Harmonic Generation Frequency-Resolved Optical Gating in the Single-Cycle Regime"; IEEE Journal of Quantum Electronics, vol. 35, No. 4, Apr. 1999; pp. 459-478.

Anthony P. Peirce et al.; "Optimal control of quantum-mechanical systems: Existence, numerical approximation and applications"; Physical Review A, vol. 37, No. 12; Jun. 15, 1988; pp. 4950-4964.

Arthur L. Smirl et al.; "Heavy-Hole and Light-Hole Quantum Beats in the Polarization State of Coherent Emission from Quantum Wells"; IEEE Journal of Quantum Electronics, vol. 35, No. 4; Apr. 1999; pp. 523-531.

Assion, A. et al; "Control of Chemical Reactions by Feedback-Optimized Phase-Shaped Femtosecond Laser Pulses"; Science Magazine, vol. 282; Oct. 30, 1998; pp. 919-922.

Atabek, O. et al., Intense Laser Control of the Chemical Bond, Theochem Elsevier Netherlands, vol. 493, Dec. 15, 1999, pp. 89-101.

Atsushi Yabushita et al.; "SHG FROG and XFROG methods for phase/intensity characterization of pulses propagated through an absorptive optical medium"; Optics Communications; Oct. 15, 2001; pp. 227-232.

Aviv Circular Dichroism Spectrometer, Model 400, Aviv Biomedical, Inc., http://www.avivbiomedical.com, Nov. 29, 2006; 2 pages.

B. Broers et al.; "Efficient Population Transfer in a Three-Level Ladder System by Frequency-Swept Ultrashort Laser Pulses"; Physical Review Letters, vol. 69, No. 14; Oct. 5, 1992; pp. 2062-2065.

B. Chatel et al.; "Role of quadratic and cubic spectral phases in ladder climbing with ultrashort pulses"; Physical Review A 70; 2004; pp. 053414-1-053414-10.

B. Dayan et al.; "Coherent control with broadband squeezed vacuum"; arXiv:quant-ph/0302038 v1; Feb. 5, 2003 (4 pages).

B. Dayan et al.; "Nonlinear Interactions with an Ultrahigh Flux of Broadband Entangled Photons"; Physical Review Letters, PRL 94; Feb. 4, 2005, 2004; pp. 043602-1-043602-4.

B. Dayan et al.; "Two Photon Absorption and Coherent Control with Broadband Down-Converted Light"; Physical Review Letters, vol. 93, No. 2; Jul. 9, 2004; pp. 023005-1-023005-4.

B. Natarajan et al.; "Abstract-Innovative pulse shaping for high-performance wireless TDMA"; IEEE Communications Letters; 5 (9): 372-374; Sep. 2001 (1 page).

B. Xu, Y. Coello, V.Lozovoy, D. Harris; M. Dantus, Pulse Shaping of Octave Spanning Femtosecond Laser Pulses, Optics Express, vol. 14, No. 22, Oct. 30, 2006, six pages.

B.D. Fainberg; "Diagram Technique for Nonlinear Optical Spectroscopy in the Fast Electronic Dephasing Limit"; Journal of the Chinese Chemical Society, 47; 2000; pp. 579-582.

B.J. Pearson et al.; "Coherent control using adaptive learning algorithms"; Physical Review A, vol. 63; 2001; pp. 063412-1-063412-12.

Baltuska, Andrius et al.; "Amplitude and phase characterization of 4.5-fs pulses by frequency-resolved optical gating"; Optics Letters, vol. 23, No. 18; Sep. 15, 1998; pp. 1474-1476.

Baltuska, Andrius et al.; "Visible Pulse Compression to 4 fs by Optical Parametric Amplification and Programmable Dispersion Control;" Optics Letters, vol. 27, No. 5, Mar. 1, 2002, pp. 306-308.

Barry, Liam P., et al., "A High-Speed Optical Star Network Using TDMA and All-Optical Demultiplexing Techniques", IEEE Journal on Selected Areas in Communications, vol. 14, No. 5, (Jun. 1996), pp. 1030-1038.

Baumert, T. et al. "Femtosecond pulse shaping by an evolutionary algorithm with feedback"; Appl. Phys. B 65; 1997; pp. 779-782.

Ben R. Torralva et al; "Mechanisms for laser control of chemical reactions"; Journal of Modern Optics, vol. 49, No. 3/4; 2002; pp. 593-625.

Bender, Daniel A., et al., "Modified spectrum autointerferometric correlation (MOSAIC) for single-shot pulse characterization," Optics Letters, vol. 32, No. 19 (Oct. 1, 2007) Optical Society of America, pp. 2822-2824.

Bern Kohler et al.; "Controlling the Future of Matter"; Acc. Chem. Res., vol. 28, No. 3; 1995; pp. 133-140.

Bern Kohler et al.; "Mode-Locking Matter with Light"; J. Phys. Chem 1993, 97; pp. 12602-12608.

Bern Kohler et al.; "Quantum Control of Wave Packet Evolution with Tailored Femtosecond Pulses"; Physical Review Letters, vol. 74, No. 17; Apr. 24, 1995; pp. 3360-3363.

Bhattacharya, N. et al.; "Implementation of Quantum Search Algorithm using Classical Fourier Optics"; Phys. Rev. Lett.; vol. 88. No. 13; Apr. 1, 2002; p. 137901-1-137901-4.

Bjarne Amstrup et al.; "Control of HOD photodissociation dynamics via bond-selective infrared multiphoton excitation and a femtosecond ultraviolet laser pulse"; J. Chem. Phys., vol. 97, No. 11; Dec. 1, 1992; pp. 8285-8295.

Bonacina, Luigi, et al., "Multiobjective genetic approach for optimal control of photoinduced processes," Physical Review A. 76, The American Physical Society, (2007) pp. 023408-1 through 023408-5.

Bowlan, Pamela, et al., "Directly measuring the spatio-temporal electric field of focusing ultrashort pulses," Optics Express, vol. 15, No. 16 (2007) pp. 10219-10230.

Brattke, S. et al.; "Generation of Photon Number States on Demand via Cavity Quantum Electrodynamics"; Phys. Rev. Lett.; vol. 86; Apr. 16, 2001; pp. 3534-3537.

Brixner T., et al., Quantum Control by Ultrafast Polarization Shaping, Phys Rev Lett, vol. 92, No. 20, May 21, 2004, pp. 208301-1.

Brixner, T. et al.; "Feedback-controlled femtosecond pulse shaping"; Appl. Phys. B 70 (Suppl); 2000; pp. S119-S124.

Brixner, T., et al., "Adaptive Shaping of Femtosecond Polarization Profiles," J. Opt. Soc. Am. B. vol. 20, No. 5, May 2003; pp. 878-881.

Brixner, T., et al., "Femtosecond Polarlization Pulse Shaping," Optics Letters, vol. 26, No. 8, Apr. 15, 2001; pp. 557-559.

Broers, B. et al.; "Diffraction and focusing of spectral energy in multiphoton processes"; Phys Rev. A 46; 1992; p. 2749-2756.

Broers, B. et al.; "Large interference effects of small chirp observed in two-photon absorbtion"; Opt. Commun. 91; 1992; p. 57-61.

Brown, E. J. et al.; "Femtosecond Transient-Grating Techniques: Population and Coherence Dynamics Involving Ground and Excited States;" J. Chem. Phys., vol. 110, No. 12, Mar. 22, 1999; pp. 5772-5788.

Brown, E. J. et al.; "Population and Coherence Control by Three-Pulse Four-Wave Mixing;" J. Chem. Phys., vol. 111, No. 9, Sep. 1, 1999; pp. 3779-3782.

Brown, E. J. et. al. "Ultrafast Rotational Anisotropy Measurements: Unidirectional Detection;" J. Phys. Chem. A, vol. 103, No. 16, 1999 pp. 2912-2916.

Brown, E. J. et. al. "Ultrafast Rotational Anisotropy Measurements; Strong-Field Nonlinear Saturation Effects;" J. Phys. Chem. A, vol. 105, No. 34, 2001; pp. 8004-8010.

Bucksbaum, Philip; "An atomic dimmer switch"; Nature; Nov. 19, 1998; vol. 396; pp. 217-219.

Buist, A.H. et al.; "Probing microscopic chemical environments with high-intensity chirped pulses"; Optics Letters 24; 1999; pp. 244-246.

Butcher, Steve, et al., "Multiphoton approach shapes ultrafast pulses," Pulse Shaping, (2006) Institute of Physics and IOP Publishing Ltd., 3 pages.

Butenko, A.V. et al.; "Factals: Giant Impurity Nonlinearities in Optics of Fractal Clusters;" Z. Phys. D., 10, 1988; pp. 81-92.

Bychkov S. S. et al., Laser Synthesis of Chiral Molecules in Isotropic Racemic Media, Journal of Experimental and Theoretical Physics, Nauka/Interperiodica, MO, vol. 93, No. 1, Jul. 1, 2001, pp. 24-32.

Béjot, Pierre, et al., "Laser noise compression by filamentation at 400 nm in argon," Optics Express, vol. 15, No. 20 (Oct. 2007) pp. 13295-13309.

C. Dorrer et al.; "Characterization of chirped-pulse amplification systems with spectral phase interferometry for direct electric-field reconstruction"; Applied Physics B 70 (Suppl.), 2000; pp. S77-S84.

C. Dorrer et al.; "Single-shot real-time characterization of chirped-pulse amplification systems by spectral phase interferometry for direct electric-field reconstruction"; Optics Letters, vol. 24, No. 22; Nov. 15, 1999; pp. 1644-1646.

C. Dorrer et al.; "Spatio-temporal characterization of the electric field of ultrashort optical pulses using two-dimensional shearing interferometry"; Applied Physics B74 (Suppl.), 2002; pp. S209-S217.

C. Dorrer; "Implementation of spectral phase interferometry for direct electric-field reconstruction with a simultaneously recorded reference interferogram"; Optics Letters, vol. 24, No. 21; Nov. 1, 1999; pp. 1532-1534.

C. Iaconis et al.; "Direct measurement of the two-point field correlation function"; Optics Letters, vol. 21, No. 21; Nov. 1, 1996; pp. 1783-1785.

C. Radzewicz et al.; "A poor man's FROG"; Optics Communications, Dec. 15, 2000; pp. 329-333.

C. Rangan et al.; "Optimally shaped terahertz pulses for phase retrieval in a Rydberg-atom data register"; Physical Review A, vol. 64; 2001; pp. 033417-1-033417-5.

C.P.J. Barty et al.; "Generation of 18-fs, multiiterawatt pulses by regenerative pulse shaping and chirped-pulse amplification"; Optics Letters, vol. 21, No. 9; May 1, 1996; pp. 668-670.

C.Y. Chien et al.; "Single-shot chirped-pulse spectral interferometry used to measure the femtosecond ionization dynamics of air"; Optics Letters, vol. 25, No. 8; Apr. 15, 2000; pp. 578-580.

Celine Nicole et al.; "Saturation of wave-packet interferences: Direct observation of spin precession in potassium atoms"; Physical Review A, vol. 60, No. 3; Sep. 1999; pp. R1755-R1758.

Ch. Warmuth et al.; "Molecular quantum dynamics in a thermal system: fractional wave packet revivals probed by random-phase fluorescence interferometry"; Journal of Chemical Physics, vol. 114, No. 22; Jun. 8, 2001; pp. 9901-9910.

Ch. Warmuth et al.; "Studying vibrational wavepacket dynamics by measuring fluorescence interference fluctuations"; Journal of Chemical Physics, vol. 112, No. 11; Mar. 15, 2000; pp. 5060-5069.

Chantal Daniel et al.; "Analysis and control of laser induced fragmentation processes in CpMn(CO)3"; Chemical Physics 267; 2001; pp. 247-260.

Chantal Daniel et al.; "Deciphering the Reaction Dynamics Underlying Optimal Control Laser Fields"; Science Magazine, vol. 299; Jan. 24, 2003; pp. 536-539.

Chen J. et al., Femtosecond Laser-Induced Dissociative Ionization and Coulomb Explosion of Ethanol, International Journal of Mass Spectrometry, Elsevier, Amsterdam, NL, vol. 241, No. 1, Feb. 15, 2005, pp. 25-29.

Chen, Bi-Chang, et al., "Characterization of a broadband pulse for phase controlled multiphoton microscopy by single beam SPIDER," Optics Letters, vol. 32, No. 16, Optical Society of America (Aug. 15, 2007) pp. 2411-2413.

Chilla, Juan L.A. et al.; "Direct determination of the amplitude and the phase of femtosecond light pulses"; Optics Letters; vol. 16, No. 1; Jan. 1, 1991; pp. 39-41.

Choi, K-S et al.; "Charge Density Wave Caused by Reducing $ThSe_3$ by One Electron. Superstructure and Short-Range Order in $ATh_2Se_6$ (A=K, Rb) Studied by X-Ray Diffraction, Electron Diffraction, and Diffuse Scattering;" J. Am. Chem. Soc., vol. 120, No. 41, 1998; pp. 10706-10714.

Chris Iaconis et al; "Self-Referencing Spectral Interferometry for Measuring Ultrashort Optical Pulses"; IEEE Journal of Quantum Electronics, vol. 35, No. 4; Apr. 1999; pp. 501-509.

Christophe Dorrer et al.; "Accuracy criterion for ultrashort pulse characterization techniques: application to spectral phase interferometry for direct electric field reconstruction"; Appl. Phys. B 74, vol. 19, No. 5, May 2002 ; pp. 1019-1029.

Christophe Dorrer et al.; "Phase Amplitude Coupling in Spectral Phase Modulation"; IEEE Journal of Selected Topics in Quantum Electronics, vol. 4, No. 2; Mar./Apr. 1998; pp. 342-345.

Christophe Dorrer et al.; "Spectral resolution and sampling issues in Fourier-transform spectral interferometry"; J. Opt. Soc. Am. B, vol. 17, No. 10; Oct. 2000; pp. 1795-1802.

Christophe Dorrer; "Influence of the calibration of the detector on spectral interferometry"; J. Opt. Soc. Am. B; vol. 16, No. 7; Jul. 1999; pp. 1160-1168.

Christopher J. Bardeen et al.; "Effect of Pulse Shape on the Efficiency of Multiphoton Processes: Implications for Biological Microscopy"; Journal of Biomedical Optics, vol. 4, No. 3; Jul. 1999; pp. 362-367.

Christopher J. Bardeen et al.; "Feedback quantum control of molecular electronic population transfer"; Chemical Physics Letters 280; 1997; pp. 151-158.

Christopher J. Bardeen et al.; "Quantum control of I2 in the gas phase and in condensed phase solid Kr matrix"; J. Chem. Phys., vol. 106, No. 20; May 22, 1997; pp. 8486-8503.

Christopher J. Bardeen et al.; "Quantum Control of NaI Photodissociation Reaction Product States by Ultrafast Tailored Light Pulses"; J. Phys. Chem. A, vol. 101, No. 20; 1997; pp. 3815-3822.

Christopher J. Bardeen et al.; "Quantum Control of Population Transfer in Green Fluorescent Protein by Using Chirped Femtosecond Pulses"; J. Am. Chem. Soc., vol. 120, No. 50; 1998; 13023-13027.

Christopher J. Bardeen et al.; "Using time-dependent rate equations to describe chirped pulse excitation in condensed phases"; Chemical Physics Letters 302; 1999; pp. 405-410.

Chu, K.C. et al.; "Direct measurement of the spectral phase of femtosecond pulses"; Optics Letters, vol. 20, No. 8; Apr. 15, 1995; pp. 904-906.

Chung, Jung-Ho, "Ambiguity of Ultrashort Pulse Shapes Retrieved From the Intensity Autocorrelation and the Power Spectrum," IEEE Journal on Selected topics in Quantum Electronics, vol. 7, No. 4 (Jul./Aug. 2001) pp. 656-666.

Clara et al.; "Femtoscond laser mass spectroscopy of ferrocenes: Photochemical stabilization by bridged cyclopentadienyl rings?"; International Journal of Mass Spectrometry, Elsevier Science Publishers, vol. 203, No. 1-3; Dec. 26, 2000; pp. 71-81.

Clement, Tracy Sharp et al.; "Single-Shot measurement of the amplitude and phase of ultrashort laser pulses in the violet"; Optics Letters, vol. 20, No. 1; Jan. 1, 1995; pp. 70-72.

Coello, Yves, "Interference without an interferometer: a different approach to measuring, compressing, and shaping ultrashort laser pulses," J. Opt. Soc. Am. B/vol. 25, No. 6 (Jun. 2008) pp. A140-A150.

Comstock et al.; "Multiphoton intrapulse interference 6; binary phase shaping"; Optics Express Opt. Soc.. America USA, vol. 12, No. 6, Mar. 22, 2004; pp. 1061-1066.

Comstock, M. et al.; "Femtosecond Photon Echo Measurements of Electronic Coherence Relaxation Between the $X(^1E_g+)$ and $B(^3II_{0u+})$ $states\ of\ I2$ in the Presence of He, Ar, $N_2$, $O_2$, $C_3H_8$;" J. Chem. Phys., vol. 119, No. 13, Oct. 1, 2003; pp. 6546-6553.

Comstock, M. et al.; "Rotational Wavepacket Revivals for Phase Modulation of Ultrafast Pulses;" Chemical Physics Letters, 372, 2003; pp. 739-744.

Comstock, M. et al.; "Ultrafast Laser Induced Molecular Alignment and Deformation: Experimental Evidence From Neutral Molecules and From Fragment Ions;" J. Phys. Chem. A, vol. 107, No. 40, 2003; pp. 8271-8281.

Comstock, M. et al.; "Ultrafast Transient-Grating Study of Molecules After High Intensity Excitation;" in Ultrafast Phenomena XII, 2000; 2 pages.

Cormack, I.G. et al.; "Practical measurement of femtosecond optical pulses using time-resolved optical gating"; Optics Communications 194; Jul. 15, 2001; pp. 415-424.

Craig W. Siders et al.; "Multipulse Interferometric Frequency-Resolved Optical Gating"; IEEE Journal of Quantum Electronics, vol. 35, No. 4, Apr. 1999; pp. 432-440.

Cumpston, B.H. et al.; "New Photopolymers based on Two-Photon Absorbing Chromophores and Application to Three-Dimensional Microfabricaton and Optical Storage"; Mat. Res. Soc. Symp. Proc; vol. 488; 1998; pp. 217-225.

Cumpston,B.H. et al.; "Two-photon polymerization initiators for three-dimensional optical data storage and microfabrication"; Letters to Nature; vol. 398; Mar. 4, 1999; pp. 51-54.

CVI Laser Corporation; "TNM-2 Negative Group Velocity Dispersion Mirrors"; www.cvilaser.com/ultra-fast; Jan. 13, 2002 (2 pages).

D. Abramavicius et al.; "Disentangling multidimensional femtosecond spectra of excitons by pulse shaping with coherent control"; J. of Chem. Phys., vol. 120, No. 18; May 8, 2004; pp. 8373-8378.

D. Lalovic et al.; "Quantum mechanics in terms of non-negative smoothed Wigner functions"; Physical Review A, vol. 46, No. 3; Aug. 1, 1992; pp. 1206-1212.

D. Oron et al.,; "All-optical processing in coherent nonlinear spectroscopy"; Physical Review A 70; 2004; pp. 023415-1-023415-4.

D. Oron et al.,; "Femtosecond Phase-and-Polaration Control for Background-Free Coherent Anti-Stokes Raman Spectroscopy"; Physical Review Letters, vol. 90, No. 91; May 30, 2003; pp. 213902-1-213902-4.

D. Yelin et al.; "Adaptive femtosecond pulse compression"; Optics Letters, vol. 22, No. 23, Dec. 1, 1997; pp. 1793-1795.

D. Zeidler et al.; "Amplification of tailored white-light continuum"; Applied Physics, B74 (Suppl), 2002; pp. S51-S56.

D. Zeidler et al.; "Evolutionary algorithms and their application to optimal control studies"; Physical Review A, vol. 64; 2001; pp. 023420-1-023420-13.

D.H. Schirrmeister et al; "Femtosecond pulse dependence of dissipation in molecular systems"; Chemical Physics Letters Dec. 4, 1998; pp. 383-390.

D.J. Maas et al.; "Population transfer via adiabatic passage in the rubidium quantum ladder system"; Physical Review A, vol. 59, No. 2; Feb. 1999; pp. 1374-1381.

D.J. Maas et al.; "Rotational interference in vibrational ladder climbing in NO by chirped infrared laser pulses"; Physical Review A, vol. 60, No. 2, Aug. 1999; pp. 1351-1362.

D.J. Maas et al.; Vibrational ladder climbing in NO by (sub)picosecond frequency-chirped infrared laser pulses; Chemical Physics Letters 290; 1998; pp. 75-80.

D.J. Maas et al.; "Vibrational ladder climbing in NO by ultrashort infrared laser pulses"; Chemical Physics Letters 270; May 16, 1997; pp. 45-49.

D.M. Villeneuve et al.; "Using frequency-domain manipulation of stretched femtosecond laser pulses to create fast rise and fall times on picosecond pulses"; Applied Physics B74 (Suppl), 2002; pp. S157-S161.

D.S. Chemla et al; "Ultrafast phase dynamics of coherent emission from excitons in GaAs quantum wells"; Physical Review B, vol. 50, No. 12, Sep. 15, 1995; pp. 8439-8453.

D.W. Schumacher et al.; "Phase Dependence of Intense Field Ionization"; Physical Review A, vol. 54, No. 5; Nov. 1996; pp. 4271-4278.

D.W. Schumacher et al.; "Phase Dependence of Intense Field Ionization: A Study Using Two Colors"; Physical Review Letters, vol. 73, No. 10; Sep. 5, 1994; pp. 1344-1347.

D.W. Schumacher et al.; "Programmable cesium Rydberg wave packets"; Physical Review A, vol. 52, No. 6; Dec. 1995; pp. 4719-4726.

Dai-Sik Kim et al.; "Femtosecond-pulse distortion in quantum wells"; Appl. Phys B 74, vol. 48. No. 24; Dec. 15, 1993; pp. 17902-17905.

Dan Oron et al.; "Narrow-Band Coherent Anti-Stokes Raman Signals from Broad-Band Pulses"; Physical Review Letters, vol. 88, No. 6; Feb. 11, 2002; pp. 063004-1-063004-4.

Daniel J. Kane et al.; "Convergence test for inversion of frequency-resolved optical gating spectrograms"; Optics Letters, vol. 25, No. 16, Aug. 15, 2000; pp. 1216-1218.

Daniel J. Kane et al.; "Simultaneous measurement of two ultrashort laser pulses from a single spectrogram in a single shot"; Optical Society of America; vol. 14, No. 4, Apr. 1997; pp. 935-943.

Daniel J. Kane; "Real-Time Measurement of Ultrashort Laser Pulse Using Principal Component Generalized Projection"; IEEE Journal of Selected Topics in Quantum Electronics; vol. 4, No. 2; Mar./Apr. 1998; pp. 278-284.

Dantus, Marcos et al., "Stereoisomer Recognition by MS with Shaped Laser Pulses," American Chemical Society. Abstracts of paper. At the national meeting, American Chemical Society, Washington, D.C., U.S. vol. 231 (Mar. 26, 2006) pp. 1-ANYL, XP009082814, ISSN: 0065-7727, the whole document.

Dantus, Marcos et al.; "Femtosecond Laser Observations of Molecular Vibration and Rotation;" Nature, vol. 343, Feb. 22, 1990; pp. 737-739.

Dantus, Marcos et al.; "Femtosecond Real-Time Probing of Reactions. II. The Dissociation Reaction of ICN;" J. Chem. Phys., vol. 89, No. 10, Nov. 15, 1988; pp. 6128-6140.

Dantus, Marcos et al.; "Femtosecond Real-Time Probing of Reactions. V. The reaction of IHgI;" J. Chem. Phys., vol. 91, No. 12, Dec. 15, 1989; pp. 7437-7450.

Dantus, Marcos et al.; "Real-Time Femtosecond Probing of "Transition States" in Chemical Reactions;" J. Chem. Phys., vol. 87, No. 4, Aug. 15, 1987; pp. 2395-2397.

Dantus, Marcos et al.; "Ultrafast Spectroscopy;" Encyclopedia of Applied Physics, vol. 22, 1998; pp. 431-456.

Dantus, Marcos, et al., "MIIPS characterizes and corrects femtosecond pulses," Ultrafast Optical Systems, Laser Focus World, (May 2007) XP001539450, 4 pages.

Dantus, Marcos. "Laser Control of Chemical Reactions." Chemical & Engineering News, vol. 79, 2001; p. 191.

Dantus, Marcos; "Ahmed Zewail, Nobel Laureate in Chemistry;" European Photochemistry Association (EPA) Newsletter, No. 69, Jul. 2000; 5 pages.

Dantus, Marcos; "Femtosecond Laser Pulses: Principles and Experiments;" (Book Review) J. Am. Chem. Soc., vol. 121, No. 37, 1999; pp. 8677-8678.

Dantus, Marcus; "Ultrafast Probing and Control of Molecular Dynamics: Beyond the Pump-Probe Method"; pp. 169-188. Kuhn & Weyh SRZ Sep. 4, 2001.

David C. Clary; "Quantum Theory of Chemical Reaction Dynamics"; Science, vol. 279, Mar. 20, 1998; p. 1879.

David J. Jones et al.; "Carrier-Envelope Phase Control of Femtosecond Mode-Locked Lasers and Direct Optical Frequency Synthesis"; SCIENCE magazine, vol. 288; Apr. 28, 2000; pp. 635-639.

David J. Tannor et al.; "Control of selectivity of chemical reaction via control of wave packet evolution"; J. Chem. Phys., vol. 83, No. 10; Nov. 15, 1985; pp. 5013-5018.

David M. Jonas et al.; "Femtosecond Wavepacket Spectroscopy: Influence of Temperature, Wavelength and Pulse Duration"; J. Phys. Chem.; 1995; pp. 2594-2608.

David N. Fittinghoff et al.; "Frequency-Resolved Optical Gating Measurement of Ultrashort Pulses Passing Through a High Numerical Aperture Objective"; IEEE Journal of Quantum Electronics, vol. 35, No. 4, Apr. 1999; pp. 479-486.

David N. Fittinghoff et al.; "Measurement of the intensity and phase of ultraweak, ultrashort laser pulses"; Optics Letters, vol. 21, No. 12; Jun. 15, 1996; pp. 884-886.

David N. Fittinghoff et al.; "Noise sensitivity in frequency-resolved optical-gating measurements of ultrashort pulses"; J. Opt. Soc. Am. B, vol. 12, No. 10, Oct. 1995; pp. 1955-1967.

Dela Cruz, J. et al., "Use of coherent control methods through scattering biological tissue to achieve functional imaging," PNAS, vol. 101, No. 49, Dec. 7, 2004, pp. 16996-17001.

Dela Cruz, J. M. et al.; "Coherent Control Improves Biomedical Imaging With Ultrashort Shaped Pulses;" Journal of Photochemistry and Photobiology A: Chemistry 180, Mar. 2006; pp. 307-313.

Dela Cruz, J.M. et al.; "Multiphoton Intrapulse Interference 3: Probing Microscopic Chemical Environments"; J. Phys. Chem. A 2004, 108; pp. 53-58.

Dela Cruz, Johanna M., et al., "Multidimensional analysis with shaped femtosecond pulses: identification of conformational and geometric isomers and mixtures using mass spectrometry," American Chemical Society. Abstracts of paper. At the national meeting, American Chemical Society, Washington, D.C., U.S., vol. 230, (Aug. 28, 2005) p. U418, XP009082815, ISSN: 0065-7727, the whole document.

Dela Cruz, Johanna M., et al., "Quantitative mass spectrometric identification of isomers applying coherent laser control," Journal of Physical Chemistry A ACS USA, vol. 109, No. 38 (Sep. 29, 2005) pp. 8447-8450, XP002431289, ISSN: 1089-5639, figure 1.

Delfyett, Peter J., et al., "High-Power Ultrafast Laser Diodes", IEEE Journal of Quantum Electronics, vol. 28, No. 10, (Oct. 1992), pp. 2203-2219.

Delong, K.W., et al., "Frequency Resolved Optical Gating with the Use of 2nd-Harmonic Generation." Journal of Optical Society of America B—Optical Physics, 1994. 11 (11): pp. 2206-2215.

Derryck T. Reid; "Algorithm for Complete and Rapid Retrieval of Ultrashort Pulse Amplitude and Phase from a Sonogram"; IEEE Journal of Quantum Electronics; vol. 35, No. 11, Nov. 1999; pp. 1584-1589.

Dietrich, P. et al.; "Determining the absolute carrier phase of a few-cycle laser pulse"; Optics Letters, vol. 25, No. 1, Jan. 1, 2000; pp. 16-18.

Ding. Y.; "Femtosecond pulse shaping by dynamic holograms in photorefractive multiple quantum wells"; Optics Letters; vol. 22, No. 10; May 15, 1997; pp. 718-720.

Dong Gun Lee et al.; "Coherent Control of High-Order Harmonics with Chirped Femtosecond Laser Pulses"; Physical Review Letters, vol. 87, No. 24, Dec. 10, 2001; pp. 243902-1-243902-4.

Donna Strickland et al.; "Compression of Amplified Chirped Optical Pulses"; Optics Communications; vol. 55, No. 6; Oct. 15, 1985; pp. 447-449.

Doron Meshulach et al.; "Coherent quantum control of two-photon transitions by a femtosecond laser pulse"; Nature magazine, vol. 396; Nov. 19, 1998; pp. 239-242.

Dorrer, C. et al.; "Direct space-time characterization of the electric fields of ultrashort optical pulses"; Optics Letters, vol. 27, No. 7; Apr. 1, 2002; pp. 548-550.

Dorrer, Christophe et al.; "Precision and consistency criteria in spectral phase interferometry for direct electric-field reconstruction"; J. Opt. Soc. Am. B, vol. 19, No. 5; May 2002; pp. 1030-1038.

Dreischuh, A., Experimental Demonstration of Pulse Shaping and Shortening by Spatial Filtering of an Induced-Phase-Modulated Probe Wave, IEEE Journal of Quantum Electronics, vol. 33, No. 3, (Mar. 1997), pp. 329-335.

Drexler W. et al.; "In vivo ultrahigh-resolution optical coherence tomography"; Optics Letters; vol. 24, No. 17; Sep. 1, 1999; pp. 1221-1223.

Dudley, John M. et al.; "Complete Characterization of Ultrashort Pulse Sources at 1550 nm"; IEEE Journal of Quantum Electronics, vol. 35, No. 4; Apr. 1999; pp. 441-450.

Dudovich, N. et al; "Transform-limited pulses are not optimal for resonant multiphoton transitions"; Phys. Rev. Lett. 86; 2001; pp. 47-50.

Dugan, M.A., et al., "High-resolution acousto-optic shaping of unamplified and amplified femtosecond laser pulses", J. Opt. Soc. Am. B, vol. 14, No. 9, (Sep. 1997), pp. 2348-2358, Optical Society of America.

E. Tokunaga et al.; "Frequency-domain interferometer for femtosecond time-resolved phase spectroscopy"; Optics Letters, vol. 17, No. 16; Aug. 15, 1992, pp. 1131-1133.

E. Zeek et al.; "Adaptive pulse compression for transform-limited 15-fs high-energy pulse generation"; Optics Letters, vol. 25, No. 8; Apr. 15, 2000; pp. 587-589.

E.T.J. Nibbering et al.; "Spectral determination of the amplitude and the phase of intense ultrashort optical pulses"; J. Opt. Soc. Am. B, vol. 13, No. 2; Feb. 1996; pp. 317-329.

Efimov, A., et al., "Programmable shaping of ultrabroad-bandwidth pulses from a Ti:sapphire laser", Journal B/vol. 12, No. 10 (Oct. 1995) pp. 1968-1980, Optical Society of America.

Elizabeth Mirowski et al.; "Effect of nonresonant frequencies on the enhancement of quantum beat amplitudes in rovibrational states of Li2: The role of state spacing"; Journal of Chemical Physics, vol. 117, No. 24; Dec. 22, 2002; pp. 11228-11238.

F. Gelmukhanov et al.; "Dynamics of two-photon absorption by molecules and solutions"; J. Opt. Soc. Am. B, vol. 19, No. 5, May 2002; pp. 937-945.

F. Legare et al.; "Laser pulse control of Raman processes by chirped non-adiabatic passage"; Journal of Raman Spectroscopy; 2000; pp. 15-23.

F. Romstad et al.; "Measurement of Pulse Amplitude and Phase Distortion in a Semiconductor Optical Amplifier: from Pulse Compression to Breakup"; IEEE Photonics Technology Letters, vol. 12, No. 12; Dec. 2000; pp. 1674-1676.

F.M. Reinert, M. Ninck, W. Lüthy, T. Feurer, Shaping a Femtosecond Pulse with a Programmable Thermo-Optically Driven Phase Modulator, Optics Express, vol. 15, No. 7, Apr. 2, 2007, six pages.

Fermann, M.E., et al., "Additive-pulse-compression mode locking of a neodymium fiber laser", Optics Letters, vol. 16, No. 4, (Feb. 15, 1991), Optical Society of America.

Fetterman, et al., "Ultrafast pulse shaping: amplification and characterization", Optics Express, vol. 3, No. 10, (Nov. 9, 1998), pp. 366-375.

Feurer, T., et al., "Coherent Control Over Collective Polariton Excitations: The Dawn of Polaritonics", 2002 Thirteenth International Conference on Ultrafast Phenomena, Technical Digest (Tops vol. 72); Opt. Soc. America; XP008086358 (pp. 541-545).

Fork, R.L., et al., "Compression of optical pulses to six femtoseconds by using cubic phase compensation", Optics Letters, (Jul. 1987), vol. 12, No. 7, Optical Society of America.

Fujimoto, Masatoshi, et al., "Programmable shaping of a subterawatt, femtosecond laser pulse by modulating the spectral phase of the preamplified pulse," Optics Communications, 280 (2007) ScienceDirect, pp. 404-407.

G. Roberts; "Abstract-Interference effects in femtosecond spectroscopy"; Philosophical Transactions of the Royal Society of London Series A—Mathematical Physical and Engineering Sciences; 360 (1794): 987-1021; May 15, 2002 (1 page).

G.G. Paulus et al.; "Absolute-phase phenomena in photoionization with few-cycle laser pulses"; Nature, vol. 414; Nov. 8, 2001; pp. 182-184.

Gabriel Turinici et al.; "Quantum wavefunction controllability"; Chemical Physics 267; 2001; pp. 1-9.

Geller, A., et al., "Pulse shaper assisted short laser pulse characterization," Applied Physics B90, Lasers and Optics (Jan. 2008) pp. 427-430.

Gallmann, L. et al.; "Spatially resolved amplitude and phase characterization of femtosecond optical pulses"; Optics Letters, vol. 26, No. 2; Jan. 15, 2001; pp. 96-98.

Gallmann, L. et al.; "Techniques for the characterization of sub-10-fs optical pulses: a comparision"; Appl. Phys. B 70 (Supply): 2000; pp. S67-S75.

Gallmann, L., et al., "Characterization of sub-6-fs optical pulses with spectral phase interferometry for direct electric-field reconstruction," Optics Letters, vol. 24, No. 18 (Sep. 15, 1999) p. 13140-1316.

Gee, S., et al., "Ultrashort Pulse Generation by Intracavity Modelocked Semiconductor Lasers", IEEE Journal of Quantum Electronics, vol. 36, No. 9, Sep. 2000, XP-002462407, pp. 1035-1040.

Geindre, J.P. et al.; "Single-shot spectral interferometry with chirped pulses"; Optics Letters, vol. 26, No. 20; Oct. 15, 2001; pp. 1612-1614.

Gomes, A.S.L., et al., "Optical fibre-grating pulse compressors", Tutorial Review, Optical and Quantum Electronics 20, (1988), pp. 95-112.

Goswami, D.; "Optical pulse shaping approaches to coherent control"; Physics Reports 374; 2004; pp. 385-481.

Goswami, D.; "Ultrafast Pulse Shaping Approaches to Quantum Computing"; Indian Institute of Technology; Dec. 24, 2003 (8 pages).

Greg Taft et al.; "Measurement of 10-fs Laser Pulses"; IEEE Journal of Selected Topics in Quantum Electronics, vol. 2, No. 3, Sep. 1996; pp. 575-585.

Gregory D. Goodno et al.; "Ultrafast heterodyne-detected transient-grating spectroscopy using diffractive optics"; Optical Society of America, vol. 15, No. 6, Jun. 1998; pp. 1791-1794.

Grimberg, B. I. et al.; "Ultrafast Nonlinear Spectroscopic Techniques in the Gas Phase and Their Density Matrix Representation;" J. Phys. Chem. A, vol. 106, No. 5, Feb. 7, 2002; pp. 697-718.

Gross, P. et al.; "Femtosecond Photoassociation: Coherence and Implications for Control in Bimolecular Reactions;" J. Chem. Phys., vol. 106, No. 19, May 15, 1997; pp. 8013-8021.

Gunaratne, T. et al.; "Influence of Bandwidth and Phase Shaping on Laser Induced Breakdown Spectroscopy With Ultrashort Laser Pulses;" Chemical Physics Letters 423, Apr. 3, 2006; pp. 197-201.

Gunn, J M et al: "Polarization and phase control of remote surface-plasmon-mediated two-photo-induced emission and waveguiding" Nano Letters American Chem. SOC. USA, vol. 6, No. 12, Aug. 2006.

H. Miao, A. Weiner, C. Langrock, R. Roussev, M. Fejer, Sensing and Compensation of Femtosecond Waveform Distortion Induced by All-Order Polarization Mode Dispersion at Selected Polarization States, Optics Letters, vol. 32, No. 4, Feb. 15, 2007, pp. 424-426.

H. Takada et al.; "Large-ratio stretch and recompression of sub-10-fs pulses utilizing dispersion managed devices and a spatial light modulator"; Appl. Phys. B 74 [Suppl.]; 2002; pp. S253-S257.

H. Wang et al.; "Abstract-20-fs pulse shaping with a 512-element phase-only liquid crystal modulator"; IEEE Journal of Selected Topics in Quantum Electronics; 7 (4): 718-727; Jul./Aug. 2001 (1 page).

H. Zou, C. Zhou, Femtosecond Pulse Shaping with Space-to-Time Conversion Based on Planar Optics, Optik Optics, ScienceDirect, 2006/2007, pp. 5-8.

H.A. Kim et al.; "Expanded concept of the adiabatic population transfer using dressed states"; Physical Review A, vol. 59, No. 2; Feb. 1999; pp. 1404-1407.

H.S. Eisenberg et al.; "Phase Defects in Self-Focusing of Ultrashort Pulses"; Physical Review Letters, vol. 83, No. 3, Jul. 19, 1999; pp. 540-543.

H.S. Moon et al.; "Coherence control using the ratio of Rabi frequencies for complete coherent inversion in a four-level system"; J. Phys. B At. Mol. Phys. vol. 32; 1999; pp. 987-999.

Hacker, M. et al.; "Frequency doubling of phase-modulated, ultrashort laser pulses"; Appl. Phys. B 73; 2001; pp. 273-277.

Haner, M., et al., "Generation of programmable, picosecond-resolution shaped laser pulses by fiber-grating pulse compression", Optics Letters, vol. 12, No. 6, (Jun. 1987), pp. 398-400, Optical Society of America.

Hanna, Sherif F. et al.; "Electronic-resonance-enhanced coherent anti-Stokes Raman spectroscopy of nitric oxide"; Applied Physics Letters; vol. 83, No. 9, Sep. 1, 2003; pp. 1887-1889.

Hans U. Stauffer et al.; "Simultaneous phase control of Li2 wave packets in two electronic states"; Journal of Chemical Physics, vol. 116, No. 3; Jan. 15, 2002; pp. 946-954.

Hasan, T. et al.; "Photodynamic Therapy of Cancer"; Chapter 40 in Holland Frei Cancer Medicine; BC Dekker Inc.; 2003.

Heritage, J.P., "Picosecond pulse shaping by spectral phase and amplitude manipulation", Optics Letters, vol. 10, No. 12, (Dec. 1985), pp. 609-611, Optical Society of America.

Herschel Rabitz et al.; "Optimal Control of Molecular Motion: Design, Implementation and Inversion"; Acc. Chem. Res., vol. 33, No. 8; 2000; pp. 572-578.

Herschel Rabitz et al.; "Whither the Future of Controlling Quantum Phenomena?"; Science magazine, vol. 288; May 5, 2000; pp. 824-828.

Hilary K. Eaton et al.; "Investigating Nonlinear Femtosecond Pulse Propagation with Frequency-Resolved Optical Gating"; IEEE Journal of Quantum Electronics, vol. 35, No. 4, Apr. 1999; pp. 451-458.

Hillegas, C.W. et al.; "Femtosecond laser pulse shaping by use of microsecond radio-frequency pulses"; Optics Letters; vol. 19, No. 10; May 15, 1994; pp. 737-739.

Hoki, K. et al., Locally Designed Pulse Shaping for Selective Preparation of Enantiomers from their Racemate, Journal of Chemical Physics, New York, NY, US, vol. 114, No. 4, Jan. 22, 2001, pp. 1575-1581.

Hoki, K. et al., Selective Preparation of Enantiomers from a Racemate by Laser Pulses: Model Simulation for Oriented Atropisomers with Coupled Rotations and Torsions, Chemical Physics Elsevier Netherlands, vol. 267, No. 1-3, Jun. 1, 2001, pp. 59-79.

Hornung, Thomas et al.; "Adapting optimum control theory and using learning loops to provide experimentally feasible shaping mask patterns"; Journal of Chemical Physics; vol. 115, No. 7; Aug. 15, 2001; pp. 3105-3111.

Hosseini, S. Abbas et al.; "Coherent control of multiphoton transitions with femtosecond pulse shaping"; Physical Review A; pp. 033410-1-033410-7.

Hu et al.; "A New Nonlinear Optical Crystal-$BaAIBO_3F_2$(BABF)"; Japanese Journal of Applied Physics, vol. 41, No. 10B, Part 2, Oct. 15, 2002; pp. L1131-L1133.

I. Amat-Roldan et al.; "Measurement of electric field by interferometric spectral trace observation"; Optics Letters, vol. 30, No. 9; May 1, 2005; pp. 1063-1065.

I. Amat-Roldan et al.; "Starch-based second-harmonic-generated colinear frequency-resolved optical gating pulse characterization at the focal plane of a high-numerical-aperture lens"; Optics Letters, vol. 29, No. 19; Oct. 1, 2004; pp. 2282-2284.

I. Bar et al.; "Direct observation of preferential bond fission by excitation of a vibrational fundamental: Photodissociation of HOD (0,0,1)"; J. Chem. Phys., vol. 93, No. 3; Aug. 1, 1990; pp. 2146-2148.

I. Bar et al.; "Mode-selective bond fission: Comparison between the photodissociation of HOD (0,0,1) and HOD (1,0,0)"; J. Chem. Phys. vol. 95, No. 5; Sep. 1, 1991; pp. 3341-3346.

I.G. Cormack et al.; "Rapid measurement of ultrashort-pulse amplitude and phase from a two-photon absorption sonogram trace"; J. Opt. Soc. Am. B; vol. 18, No. 9, Sep. 2001; pp. 1377-1382.

Iaconis, C. et al.; "Direct Interferometric Techniques for Characterizing Ultrashort Optical Pulses"; IEEE Journal of Selected Topics in Quantum Electronics, vol. 4, No. 2; Mar./Apr. 1998; pp. 285-294.

Iaconis, C. et al.; "Spectral phase interferometry for direct electric-field reconstruction of ultrashort optical pulses"; Optics Letters, vol. 23, No. 10, May 15, 1998; pp. 792-794.

Imeshev, G. et al. "Engineerable femtosecond pulse shaping by second-harmonic generation with Fourier synthetic quasi-phase-matching gratings"; Optics Letters; vol. 23, No. 11; Jun. 1, 1998; pp. 864-866.

J. Ahn et al.; "Information Storage and Retrieval Through Quantum Phase"; Science Magazine, vol. 287; Jan. 21, 2000; pp. 463-465.

J. Ahn et al.; "Quantum Phase Retrieval of a Rydberg Wave Packet Using a Half-Cycle Pulse"; Physical Review Letters, vol. 86, No. 7; Feb. 12, 2001; pp. 1179-1182.

J. M. Dudley, et al.; "Direct measurement of pusle distortion near the zero-disperson wavelength in an optical fiber by frequency-resolved optical gating"; Optics Letters, vol. 22, No. 7; Apr. 1, 1997; 457-459.

J. Peatross et al.; "Temporal decorrelation of short laser pulses"; J. Opt. Soc. Am. B, vol. 15, No. 1; Jan. 1998; pp. 216-222.

J. W. Nicholson et al.; "Full-field characterization of femtosecond pulses by spectrum and cross-correlation measurements"; Optics Letters, vol. 24, No. 23; Dec. 1, 1999; pp. 1774-1776.

J.F. Christian et al.; "Rubidium electronic wavepackets probed by a phase-sensitive pump-probe technique"; Optics Communications, vol. 103, No. 1/2; Nov. 1, 1993; pp. 79-84.

J.G. Underwood et al.,; "Switched Wave Packets: A Route to Nonperturbative Quantum Control"; Physical Review Letters, vol. 90, No. 22; Jun. 6, 2003; pp. 223001-1-223001-4.

J.J. Garcia-Ripoll et al.; "Speed Optimized Two-Qubit Gates with Laser Coherent Control Techniques for Ion Trap Quantum Computing"; Physical Review Letters, vol. 91, No. 15; Oct. 10, 2003; pp. 157901-1-157901-4.

J.J. Gerdy et al.; "Femtosecond selective control of wave packet population"; Chemical Physics Letters, vol. 171, No. 1/2; Jul. 27, 1990; pp. 1-4.

J.M. Geremia et al.; "Incorporating physical implementation concerns into closed loop quantum control experiments"; Journal of Chemical Physics, vol. 113, No. 24; Dec. 22, 2000; pp. 10841-10848.

J.P. Likforman et al.; "Measurement of photon echoes by use of femtosecond Fourier-transform Spectral Interferometry"; Optics Letters, vol. 22, No. 14; Jul. 15, 1997; pp. 1104-1106.

J.P. Ogilvie et al.; "Fourier transform measurement of two-photon excitation spectra: applications to microscopy and optimal control"; Optics Letters, vol. 30, No. 8; Apr. 15, 2005; pp. 911-913.

J.S. Keller et al.; "Selective bond fission in methyl mercaptan at 193 nm via radial derivative coupling between the 21A" and 11A" adiabatic electronic states"; J. Chem. Phys. vol. 96, No. 6; Mar. 15, 1992; pp. 4324-4329.

J.S. Melinger et al.; "Adiabatic population inversion in I2 vapor with picosecond laser pulses"; J. Chem Phys. vol. 95, No. 3; Aug. 1, 1991; pp. 2210-2213.

J.S. Melinger et al.; "Adiabatic population transfer with frequency-swept laser pulses"; J. Chem. Phys. vol. 101, No. 8; Oct. 15, 1994; pp. 6439-6454.

J.S. Melinger et al.; "Generation of Narrowband Inversion with Broadband Laser Pulses"; vol. 68, No. 13; Mar. 30, 1992; pp. 2000-2003.

J.W. Nicholson et al.; "Unbalanced third-order correlations for full characterization of femtosecond pulses"; Optics Letters, vol. 25, No. 24; Dec. 15, 2000; pp. 1801-1803.

Jasco Comparison Proven Spectroscopy & Chromatography Technology, J-815 Circular Dichroism Spectropolarimeter, Jasco UK, http://www.jasco.co.uk/j800.asp, Nov. 29, 2006; 2 pages.

Jeffrey A. Cina; "Nonlinear wavepacket interferometry for polyatomic molecules"; Journal of Chemical Physics, vol. 113, No. 21; Dec. 1, 2000; pp. 9488-9496.

Jeffrey L. Krause et al.; "Creating and Detecting Shaped Rydberg Wave Packets"; Physical Review Letters, vol. 79, No. 25; Dec. 22, 1997; pp. 4978-4981.

Jeffrey L. Krause et al.; "Optical control of molecular dynamics: Molecular cannons, reflectrons and wave-packet focusers"; J. Chem. Phys. 99(9); Nov. 1, 1993; pp. 6562-6578.

Jeffrey L. Krause et al.; "Quantum Control of Molecular Dynamics: The Strong Response Regime"; J. Phys. Chem; 1995, 99; pp. 13736-13747.

Jennifer L. Herek et al.; "Quantum control of energy flow in light harvesting"; Nature magazine, vol. 417; May 30, 2002; pp. 533-535.

Jerome Degert et al.; "Realization of a Time-Domain Fresnel Lens with Coherent Control"; Physical Review Letters, vol. 89, No. 20; Nov. 11, 2002; pp. 203003-1-203003-4.

Jerome Tignon et al.; "Spectral Interferometry of Semiconductor Nanostructures"; IEEE Journal of Quantum Electronics, vol. 35, No. 4; Apr. 1999; pp. 510-522.

Jiang, et al. "Spectral line-by-line pulse shaping," Optics Letters, vol. 30, No. 12 (Jun. 15, 2005) Optical Society of America, pp. 1557-1559.

Jiang, et al., "Line-by-line pulse shaping control of optical arbitrary waveform generation," Optics Express, vol. 13, No. 25, (Dec. 12, 2005) Optical Society of America, pp. 10431-10439.

Jianshu Cao et al.; "A simple physical picture for quantum control of wave packet localization"; J. Chem Phys., 107; Aug. 1, 1997; pp. 1441-1450.

Jianshu Cao et al.; "Intrapulse Dynamical Effects in Multiphoton Processes: Theoretical Analysis"; J. Phys. Chem. A; vol. 102, 1998; pp. 4284-4290.

Jianshu Cao et al.; "Molecular Pi Pulse for Total Inversion of Electronic State Population"; Physical Review Letters, vol. 80, No. 7; Feb. 16, 1998; pp. 1406-1409.

Jianshu Cao et al.; "Molecular pie pulses: Population inversion with positively chirped short pulses"; Journal of Chemical Physics, vol. 113, No. 5; Aug. 1, 2000; pp. 1898-1909.

Jianwei Che et al.; "Detection and Control of Molecular Quantum Dynamics"; J. Phys. Chem.; 1995; pp. 14949-14958.

Jianwei Che et al.; "Semiclassical Dynamics and Quantum Control in Condensed Phases: Application to 12 in a Solid Argon Matrix"; J. Phys. Chem. 1996, 100; pp. 7873-7883.

John D. Hybl et al; "Two-dimensional Fourier transform electronic spectroscopy"; Journal of Chemical Physics, vol. 115, No. 14; Oct. 8, 2001; pp. 6606-6622.

John M. Jean et al.; "Application of a multilevel Redfield theory to electron transfer in condensed phases"; J. Chem. Phys. 96; Apr. 15, 1992; pp. 5827-5842.

John M. Papanikolas et al.; "Erratum: Manipulation of rovibrational wave packet composition in the Li2 E(Eg) shelf state using intermediate state selection and shaped femtosecond laser pulses"; J. Chem Phys. 107, 4172; 1997; p. 10830.

John M. Papanikolas et al.; "Manipulation of rovibrational wave packet composition in the Li2 E(1Eg) shelf state using intermediate state selection and shaped femtosecond laser pulses"; J. Chem. Phys., vol. 107, No. 11; Sep. 15, 1997; pp. 4172-4178.

Joshua B. Ballard et al.; "Optimization of wave packet coefficients in Li 2 using an evolutionary algorithm: The role of resonant and nonresonant wavelengths"; Journal of Chemical Physics, vol. 116, No. 4; Jan. 22, 2002; pp. 1350-1360.

Joshua B. Ballard et al.; "Simultaneous control of time-dependent population transfer dynamics and wave-packet quantum interferences in Li2 by shaped ultrafast pulses"; Physical Review A 66; 2002; pp. 043402-1-043402-7.

Juan L.A. Chilla et al.; "Analysis of a Method of Phase Measurement of Ultrashort Pulses in the Frequency Domain"; IEEE Journal of Quantum Electronics, vol. 27, No. 5, May 1991; pp. 1228-1235.

Julie A. Gruetzmacher et al.; "Few-cycle mid-infrared pulse generation, characterization and coherent propagation in optically dense media"; Review of Scientific Instruments, vol. 73, No. 6; Jun. 2002; pp. 2227-2236.

Julie A. Gruetzmacher et al.; "Time and Frequency-Gated FID: a New Approach to Study the Vibrational Dephasing of Water"; Ultrafast Phenomena XII, 66; pp. 530-532.

Julie A. Mueller et al.; "Competing isomeric product channels in the 193 nm photodissociation of 2-chloropropene and in the unimolecular dissociation of the 2-propenyl radical"; Journal of Chemical Physics, vol. 114, No. 10; Mar. 8, 2001; pp. 4505-4521.

Jun.-Koo Rhee et al.; "Real-time dispersion analyzer of femtosecond laser pulses with use of a spectrally and temporally resolved upconversion technique"; J. Opt. Soc. Am. B, vol. 13, No. 8; Aug. 1996; pp. 1780-1785.

Jung-Ho Chung et al.; "Ambiguity of Ultrashort Pulse Shapes Retrieved From the Intensity Autocorrelation and the Power Spectrum"; IEEE Journal on Selected Topics of Quantum Electronics, vol. 7, No. 4; Jul./Aug. 2001; pp. 656-666.

K.C. Chu et al.; "Temporal interferometric measurement of femtosecond spectral phase"; Optics Letters, vol. 21, No. 22; Nov. 15, 1996; pp. 1842-1844.

K.D. Belfield et al.; "Multiphoton-absorbing organic materials for microfabrication, emerging optical applications and non-destructive three-dimensional imaging"; J. of Phys. Organic Chem., 13; 2000; pp. 837-849.

K.H. Hong et al.; "Time-frequency analysis of chirped femtosecond pulses using Wigner distribution function"; Applied Physics B74 (Suppl), 2002; pp. S231-S236.

Kaindl, Robert A. et al.; "Generation, shaping, and characterization of intense femtosecond pulses tunable from 3 to 20 µm"; J. Opt. Soc. Am. B; vol. 17, No. 12; Dec. 2000; pp. 2085-2094.

Kakehata, Masayuki et al.; "Single-shot measurement of carrier-envelope phase changes by spectral interferometry"; Optics Letters, vol. 26, No. 18; Sep. 15, 2001; pp. 1436-1438.

Kane, Daniel J. et al.; "Single-shot measurement of the intensity and phase of a femtosecond UV laser pulse with frequency-resolved optical gating"; Optics Letters, vol. 19, No. 14; Jul. 15, 1994; pp. 1061-1063.

Kane, Daniel J. et al.; "Single-shot measurement of the intensity and phase of an arbitrary ultrashort pulse by using frequency-resolved optical gating"; Optics Letters, vol. 18, No. 10; May 15, 1993; pp. 823-825.

Kapteyn, Henry C. et al.; "A Comparison of Multipass Vs. Regenerative Ti:Sapphire Laser Amplifiers;" Kapteyn-Murnane Laboratories Inc., Boulder, CO, USA, www.kmlabs.com; (2003) 2 pages.

Kazunori Naganuma et al; "General Method for Ultrashort Light Pulse Chirp Measurement"; IEEE Journal of Quantum Electronics, vol. 25, No. 5; Jun. 1989; pp. 1225-1233.

Kazuya Takasago et al.; "Evaluation of Femtosecond Pulse Shaping with Low-Loss Phase-Only Masks"; IEEE Journal of Selected Topics in Quantum Electronics, vol. 4, No. 2; Mar./Apr. 1998; pp. 346-352.

Kenji Mishima et al.; "A theoretical study on laser control of a molecular nonadiabatic process by ultrashort chirped laser pulses"; Journal of Chemical Physics, vol. 109., No. 5; Aug. 1, 1998; pp. 1801-1809.

Kenji Mishima et al.; "Theoretical study on quantum control of photodissociation and photodesorption dynamics by femtosecond chirped laser pulses"; Journal of Chemical Physics, vol. 110, No. 16; Apr. 22, 1999; pp. 7756-7769.

Kim, D.S. et al; "Femtosecond pulse distortion in GaAs quantum wells and its effect on pump-probe or four-wave-mixing experiments"; Physical Review B; vol. 50, No. 24; Dec. 15, 1994; pp. 18240-18249.

Kohler, Bern et al.; "Phase and intensity characterization of femtosecond pulses from a chirped-pulse amplifier by frequency-resolved optical gating"; Optics Letters, vol. 20, No. 5; Mar. 1, 1995; pp. 483-485.

Kolenda, Jürgen, et al., "Pulse Shaping with the MIIPS-Process," Laser Technology, (Jan. 2008) Photonik International, p. 68.

Konorov, S.O., "Laser Breakdown with Millijoule Trains of Picosecond Pulses Transmitted through a Hollow-Core Photonic-Crystal Fiber", Laser Physics, vol. 13, No. 4, (2003) pp. 652-656.

Kosik, Ellen M., et al., "The effects of noise on ultrashort optical pulse measurement using SPIDER"; The Institute of Optics, University of Rochester, Rochester, NY; (2000) pp. 21-23.

Krausz, F., et al., "Generation of 33-fs optical pulses from a solid-state laser", Optics Letters, (Feb. 1, 1992), vol. 17, No. 3, Optical Society of America.

Kroner, D. et al., Asymmetric Laser Excitation in Chiral Molecules: Quantum Simulations for a Proposed Experiment, Chemical Physics Letters Elsevier Netherland, vol. 372, No. 1-2, Apr. 22, 2003, pp. 242-248.

Kubo, Atsushi, et al., "Femtosecond Imaging of Surface Plasmon Dynamics in a Nanostructured Silver Film," Nano Letters, vol. 5, No. 6 (2005) American Chemical Society, pp. 1123-1127.

L. Lepetit et al.; "Linear techniques of phase measurement by femtosecond spectral interferometry for applications in spectroscopy"; J. Opt. Soc. Am. B, vol. 12, No. 12; Dec. 1995; pp. 2467-2474.

L. Lepetit et al.; "Two-dimensional nonlinear optics using Fourier-transform spectral interferometry"; Optics Letters, vol. 21, No. 8; Apr. 15, 1996; pp. 564-566.

L. Marmet et al.; "Observation of Quasi-Landau Wave Packets"; Physical Review Letters, vol. 72, No. 24; Jun. 13, 1994; pp. 3779-3782.

L. Misoguti et al.; "Generation of Broadband VUV Light Using Third-Order Cascaded Processes"; Physical Review Letters, vol. 87, No. 1, Jul. 2, 2001; pp. 013601-1-013601-4.

L. Windhorn et al.; "Molecular dissociation by mid-IR femtosecond pulses"; Chemical Physics Letters 357, May 3, 2002; pp. 85-90.

L. Xu et al.; "Abstract-Programmable chirp compensation for 6-fs pulse generation with a prism-pair-formed pulse shaper"; IEEE Journal of Quantum Electronics; 36 (8): 893-899; Aug. 2000 (1 page).

L.D. Noordam et al.; "Redistribution of Rydberg States by Intense Picosecond Pulses"; Physical Review Letters, vol. 68, No. 10; Mar. 9, 1992; pp. 1496-1499.

L.D. Ziegler et al.; "Nonlinear polarization description of phase-locked pulse-pair spectroscopy"; J. Chem. Phys., vol. 97, No. 7; Oct. 1, 1992; pp. 4704-4713.

L.J. Butler et al.; "Bond selective photochemistry in CH2BrI through electronic excitation at 210 nm"; J. Chem. Phys., vol. 84, No. 7; Apr. 1, 1986; pp. 4104-4106.

L.J. Butler et al.; "The electronic state-selective photodissociation of CH2BrI at 248, 210 and 193 nm"; J. Chem. Phys. vol. 86, No. 4; Feb. 15, 1997; pp. 2051-2074.

Laarmann, T., et al., "Femtosecond pulse shaping as analytic tool in mass spectrometry of complex polyatomic systems," J Phys B-at Mol Opt 2008;41(7).

Langchi Zhu et al.; "Coherent Laser Control of the Product Distribution Obtained in the Photoexcitation of HI"; Science Magazine, vol. 270; Oct. 6, 1995; pp. 77-80.

Lange, H. Rudiger et al.; "Reconstruction of the Time Profile of Femtosecond Laser Pulses through Cross-Phase Modulation"; IEEE Journal of Selected Topics in Quantum Electronics, vol. 4, No. 2; Mar./Apr. 1998; pp. 295-300.

Larson, D.R. et al.; "Water soluble quantum dots for multiphoton imaging in vivo"; Science 300: May 30, 2003; pp. 1434-1436.

Lee, P.C. et al.; "Adsorption and Surface-Enhanced Raman of Dyes on Silver and Gold Sols;" Phys. Chem., vol. 86, No. 17, 1982, pp. 3391-3395.

Leibfried, D. et al.; "Quantum information with trapped ions at NIST"; Journal of Modern Optics; vol. 50, No. 6/7; Apr.-May 2003; pp. 1115-1129.

Lemoff, B.E., et al., "Quintic-phase-limited, spatially uniform expansion and recompression of ultrashort optical pulses", Optics Letters, vol. 18, No. 19, (Oct. 1, 1993), pp. 1651-1653, Optical Society of America.

Lim, Sang-Hyun et al.; "Single-Pulse Phase-Control Interferometric Coherent Anti-Stokes Raman Scattering Spectroscopy;" Physical Review A, 72, (Oct. 2005); pp. 041803-1-041803-4.

Link, Stephan et al.; "Optical Properties and Ultrafast Dynamics of Metallic Nanocrystals;" Annu. Rev. Phys. Chem. 54, 2003; pp. 331-369.

Liu, Yongqian, et al., "Terahertz Waveform Synthesis via Optical Pulse Shaping", IEEE Journal of Selected Topics in Quantum Electronics, (Sep. 1996), vol. 2, No. 3, pp. 709-719.

Lorenzo Pesce et al.; "Quantum dynamics simulation of the ultrafast photoionization of Li2"; Journal of Chemical Physics, vol. 114, No. 3; Jan. 15, 2001; pp. 1259-1271.

Lozovoy, V. V. et al.: "Multiphoton Intrapulse Interference. IV. Ultrashort Laser Pulse Spectral Phase Characterization and Compensation;" Optics Letters, vol. 29, No. 7, Apr. 1, 2004; pp. 775-777.

Lozovoy, V. V. et al.; "Cascaded Free-Induction Decay Four-Wave Mixing;" Chemical Physics 266, 2001, pp. 205-212.

Lozovoy, V. V. et al.; "Femtosecond Spectrally Dispersed Three-Pulse Four-Wave Mixing: The Role of Sequence and Chirp in Controlling Intramolecular Dynamics;" J. Raman Spectroscopy 31, 2000; pp. 41-49.

Lozovoy, V. V. et al.; "Photon Echo Pulse Sequences With Femtosecond Shaped Laser Pulses As a Vehicle for Molecule-Based Quantum Computation;" J. Chemical Physics Letters 351, Jan. 10, 2002; pp. 213-221.

Lozovoy, V. V. et al.; "Spectral Phase Optimization of Femtosecond Laser Pulses for Narrow-Band, Low-Background Nonlinear Spectroscopy;" Optics Express, vol. 13, No. 26, Dec. 26, 2005; pp. 10882-10887.

Lozovoy, V. V. et al.; "Systematic Control of Nonlinear Optical Processes Using Optimally Shaped Femtosecond Pulses;" ChemPhysChem, Wiley-VCH Verlag GmbH & Co. KGaA, Weinheim, 6, 2005; pp. 1970-2000.

Lozovoy, V. V. et al.; "The Role of Microscopic and Macroscopic Coherence in Laser Control;" Chemical Physics 267, 2001; pp. 99-114.

Lozovoy, V. V. et al.; "The Role of Pulse Sequences in Controlling Ultrafast Intramolecular Dynamics With Four-Wave Mixing;" Int. Rev. in Physical Chemistry, vol. 19, No. 4, 2000; pp. 531-552.

Lozovoy, V. V., et al., "Laser Control of Physicochemical Processes; Experiments and Applications," The Royal Society of Chemistry 2006, Annu. Rep. Prog. Chem., Sect. C, 102. www.rsc.org/annrepc (2006) pp. 227-258.

Lozovoy, V.V. et al; "What Role Can Four-Wave Mixing Techniques Play in Coherent Control?;" Advances in Multiphoton Processes and Spectroscopy 14; and Quantum Control of Molecular Reaction Dynamics, edited by R.J. Gordon and Y. Fujimura, World Scientific, Singapore, 2000; pp. 62-79.

Lozovoy, V.V.; "Multiphoton intrapulse interference. II. Control of two- and three-photon laser induced flurorescence with shaped pulses"; J. Chem. Phys. 118 (7); Feb. 15, 2005; pp. 3187-3196.

Lozovoy, Vadim V., et al., "Direct measurement of spectral phase for ultrashort laser pulses," Optics Express, vol. 16, No. 2 (Jan. 21, 2008) pp. 592-597.

Lu, Y.M. et al.; "Highly sensitive two-photon chromophores applied to three dimensional lithographic microfabrication: design, synthesis and characterization towards two-photon absorbtion cross section"; J. Mater Chem. 14(1); 2004; pp. 75-80.

Lutfur R. Khundkar et al.; "Ultrafast Molecular Reaction Dynamics in Real-Time: Progress Over a Decade"; Annu. Rev. Phys. Chem., 1990; pp. 15-60.

M. Armstrong et al.; "Versatile seven-femtosecond pulse compressor of parametrically amplified pulses using adaptive optics: studies of the primary events in protein dynamics"; Applied Physics B 74 (Suppl), 2002; pp. S127-S132.

M. Bergt et al.; "Controlling the Femtochemistry of Fe(CO)5"; J. Phys. Chem. A, vol. 103, No. 49; 1999; pp. 10381-10387.

M. Bergt et al.; "Time-resolved organometallic photochemistry Femtosecond fragmentation and adaptive control of CpFe(CO)2X (X=Cl,Br,1)"; Journal of Organometallic Chemistry 661; 2002; pp. 199-209.

M. Dantus et al., "Experimental Coherent Laser Control of Physicochemical Processes", Chem. Rev. 2004, 104, pp. 1813-1859.

M. Gruebele; "Fully quantum coherent control"; Chemical Physics 267; 2001; pp. 33-46.

M. Hacker et al., "Iterative Fourier Transform Algorithm for Phase-Only Pulse Shaping", Optics Express, vol. 9, No. 4, Aug. 13, 2001, pp. 191-199.

M. Hentschel et al.; "Attosecond metrology"; Nature, vol. 414; Nov. 29, 2001; pp. 509-513.

M. Hentschel et al.; "Generation of 0.1-TW optical pulses with a single-stage Ti:sapphire amplifier at a 1-kHz repetition rate"; Appl. Phys. B 70 [Suppl.]; 2000; pp. S161-S164.

M. Ovchinnikov et al.; "Semiclassical molecular dynamics computation of spontaneous light emission in the condensed phase: Resonance Raman spectra"; Journal of Chemical Physics, vol. 114, No. 16; Apr. 22, 2001; pp. 7130-7143.

M. Renard et al.; "Controlling ground-state rotational dynamics of molecules by shaped femtosecond laser pulses"; Physical Review A 69; 2004; 043401-1-043401-6.

M. Schurenberg et al.; "Abstract-Laser desorption/ionization mass spectrometry of peptides and proteins with particle suspension matrixes"; Analytical Chemistry; 71 (1): 221-229; Jan. 1, 1999 (1 page).

M. Sterling et al.; "Interrogation and control of condensed phase chemical dynamics with linearly chirped pulses: I2 in solid Kr"; J. Chem. Phys. 104; May 1, 1996; pp. 6497-6506.

M. Wollenhaupt et al.; "Interferences of Ultrashort Free Electron Wave Packets"; Physical Review Letters, vol. 89, No. 17; Oct. 21, 2002; pp. 173001-1-173001-4.

M.A. Bouchene et al.; "Temporal coherent control induced by wave packet interferences in one and two photon atomic transitions"; The European Physical Journal D, vol. 2; 1998; pp. 131-141.

M.C. Chen et al.; "Coherent control multiphoton processes in semiconductor saturable Bragg reflector with freezing phase algorithm"; Appl. Phys. B 80; 2005; pp. 333-340.

M.C. Chen et al.; "Freezing phase scheme for fast adaptive control and its application to characterization of femtosecond coherent optical pulses reflected from semiconductor saturable absorber mirrors"; J. Opt. Soc. Am. B, vol. 22, No. 5; May 2005; pp. 1134-1142.

M.E. Fermann et al.; "Shaping of ultrashort optical pulses by using an integrated acousto-optic tunable filter"; Optics Letters, vol. 18, No. 18; Sep. 15, 1993; pp. 1505-1507.

M.F. DeCamp et al.; "Dynamics and coherent control of high-amplitude optical phonons in bismuth"; Physical Review B, vol. 64; 2001; pp. 092301-1-092301-3.

M.M. Salour et al.; "Observation of Ramsey's Interference Fringes in the Profile of Doppler-Free Two-Photon Resonances"; Physical Review Letters, vol. 38, No. 14; Apr. 4, 1977; pp. 757-760.

M.O. Scully, et al.; "FAST CARS: Engineering a laser spectroscopic technique for rapid identification of bacterial spores"; PNAS; vol. 99, No. 17; Aug. 20, 2002; pp. 10994-11001.

M.R. Fetterman et al.; "Propagation of Complex Laser Pulses in Optically Dense Media"; The American Physical Society, Physical Review Letters, vol. 82, No. 20, May 17, 1999; pp. 3984-3987.

Ma R., et al., Intense Femtosecond Laser Field-Induced Coulomb Fragmentation of C2H4, International Journal of Mass Spectrometry, Elsevier, Amsterdam, NL, vol. 242, No. 1, Mar. 15, 2005, pp. 43-48.

Marco A. Krumbugel et al.; "Direct ultrashort-pulse intensity and phase retrieval by frequency-resolved optical gating and a computational neural network"; Optics Letters, vol. 21, No. 2; Jan. 15, 1996; pp. 143-145.

Marcos Dantus; "Coherent Nonlinear Spectroscopy: From Femtosecond Dynamics to Control"; Annu. Rev. Phys. Chem. 2001; pp. 639-679, C1-C7.

Marcos Dantus; GeneticAlgorithm-v4.nb to simulate an adaptive genetic algorithm;Oct. 2001; pp. 1-7.

Marvet, Una et al.; "Femtosecond Concerted Elimination of Halogen Molecules From Halogenated Alkanes;" Phys. Chem. Chem. Phys., 2, 2000; pp. 885-891.

Marvet, Una et al.; "Femtosecond Dynamics of Photoinduced Molecular Detachment From Halogenated Alkanes. I. Transition State Dynamics and Product Channel Coherence;" J. Chem. Phys., vol. 109, No. 11, Sep. 15, 1998.

Marvet, Una et al.; "Femtosecond Dynamics of Unimolecular and Unrestricted Bimolecular Reactions;" J. Phys. Chem. A, vol. 102, No. 23, 1998; pp. 4111-4117.

Marvet, Una et al.; "Femtosecond Observation of a Concerted Chemical Reaction;" Chemical Physics Letters, 256, Jun. 21, 1996; pp. 57-62.

Marvet, Una et al.; "Femtosecond Photoassociation Spectroscopy: Coherent Bond Formation;" Chemical Physics Letters, 245, Nov. 3, 1995; pp. 393-399.

Matuschek. N.; "Back-side-coated chirped mirrors with ultra-smooth broadband dispersion characteristics"; Applied Physics B 71; Sep. 6, 2000; pp. 509-522.

May, Volkhard et al., "Theory of ultrafast nonresonant multiphoton transitions in polyatomic molecules: Basics and application to optimal control theory," J. Chem. Phys. 127 (2007) pp. 144102-1 through 144102-11.

McGraw-Hill Encyclopedia of Science & Technology, 6th Ed.; "Mass spectrometry"; 1987; pp. 492-502 (12 pages).

Meshulach D. et al.; "Adaptive ultrashort pulse compression and shaping"; Optics Communications 138; 1997; pp. 345-348.

Meshulach, D. et al.; "Adaptive real-time femtosecond pulse shaping"; J. Opt. Soc. Am. B; vol. 15, No. 5; May 1998; pp. 1615-1619.

Meshulach, D., et al., "Adaptive Compression of Femtosecond Pulses", presented at the Ultrafast Optics 1997 Conference, Aug. 1997, Monterey California (3 pages).

Meshulach, M. et al.; "Coherent quantum control of multiphoton transitions by shaped ultrashort optical pulses" Phys. Rev. A 60; 1999; pp. 1287-1292.

Michael J. Bronikowski et al.; "Bond-specific chemistry: OD:OH product ratios for the reactions H+HOD(100) and H+HOD(001)"; J. Chem. Phys., vol. 95, No. 11; Dec. 1, 1991; pp. 8647-8648.

Michael J. Stimson et al.; "Noisy-light correlation functions by frequency resolved optical gating"; J. Opt. Soc. Am. B, vol. 15, No. 2; Feb. 1998; pp. 505-514.

Michael Messina et al.; "Quantum control of multidimensional systems: Implementation within the time-dependent Hartree approximation"; J. Chem Phys. 104; Jan. 1996; pp. 173-182.

Michel F. Emde et al.; "Spectral interferometry as an alternative to time-domain heterodyning"; Optics Letters, vol. 22, No. 17; Sep. 1, 1997; pp. 1338-1340.

Michelmann, K. et al.; "Measurement of the Page function of an ultrashort laser pulse"; Optics Communications; Oct. 15, 2001, pp. 163-170.

Midorikawa, Katsumi, et al., "Phase-Matched High-Order Harmonic Generation by Guided Intense Femtosecond Pulses," IEEE Journal of Selected Topics in Quantum Electronics, vol. 5, No. 6 (Nov./Dec. 1999) pp. 1475-1485.

Mitra et al.; "Nonlinear Limits to the Information Capacity of Optical Fibre Communications"; Nature; vol. 411; Jun. 28, 2001; pp. 1027-1030.

Mohamed Aziz Bouchene et al.; "Interplay between wave packet interferences and second harmonic generation"; Optics Communications 181; 2000; pp. 327-336.

Mohamed Aziz Bouchene et al.; "Wavepacket interferometry with chirped pulses"; J. Phys. B At. Mol. Opt. Phys. 32; 1999; pp. 5167-5177.

Montgomery, Matthew A., "Elucidation of Control Mechanisms Discovered during Adaptive Manipulation of [Ru(dpb)3](PF6)2 emission in the Solution Phase," American Chemical Society, J. Phys. Chem. A, vol. 111, No. 8 (2007) pp. 1426-1433.

Moshe Shapiro et al.; "Coherently Controlled Asymmetric Synthesis with Achiral Light"; Physical Review Letters, vol. 84, No. 8; Feb. 21, 2000; pp. 1669-1672.

Moshe Shapiro et al.; "Nonadiabatic wave packet dynamics: Experiment and theory in IBr"; Journal of Chemical Physics, vol. 110, No. 5; Feb. 1, 1999; pp. 2465-2473.

Moshe Shapiro et al.; On the Origin of Pulse Shaping Control of Molecular Dynamics; J. Phys. Chem. A, vol. 105, No. 105; 2001; pp. 2897-2902.

Motzkus, M., Open and Closed Loop Control of Complex Molecules with Shaped fs Pulses, 2003 International Conference Physics and Control. Proceedings (Cat. No. 03EX708), IEEE Piscataway, NJ, USA, vol. 3, 2003, p. 746, vol. 3.

Mustafa Demirplak et al.; "Optical control of molecular dynamics in a liquid"; Journal of Chemical Physics, vol. 116, No. 18; May 8, 2002; pp. 8028-8035.

N. Dudovich et al.; "Quantum Control of the Angular Momentum Distribution in Multiphoton Absorption Processes"; Physical Review Letters, vol. 93, No. 10; Mar. 12, 2004; pp. 103003-1-103003-4.

N. Dudovich et al.; "Single-pulse coherent anti-Stokes Raman spectroscopy in the fingerprint spectral region"; J. of Chem. Phys., vol. 118, No. 20; May 22, 2003; pp. 9208-9215.

N. Karasawa et al.; "Optical pulse compression to 5.0 fs by by use only a spatial light modulator for phase compensation"; J. Opt. Soc. Am. B, vol. 18, No. 11; Nov. 2001; pp. 1742-1746.

N.F. Scherer et al.; "Fluorescence-detected wave packet interferometry. II. Role of rotations and determination of the susceptibility"; J. Chem. Phys., vol. 96, No. 6; Mar. 15, 1992; pp. 4180-4194.

N.F. Scherer et al.; "Time resolved dynamics of isolated molecular systems studied with phase-locked femtosecond pulse pairs"; J. Chem Phys. vol. 93, No. 1; Jul. 1, 1990; pp. 856-857.

N.H. Damrauer et al.; "Control of bond-selective photochemistry in CH2BrCl using adaptive femtosecond pulse shaping"; The European Physical Journal D, 20, 2002; pp. 71-76.

Neil Shafer et al.; "Isotope effect in the photodissociation of HDO at 157.5 nm"; J. Chem. Phys., vol. 90, No. 11; Jun. 1, 1989; pp. 6807-6808.

Nicholson, J.W. et al; "Noise sensitivity and accuracy of femtosecond pulse retrieval by phase and intensity from correlation and spectrum only (PICASO)"; J. Opt. Soc. Am. B; vol. 19, No. 2; Feb. 2002; pp. 330-339.

Niels E. Henriksen; "Laser control of chemical reactions"; Chem. Soc. Rev. 3137 42; 2002; pp. 37-42.

Nirit Dudovich et al.; "Coherent Transient Enhancement of Optically Induced Resonant Transitions"; Physical Review Letters, vol. 88, No. 12; Mar. 25, 2002; pp. 123004-1-123004-4.

Nirit Dudovich et al.; "Single-pulse coherently controlled nonlinear Raman spectroscopy and microscopy"; Nature magazine, vol. 418; Aug. 1, 2002; pp. 512-514.

Nisoli, M., et al., "Compression of high-energy laser pulses below 5fs", Optics Letters, (Apr. 15, 1997) vol. 22, No. 8, pp. 522-524, Optical Society of America.

Nisoli, M., et al., "Generation of high energy 10 fs pulses by a new pulse compression technique," Appl. Phys. Lett., vol. 68, No. 20 (May 13, 1996) pp. 2793-2795.

Norbert F. Scherer et al.; "Fluorescence-detected wave packet interferometry: Time resolved molecular spectroscopy with sequences of femtosecond phase-locked pulses"; J. Chem. Phys., vol. 95, No. 3; Aug. 1, 1991; pp. 1487-1511.

Noriaki Tsurumachi et al.; "Interferometric observation of femtosecond free induction decay"; Optics Letters, vol. 19, No. 22, Nov. 15, 1994; pp. 1867-1869.

Nuernberger, Patrick, "Femtosecond quantum control of molecular dynamics in the condensed phase," Invited Article, Physical Chemistry Chemical Physics, The Owner Societies, vol. 9 (2007) pp. 2470-2497.

O'Shea, Patrick et al., "Highly simplified device for ultrashort-pulse measurement" Optics Letter/vol. 26, No. 12/Jun. 15, 2001.

O.M. Sarkisov et al.; "Control of elementary chemical reactions by femtosecond light pulses"; Quantum Electronics, vol. 31, No. 6; 2001; pp. 483-488.

Ocean Optics Inc.; "HR4000 High-resolution Spectrometer" http://oceanoptics.com/products/hr4000.asp; Jun. 25, 2005 (p. 1 of 4-p. 4 of 4).

Ocean Optics Inc.; "S2000 Miniature Fiber Optic Spectrometer" http://oceanoptics.com/products/s2000.asp; Jun. 25, 2005 (p. 1 of 4-p. 4 of 4).

Ocean Optics Inc.; "USB2000 Miniature Fiber Optic Spectrometer" http://oceanoptics.com/products/usb2000.asp; Jun. 25, 2005 (p. 1 of 7-p. 6 of 7).

Ogilvie, Jennifer P., et al., "Use of coherent control for selective two-photon fluorescence microscopy in live organisms," Optical Society of America (Jan. 2006) 8 pages.

Ohno, Kimihisa, et al., "Adaptive pulse shaping of phase and amplitude of an amplified femtosecond pulse laser by direct reference to frequency-resolved optical gating traces," J. Opt. Soc. Am. B vol. 19, No. 11 (Nov. 2002) pp. 2781-2790.

Oron, Dan, et al., "Scanningless depth-resolved microscopy," Optics Express, vol. 13, No. 5 (Mar. 7, 2005).

Osborn, D.L. et al.; "Spectral and intensity dependence of spatially resolved two-photon conductivity defects on a GaAsP photodiode"; J. Appl. Phys 89; 2001; pp. 626-633.

P. Balling et al.; "Interference in climbing a quantum ladder system with frequency-chirped laser pulses"; Physical Review A, vol. 50, No. 5; Nov. 1994; pp. 4276-4285.

Panasenko, Dmitriy et al.; "Single-shot sonogram generation for femtosecond laser pulse diagnostics by use of two-photon absorbtion in a silicon CCD camera"; Optics Letters; vol. 27, No. 16; Aug. 15, 2002; pp. 1475-1477.

Pastirk, I. et al.; "2D (time-frequency) Femtosecond Four-Wave Mixing At $10^{14}$ W/cm$^2$: Molecular and Electronic Response;" Symposium on Optical Pulse and Beam Propagation III, Photonics West, 2001; 3 pages.

Pastirk, I. et al.; "Control and Characterization of Intramolecular Dynamics with Chirped Femtosecond Three-Pulse Four-Wave Mixing;" J. Phys. Chem. A, vol. 103, No. 49, Sep. 23, 1999; pp. 10226-10236.

Pastirk, I. et al.; "Femtosecond Ground State Dynamics of Gas Phase N2O4 and NO2," Chemical Physics letters, vol. 349, Nov. 23, 2001; pp. 71-78.

Pastirk, I. et al.; "Femtosecond Photo Echo and Virtual Echo Measurements of the Vibronic and Vibrational Coherence Relaxation Times of Iodine Vapor;" Chemical Physics Letters, vol. 333, Jan. 5, 2001; pp. 76-82.

Pastirk, I. et al; "Selective two-photon microscopy with shaped femtosecond pulses"; Opt. Express 11; 2003; pp. 1695-1701.

Pastirk, I., et al., "Multidimensional Analytical Method Based on Binary Phase Shaping of Femtosecond Pulses," J. Phys. Chem. A, vol. 109, No. 11, Feb. 23, 2005; pp. 2413-2416.

Pastirk, I., et al., "No loss spectral phase correction and arbitrary phase shaping of regeneratively amplified femtosecond pulses using MIIPS," Optics Express, vol. 14, No. 20, (Oct. 2, 2006) pp. 9537-9543.

Pastrik, I. et al., "Sequences for Controlling Laser Excitation with Femtosecond Three-Pulse Four-Wave Mixing;" The Royal Society of Chemistry, vol. 113, 1999; pp. 401-424.

Pastrik, I. et al; "Quantum Control of the Yield of a Chemical Reaction;" J. Chem. Phys., vol. 108, No. 11, Mar. 15, 1998; pp. 4375-4378.

Paul R. Bolton et al.; "Propagation of intense, ultrashort laser pulses through metal vapor: refraction-limited behavior for single pulses"; J. Opt. Soc. Am. B, vol. 13, No. 2; Feb. 1996; pp. 336-346.

Paye, J.; "How to Measure the Amplitude and Phase of an Ultrashort Light Pulse with an Autocorrelator and a Spectrometer"; IEEE Journal of Quantum Electronics, vol. 30, No. 11; Nov. 1994; pp. 2693-2697.

Peifang Tian et al.; "Ultrafast measurement of two-photon absorption by loss modulation"; Optics Letters, vol. 27, No. 18; Sep. 15, 2002; pp. 1634-1636.

Pelfang Tian et al., Femtosecond Phase-Coherent Two-Dimensional Spectroscopy, Science American Assoc. Adv. Sci. USA, vol. 300, No. 5625, Jun. 6, 2003, pp. 1553-1555.

Peng, L. W. et al.; "Stepwise Solvation of the Intramolecular-Charge-Transfer Molecule p-(Dimethylamino)benzonitrile;" J. Phys. Chem., 91, 1987, p. 6162.

Perry, Michael D., et al., "Terawatt to Petawatt Subpicosecond Lasers", Articles, (May 13, 1994), vol. 264, Science.

Pestov, Dimitry, et al., "Multiple Independent Comb Shaping (MICS): Phase-only generation of optical pulse sequences," Optics Express, vol. 17, No. 16 (Aug. 3, 2009) pp. 14351-14361.

Peter J. Delfyett et al.; "Joint Time-Frequency Meaurements of Mode-Locked Semiconductor Diode Lasers and Dynamics Using Frequency-Resolved Optical Gating"; IEEE Journal of Quantum Electronics, vol. 35, No. 4, Apr. 1999; pp. 487-500.

Pfeiffer, W., et al., "Ultrafast Spatio-Temporal Near-Field Control", IEEE 2005 European Quantum Electronics Conference, 0-7803-8973-5/05, (Jun. 2005) p. 169 (1 page).

Philip H. Bucksbaum; "Ultrafast control"; Nature magazine, vol. 421; Feb. 6, 2003; pp. 593-594. Kuhn & Weyn SR2 Sep. 4, 2001.

Photogen Technologies, Inc., "Photogen-Technology"; www.photogen.com/body/tech_body.html; Dec. 20, 2001 (19 pages).

PiStar Kinetic Circular Dichroism Spectrometer, http://www.phtophysics.com/pistar.php, Nov. 29, 2006; 3 pages.

Posthumus, J.H., "The dynamics of small molecules in intense laser fields," Reports on Progress in Physics, 67 (2004) Institute of Physics Publishing, pp. 623-665.

Postnikova, B.J. et al.; "Towards nanoscale three-dimensional fabrication using two-photon initiated polymerization and near-field excitation"; Microelectron. Eng. 69 (2-4); Sep. 2003; pp. 459-465.

Quiroga-Teixeiro, M.L., et al., "Compression of optical solitons by conversion of nonlinear modes", J. Opt. Soc. Am. B, vol. 12, No. 6, (Jun. 1995), pp. 1110-1116, Optical Society of America.

QWPO-AS, Zero Order Waveplates—Air Spaced, Optical Components and Assemblies, www.cvilaser.com, published Nov. 21, 2005; pp. 8-9.

R. Bartels et al., "Shaped-Pulse Optimization of Coherent Emission of High-Harmonic Soft X-Rays", 2000 Macmillan Magazines Ltd., Nature, vol. 406. Jul. 13, 2000, pp. 164-166.

R. deVivie-Riedle et al.; "Design and interpretation of laser pulses for the control of quantum systems"; Applied Physics B; 2000; pp. 285-292.

R. Netz et al.; "Coherent population dynamics of a three-level atom in spacetime"; Physical Review A, vol. 65; pp. 043406-1-043406-12.

R. Netz et al.; "Observation of Selectivity of Coherent Population Transfer Induced by Optical Interference"; Physical Review Letters, vol. 90, No. 6; Feb. 14, 2003; pp. 063001-1-063001-4.

R. Teets et al.; "Coherent Two-Photon Excitation by Multiple Light Pulses"; Physical Review Letters, vol. 38, No. 14; Apr. 4, 1977; lags. 760-764.

R. van Leeuwen et al.; "Coherent Control of the Energy and Angular Distribution of Autoionized Electrons"; Physical Review Letters, vol. 82, No. 14; Apr. 5, 1999; pp. 2852-2855.

R. van Leeuwen et al.; "Manipulation of differential electron yields via autoionizing wave-packet control"; Physical Review A, vol. 63; 2001; pp. 033403-1-033403-5.

R. Wolleschensky et al.; "Characterization and Optimization of a Laser-Scanning Microscope in the Femtosecond Regime;" Applied Physics B 67, Lasers and Optics, 1998; pp. 87-94.

R. Zadoyan et al.; "Wavepacket diagnosis with chirped probe pulses"; Chemical Physics, vol. 233; 1998; pp. 353-363.

R.A. Bartels et al.; "Nonresonant Control of Multimode Molecular Wave Packets at Room Temperature"; Physical Review Letters, vol. 88, No. 3; Jan. 21, 2002; pp. 033001-1 through 033001-4.

R.B. Vrijen et al.; "Limitations on quantum ladder climbing in complex systems"; Physical Review A, vol. 56, No. 3; Sep. 1997; pp. 2205-2212.

R.J. Levis et al.; "Closing the Loop on Bond Selective Chemistry Using Tailored Strong Field Laser Pulses"; The Journal of Physical Chemistry, vol. 106, No. 27; Jul. 11, 2002; pp. 6427-6444.

R.L. VanderWal et al.; "Selectively breaking the O-H bond in HOD"; J. Chem. Phys., vol. 92, No. 1; Jan. 1, 1990; pp. 803-805.

R.R. Jones et al.; "Bound-state interferometry using incoherent light"; J. Phys. B 28 At. Mol. Opt. Phys.; 1995; pp. L405-L411.

R.R. Jones et al.; "Ramsey Interference in Strongly Driven Rydberg Systems"; Physical Review Letters, vol. 71, No. 16; Oct. 18, 1993; pp. 2575-2578.

R.R. Jones; "Interference Effects in the Multiphoton Ionization of Sodium"; Physical Review Letters, vol. 74, No. 7; Feb. 13, 1995; pp. 1091-1094.

R.R. Jones; "Multiphoton Ionization Enhancement Using Two Phase-Coherent Laser Pulses"; Physical Review Letters, vol. 75, No. 8; Aug. 21, 1995; pp. 1491-1494.

Radoslaw Uberna et al.; "Phase and amplitude control in the formation and detection of rotational wave packets in the E1Eg state of Li2"; Journal of Chemical Physics, vol. 108, No. 22; pp. 9259-9274.

Radoslaw Uberna et al.; "Phase control of wavepacket dynamic using shape femtosecond pulses"; Faraday Discuss, vol. 113; 1999; pp. 385-400.

Radoslaw Uberna et al.; "Ultrafast spectroscopy of wavelength-dependent coherent photoionization cross sections of Li2 wave packets in the E1Eg state: The role of Rydberg states"; Journal of Chemical Physics, vol. 114, No. 23; Jun. 15, 2001; pp. 10311-10320.

Reid, D.T. et al.; "Amplitude and phase measurement of mid-infrared femtosecond pulses by using cross-correlation frequency-resolved optical gating"; Optics Letters, vol. 25, No. 19, Oct. 1, 2000; pp. 1478-1480.

Reitze, D.H., et al., "Shaping of wide bandwidth 20 femtosecond optical pulses", Appl. Phys. Lett. 61 (11), (Sep. 14, 1992), pp. 1260-1262, American Institute of Physics.

Richard M. Williams et al.; "Compositional control of rovibrational wave packets in the E(1 Eg) "shelf" state of Li2 via quantum-state-resolved intermediate state selection"; J. Chem. Phys. vol. 106, No. 20; May 22, 1997; pp. 8310-8323.

Richard N. Zare; "Laser Control of Chemical Reactions"; Science magazine, vol. 279; Mar. 20, 1998; pp. 1875-1879.

Richard S. Judson et al.; "Teaching Lasers to Control Molecules"; Physical Review Letters, vol. 68, No. 10; Mar. 9, 1992; pp. 1500-1503.

Robert J. Levis et al.; "Selective Bond Dissociation and Rearrangement with Optimally Tailored, Strong-Field Laser Pulses"; Science Magazine, vol. 292; Apr. 27, 2001; pp. 709-713.

Rodriguez, George, et al., "Coherent Ultrafast MI-FROG Spectroscopy of Optical Field Ionization in Molecular H2, N2, and O2," IEEE Journal on Selected Topics in Quantum Electronics, vol. 7, No. 4 (Jul./Aug. 2001) pp. 579-591.

Roger G.M.P. Koumans et al.; "Time-Resolved Optical Gating Based on Dispersive Propagation: A New Method to Characterize Optical Pulses"; IEEE Journal of Quantum Electronics, vol. 36, No. 2, Feb. 2000; pp. 137-144.

Rosker, M. J. et al.; "Femtosecond Clocking of the Chemical Bond;" Science, vol. 241, Sep. 2, 1988; pp. 1200-1202.

Rosker, M. J. et al.; "Femtosecond Real-Time Probing of Reactions. I. The Technique;" J. Chem. Phys., vol. 89, No. 10, Nov. 15, 1988; pp. 6113-6127.

Roth, M. et al., Acousto-Optic Femtosecond Pulse Shaping in the Ultraviolet, Lasers and Electro-Optics, 2005. (Cleo). Conference in Baltimore, Md., USA, May 22-27, 2005, Piscataway, NJ, USA. IEEE, May 22, 2005, pp. 2244-2246.

Roth, M. et al., Acousto-optical Shaping of Ultraviolet Femtosecond Pulses, Applied Physics B; Lasers and Optics, Springer-Verlag, BE, vol. 80, No. 4-5, Apr. 1, 2005, pp. 441-444.

Roy, I. et al; "Ceramic-based nanoparticles entrapping water-soluble photosensitizing drugs: A novel drug carrier system for photodynamic therapy"; J. Am. Chem. Soc. 125; 2003, pp. 7860-7865.

S. Backus et al.; "16-fs, 1-µ J ultraviolet pulses generated by third-harmonic conversion in air"; Optics Letters, vol. 21, No. 9; May 1, 1996; pp. 665-667.

S. Kovtoun et al.; "Mass-Correlated Pulsed Extraction : Theoretical Analysis and Implementation With a Linear Matrix-Assisted Laser Desorption/Ionization Time of Flight Mass Spectrometer;" Journal of the American Society for Mass Spectrometry, Elsevier Science Inc., vol. 11, 2000; pp. 841-853.

S. Meyer et al.; "Photoelectron distributions from femtosecond pump/probe excitation with chirped probe pulses"; Journal of Chemical Physics, vol. 108, No. 18; pp. 7631-7636.

S. Yeremenko et al.; "The criterion of pulse reconstruction quality based on Wigner representation"; Applied Physics B 70 (Suppl); 2000; pp. S109-S117.

S. Zhang, X. Zhang, J. Huang, L. Deng, Z. Sun, W. Zhang, Z. Wang, Z. Xu, R.Li, Coherent Enhancement of Broadband Frequency Up-Conversion in BBO Crystal by Shaping Femtosecond Laser Pulses, Optics Communications, ScienceDirect, 2006/2007, pp. 559-563.

S.E. Harris; "Control of Feshbach resonances by quantum interference"; Physical Review A66; 2002; pp. 010701-1-010701-4.

S.N. Pisharody et al.; "Phase-controlled stair-step decay of autoionizing radial wave packets"; Physical Review A, vol. 65; 2002; pp. 033418-1-033418-10.

Sanders, A. W. et al.: "Observation of Plasmon Propagation, Redirection, and Fan-Out in Silver Nanowires" Nano Letters, American Chemical Society, Washington, DC, US, vol. 6, No. 8, Jun. 28, 2006, pp. 1822-1826, XP007901978, ISSN: 1530-6984.

Sanislav S. Bychkov et al.; "Laser coherent control of molecular chiral states via entanglement of the rotational and torsional degrees of freedom"; Journal of Raman Spectroscopy; 2002; pp. 962-973.

Sarah M. Gallagher et al.; "Heterodyne detection of the complete electric field of femtosecond four-wave mixing signals"; J. Opt. Soc. Am. B, vol. 15, No. 8; Aug. 1998; pp. 2338-2345.

Sato, Masamichi, et al., "Adaptive Pulse Shaping of Femtosecond Laser Pulses in Amplitude and Phase Through a Single-Mode Fiber by Referring to Frequency-Resolved Optical Gating Patterns", Jpn. J. Appl. Phys., vol. 41 (200); Part 1 No. 6A, Jun. 2002; XP002436366; pp. 3704-3709.

Scaffidi, J., et al., "Spatial and Temporal Dependence of Interspark Interactions in Femtosecond-Nanosecond Dual Pulse Laser-Induced Breakdown Spectroscopy", Applied Optics, vol. 43, No. 27, Sep. 20, 2004, XP-002462408, pp. 5243-5250.

ScanMail 10K—Scanna; Internet publication from Safer America; 2003.

Schreier, F. et al.; "Femtosecond pulse shaping with a stratified diffractive structure"; Optics Communications 185; 2000; pp. 227-231.

Scott A. Diddams et al.; "Characterizing the Nonlinear Propagation of Femtosecond Pulses in Bulk Media"; IEEE Journal of Selected Topics in Quantum Electronics, vol. 4, No. 2; Mar./Apr. 1998; pp. 306-316.

Sebastien Zamith et al.; "Observation of Coherent Transients in Ultrashort Chirped Excitation of an Undamped Two-Level System"; Physical Review Letters, vol. 87, No. 3; Jul. 16, 2001; pp. 033001-1-033001-4.

Serbin, J., et al., "Femtosecond lasers as novel tool in dental surgery," applied surface science, 197-198 (2002) pp. 737-740.

Sergey Yeremenko et al.; "Frequency-resolved pump-probe characterization of femtosecond infrared pulses"; Optics Letters, vol. 27, No. 13; Jul. 1, 2002; pp. 1171-1173.

Sharman, W.M. et al.: "Targeted photodynamic therapy via receptor mediated delivery systems"; Adv. Drug Delivery Rev. 56(1); Jan. 2004; pp. 53-76.

Shimizu, Satoru, et al., "Spectral phase transfer for indirect phase control of sub-20-fs deep UV pulses," Optics Express, vol. 13, No. 17 (Aug. 22, 2005) pp. 6345-6353.

Siders, C.W., et al., "Blue-shifted third-harmonic generation and correlated self-guiding during ultrafast barrier suppression ionization of subatmospheric density noble gases," J. Opt. Soc. Am. B/vol. 13, No. 2 (Feb. 1996) pp. 330-335.

Spielmann, C. et al.; "Ultrabroadband Femtosecond Lasers"; IEEE Journal of Quantum Electronics; vol. 30, No. 4; Apr. 1994; pp. 1100-1114.

Spielmann, C., et al., "Ti: Sapphire Laser Produces Intense Sub-5-FS Pulses", Laser Focus World, May 97, vol. 33, Issue 5, p. 127.

Stobrawa, G. et al.; "A new high-resolution femtosecond pulse shaper"; Appl. Phys. B 72; 2001; pp. 627-630.

Stockman, Mark I. et al.; "Coherent Control of Femtosecond Energy Localization in Nanosystems;" Physical Review Letters, vol. 88, No. 6, Feb. 11, 2002; pp. 067402-1-067402-4.

Stuart A. Rice et al.; "Active control of product selection in a chemical reaction: a view of the current scene"; Phys. Chem. Chem. Phys.; 2002; pp. 1683-1700.

Stuart A. Rice; "Active Control of Molecular Dynamics: Coherence versus Chaos"; Journal of Statistical Physics, vol. 101, Nos. 1/2; 2000; pp. 187-212.

Stuart A. Rice; "Interfering for the good of a chemical reaction"; Nature magazine; vol. 409; Jan. 18, 2001; pp. 422-426.

Stuart A. Rice; "Optical control of reactions"; Nature magazine, vol. 403; Feb. 3, 2000; pp. 496-497.

Sullivan, A. et al.; "Quantitative investigation of optical phase-measuring techniques for ultrashort pulse lasers"; J. Opt. Soc. Am. B, vol. 13, No. 9; Sep. 1996; pp. 1965-1978.

Sun, H.B. et al.; "Two-photon laser precision microfabrication and its applications to micronano devices and systems"; J. Lightwave Technol. 21(3); Mar. 2003; pp. 624-633.

Surharev, Maxim et al.; "Coherent Control Approaches to Light Guidance in the Nanoscale;" The Journal of Chemical Physics 124, 2006; XP008086379; pp. 144707-1-144707-8.

Suzuki, Takayuki et al.; "Nontrivial Polarization Shaping of Femtosecond Pulses by Reference to the Results of Dual-Channel Spectral Interferomtry;" Applied Optics, vol. 43, No. 32, Nov. 10, 2004; pp. 6047-6050.

Sweetser, John N. et al.; "Transient-grating frequency-resolved optical gating"; Optics Letters, vol. 22, No. 8; Apr. 15, 1997; pp. 519-521.

Szipöcs, Robert, et al.; "Chirped multilayer coatings for broadband dispersion control in femtosecond lasers", Optics Letters, (Feb. 1, 1994), vol. 19, No. 3, Optical Society of America.

T. Brixner et al.; "Abstract—Femtosecond quantum control"; Advances in Atomic, Molecular, and Optical Physics, vol. 46; 46: 1-54; 2001 (1 page).

T. Brixner et al.; "Abstract-Photoselective adaptive femtosecond quantum control in the liquid phase"; Nature; 414 (6859): 57-60; Nov. 1, 2001 (1 page).

T. Brixner et al.; "Feedback-controlled optimization of amplified femtosecond laser pulses"; Applied Physics B 68; 1999; pp. 281-284.

T. Brixner et al.; "Generation and characterization of polarization-shaped femtosecond laser pulses"; Applied Physics B74 (Suppl), 2002; pp. S133-S144.

T. Brixner et al.; "Liquid-phase adaptive femtosecond quantum control: Removing intrinsic intensity dependencies"; Journal of Chemical Physics, vol. 118, No. 8; Feb. 22, 2003; pp. 3692-3701.

T. Brixner et al.; "Photoselective adaptive femtosecond quantum control in the liquid phase"; Nature magazine, vol. 414; Nov. 2001; pp. 57-60.

T. Brixner et al.; "Problem complexity in femtosecond quantum control"; Chemical Physics 267; 2001; pp. 241-246.

T. Feurer et al.; "Measuring the temporal intensity of ultrashort laser pulses by triple correlation"; Appl. Phys. B; 1998; pp. 163-168.

T. Frohnmeyer et al.; "Femtosecond pump-probe photoelectron spectroscopy on Na2: a tool to study basic coherent control schemes"; Applied Physics B 71; 2000; pp. 259-266.

T. Hornung et al.; "Optimal control of one- and two-photon transitions with shaped femtosecond pulses and feedback"; Applied Physics B 71; 2000; pp. 277-284.

T. Kobayashi et al.; "Tunable visible and near-infrared pulse generator in a 5 fs regime"; Appl. Phys. B 70 (Suppl); 2000; pp. S239-S246.

T. Okada et al.; "Optical control of two-photon excitation efficiency of a-perylene crystal by pulse shaping"; Amer. Inst. of Phys., vol. 121, No. 13; Oct. 1, 2004; pp. 6386-6391.

T. Tanabe et al.; "Compensation for a Transfer Function of a Regenerative Amplifier to Generate Accurately Shaped Ultrashort Pulses in Both the Amplitude and Phase"; IEE J. of Selected Topics in QUantum Elecronics, vol. 10, No. 1; Jan./Feb. 2004; pp. 221-228.

T. Witte et al.; "Controlling molecular ground-state dissociation by optimizing vibrational ladder climbing"; Journal of Chemical Physics, vol. 118, No. 5; Feb. 1, 2003; pp. 2021-2024.

T.C. Weinacht et al.; "Coherent learning control of vibrational motion in room temperature molecular gases"; Chemical Physics Letters 344; 2001; pp. 333-338.

T.C. Weinacht et al.; "Measurement of the Amplitude and Phase of a Sculpted Rydberg Wave Packet"; Physical Review Letters; vol. 80, No. 25; Jun. 22, 1998; pp. 5508-5511.

T.C. Weinacht et al.; "Toward Strong Field Mode-Selective Chemistry"; J. Phys. Chem. A, vol. 103, No. 49; 1999; pp. 10166-10168.

T.C. Weinacht et al.; "Using feedback for coherent control of quantum systems"; Journal of Optics B: Quantum and Semiclassical Optics; 2002; pp. R35-R52.

Tada, Junji, "Adaptively controlled supercontinuum pulse from a microstructure fiber for two-photon excited fluorescence microscopy," Applied Optics, vol. 46, No. 15, (May 20, 2007) pp. 3023-3030.

Tamaki, Y., "Phase-matched third-harmonic generation by nonlinear phase shift in a hollow fiber," Lasers and Optics Applied Physics B, vol. 67, (1998) pp. 59-63.

Thanopulos I. et al: Laser-Driven Coherent Manipulation of Molecular Chirality, Chemical Physics Letters Elsevier Netherlands, vol. 390, No. 1-3, May 21, 2004, pp. 228-235.

Thomas Hornung et al.; "Teaching optimal control theory to distill robust pulses even under experimental constraints"; Physical Review A, vol. 65; 2002; pp. 021403-1-021403-4.

Thomas J. Dunn et al.; "Experimental Determination of the Dynamics of a Molecular Nuclear Wave Packet via the Spectra of Spontaneous Emission"; Physical Review Letters, vol. 70, No. 22; May 31, 1993; pp. 3388-3391.

Ting, A., et al.; "Remote Atmospheric Breakdown for Standoff Detection by Using an Intense Short Laser Pulse," Applied Optics. Opt. Soc. America, USA, vol. 44, No. 25, XP002476098, Sep. 1, 2005; pp. 5315-5320.

Tomizawa H. et al., Development of Automatically Optimizing System of Both Spatial and Temporal Beam Shaping for UV-Laser Pulse, Proceedings of the SPIE—The International Society for Optical Engineering SPIE—Int. Soc. Opt. Eng USA, vol. 5481, No. 1, 2004, pp. 47-55.

Trebino, R. et al; "Measuring Ultrashort Laser Pulses Just Got a Lot Easier!"; Optics & Photonics News; Jun. 2001; pp. 22-25.

Trebino, Rick et al.; "Measuring ultrashort laser pulses in the time-frequency domain using frequency-resolved optical gating"; Rev. Sci. Instrum. 68 (9); Sep. 1997; pp. 3277-3295.

Trebino, Rick et al.; "The Dilemma of Ultrashort-Laser-Pulse Intensity and Phase Measurement and Applications"; IEEE Journal of Quantum Electronics, vol. 35, No. 4; Apr. 1999; pp. 418-420.

Trebino, Rick, et al., "Using phase retrieval to measure the intensity and phase of ultrashort pulses: frequency-resolved optical gating", J. Opt. Soc. Am. A, vol. 10, No. 5, (May 1993), pp. 1101-1111, Optical Society of America.

Tull, J.X. et al.; "High-Resolution, Ultrafast Laser Pulse Shaping and Its Applications"; Advances in Magnetic and Optical Resonance; vol. 20; 1997; pp. 1-65.

Tzu-Ming Liu et al.; "Triple-optical autocorrelation for direct optical pulse-shape measurement"; Applied Physics Letters, vol. 81, No. 8; Aug. 19, 2002; pp. 1402-1404.

Umstadter, D., et al., "Nonlinear Plasma Waves Resonantly Driven by Optimized Laser Pulse Trains", Physical Review Letters, vol. 72, No. 8, (Feb. 21, 1994), pp. 1224-1227, The American Physical Society.

Urbasch, Gunter, et al., "Distinctino of ortho- and para-Xylene by Femtosecond-Laser Mass Spectrometry," Communications, ChemPhysChem vol. 8 (2007) Wiley-VCH Verlag GmbH&Co. KGaA, Weinheim, pp. 2185-2188.

V. Engel et al; "Two-photon wave-packet interferometry"; J. Chem Phys. 100 (8); Apr. 15, 1994; pp. 5448-5458.

V. Kabelka et al.; "Time-frequency imaging of a single ultrashort light pulse from anularly resolved autocorrelation"; Optics Letters, vol. 20, No. 1; Jun. 1, 1995; pp. 1301-1303.

V. Prokhorenko et al.; "Coherent control of the population transfer in complex sovated molecules at weak excitation. An experimental study"; The J. of Chem. Phys., 122; 2005; 184502-1-184502-11.

V.A. Apkarian; 'Comment on "Time-resolved laser induced harpoon reactions"'; J. Chem. Phys. vol. 106, No. 12; Mar. 22, 1997; pp. 5298-5299.

V.L. da Silva et al.; "Nonlinear pulse shaping and causality"; Optics Letters, vol. 18, No. 8; Apr. 15, 1993; pp. 580-582.

V.M. Akulin et al.; "Laser Control of Atomic Motion inside Diatomic Molecules"; J. Phys. Chem. A, vol. 102, No. 23; 1998; pp. 4310-4320.

V.S. Malinovsky et al.; "General theory of population transfer by adiabatic rapid passage with intense, chirped laser pulses"; The European Physical Journal D 14; 2001; pp. 147-155.

Valerie Blanchet et al.; "One-color coherent control in Cs2 Observation of 2.7 fs beats in the ionization signal"; Chemical Physics Letters, vol. 233; Feb. 25, 1995; pp. 491-499.

Valerie Blanchet et al.; "Temporal coherent control in the photoionization of Cs2: Theory and experiment"; Journal of Chemical Physics, vol. 108, No. 12; Mar. 22, 1998; pp. 4862-4876.

Valerie Blanchet et al.; "Temporal Coherent Control in Two-Photon Transitions: From Optical Interferences to Quantum Interferences"; Physical Review Letters, vol. 78, No. 14; Apr. 7, 1997; pp. 2716-2719.

VandenBout, D.A. et al.; "Discrete intensity jumps and intramolecular electronic energy transfer in the spectroscopy of single conjugated polymer molecules"; Science 277; 1997; pp. 1074-1077.

Verluise, Frédéric, et al., "Arbitrary dispersion control of ultrashort optical pulses with acoustic waves," J. Opt. Soc. Am. B vol. 17, No. 1 (Jan. 2000) pp. 138-145.

Victor Wong et al.; "Analysis of ultrashort pulse-shape measurement using linear interferometers"; Optics Letters, vol. 19, No. 4; Feb. 15, 1994; pp. 287-289.

Victor Wong et al.; "Linear filter analysis of methods for ultrashort-pulse-shape measurements"; J. Opt.Soc. Am. B, vol. 12, No. 8; Aug. 1995; pp. 1491-1499.

Victor Wong et al.; "Ultrashort-pulse characterization from dynamic spectrograms by iterative phase retrieval"; J. Opt. Soc. Am. B, vol. 14, No. 4; Apr. 1997; pp. 944-949.

Vladimir Kalosha et al.; "Generation of Single Dispersion Precompensated 1-fs Pulses by Shaped-Pulse Optimized High-Order Stimulated Raman Scattering"; Physical Review Letters, vol. 88, No. 10; Mar. 11, 2002; pp. 103901-1-13901-4.

Vladislav V. Yakovlev et al.; "Chirped pulse enhancement of multiphoton absorption in molecular iodine"; Journal of Chemical Physics, vol. 108, No. 6, Feb. 8, 1998; pp. 2309-2313.

von Vacano, Bernhard, et al., "Shaper-assisted collinear SPIDER: fast and simple broadband pulse compression in nonlinear microscopy," vol. 24, No. 5, (May 2007) J. Opt. Soc. Am. B, pp. 1091-1100.

W. Wohlleben et al.; "Coherent Control for Spectroscopy and Manipulation of Biological Dynamics"; Chem. Phys. Chem., 6; 2005; pp. 850-857.

W.J. Walecki et al.; "Characterization of the polarization state of weak ultrashort coherent signals by dual-channel spectral interferometry"; Optics Letters, vol. 22, No. 2; Jan. 15, 1997; pp. 81-83.

W.M. Sharman et al.; "Photodynamic therapeutics: basic principles and clinical applications"; DDT, vol. 4, No. 11; Nov. 1991; pp. 507-517.

Walmsley, Ian A. et al.; "Characterization of the electric field of ultrashort optical pulses"; J. Opt. Soc. Am. B., vol. 13, No. 11; Nov. 1996; pp. 2453-2463.

Walowicz, K.A. et al.; "Multiphoton Intrapulse Interference 1: Control of Multiphoton Processes in Condensed Phases"; J. Phys. Chem A 106 (41); Oct. 17, 2002; pp. 9369-9373.

Waner, M. J. et al.; "Imaging the Molecular Dimensions and Oligomerization of Proteins At Liquid/Solid Interfaces;" J. Phys. Chem. B, vol. 102, No. 9; 1998; pp. 1649-1657.

Wang, He, et al., "Generation of 0.5 mJ, few-cycle laser pulses by an adaptive phase modulator," Optics Express, vol. 16, No. 19 (Sep. 15, 2008) pp. 14448-14455.

Warren, W.S., et al., "Coherent Control of Quantum Dynamics: the Dream is Alive", Articles, Science, (Mar. 12, 1993), vol. 259.

Warren, W.S.; "Chemistry with photons"; Science, vol. 262; Nov. 12, 1993; pp. 1008-1009.

Wefers, Marc M., "Programmable phase and amplitude femtosecond pulse shaping", Optics Letters (Dec. 1, 1993), vol. 18, No. 23, pp. 2032-2034.

Wefers, Marc, et al., "Generation of high-fidelity programmable ultrafast optical waveforms", Optics Letters, (May 1, 1995), vol. 20, No. 9, Optical Society of America.

Weinacht, T.C. et al.; "Controlling the shape of a quantum wavefunction"; Nature, vol. 397; Jan. 1999; pp. 233-235.

Weiner et al.; "Shaping of femtosecond pulses using phase-only filters designed by simulated annealing"; Journal of the Optical Society of America A (Optics and Image Science) USA, vol. 10, No. 5, May 1993; pp. 1112-1120.

Weiner, "Encoding and decoding of femtosecond pulses", Optics Letters, (Apr. 1988), vol. 13, No. 4, Optical Society of America.

Weiner, A.M. et al. "Generation of terahertz-rate trains of femtosecond pulses by phase-only filtering," Optics Letters, vol. 15, No. 1, Jan. 1, 1990, pp. 51-53.

Weiner, A.M. et al.; "Programmable Shaping of Femtosecond Optical Pulses by Use of 128-Element Liquid Crystal Phase Modulator"; IEEE Journal of Quantum Electronics; vol. 28, No. 4; Apr. 1992; pp. 908-920.

Weiner, A.M., "Enhancement of coherent charge oscillations in coupled quantum wells by femtosecond pulse shaping", J. Opt. Soc. Am. B, vol. 11, No. 12, (Dec. 1994), pp. 2480-2491, Optical Society of America.

Weiner, A.M., "Femtosecond Optical Pulse Shaping and Processing", Prog. Quant. Electr. (1995) vol. 19, pp. 161; 230-233.

Weiner, A.M., "Femtosecond pulse shaping using spatial light modulators," Review Article, Review of Scientific Instruments, vol. 71, No. 5 (May 2000) pp. 1929-1960.

Weiner, A.M., "High-resolution femtosecond pulse shaping", J. Opt. Soc. Am. B., vol. 5, No. 8, (Aug. 1988), pp. 1563-1572, Optical Society of America.

Weiner, A.M., "Programmable femtosecond pulse shaping by use of a multielement liquid-crystal phase modulator", Optics Letters, (Mar. 15, 1990), vol. 15, No. 6, pp. 326-328, Optical Society of America.

Weiner, A.M., "Spectral holography of shaped femtosecond pulses", Optics Letters, vol. 17, No. 3 (Feb. 1, 1992), pp. 224-226, Optical Society of America.

Weiner, A.M., et al., "Femtosecond multiple-pulse impulsive stimulated Raman scattering spectroscopy", J. Opt. Soc. Am. B., vol. 8, No. 6, (Jun. 1991), pp. 1264-1275.

Weiner, A.M.; "Femtosecond pulse shaping using spatial light modulators"; Rev. Sci. Instrum. vol. 71(5); 2000; pp. 1929-1960.

Weiner, Andrew M. et al.; "Femtosecond Pulse Shaping for Synthesis, Processing and Time-to-Space Conversion of Ultrafast Optical Waveforms"; IEEE Journal of Selected Topics in Quantum Electronics; vol. 4, No. 2; Mar./Apr. 1998; pp. 317-331.

Weiner, Andrew M., Programmable Shaping of Femtosecond Optical Pulses by Use of 128-Element Liquid Crystal Phase Modulator, (1992) vol. 28, No. 4, pp. 908-919, IEEE Journal of Quantum Electronics.

Wnuk, Pawel, et al., "Coherent control and dark pulses in second harmonic generation," Optics Communications 272, ScienceDirect (2007) pp. 496-502.

Wolfgang Kiefer et al.; "Femtosecond time-resolved spectroscopy of elementary molecular dynamics"; Naturwissenschaften; 2002; pp. 250-258.

Wollenhaupt, M. et al.; "Femtosecond Laser Photoelectron Spectroscopy on Atoms and Small Molecules: Prototype Studies in Quantum Control;" Annu. Rev. Phys. Chem., 56, 2005; pp. 25-56.

Wu, C. et al., Mass and Photoelectron Spectrometer for Studying Field-Induced Ionization of Molecules, International Journal of Mass Spectrometry, Elsevier Science Publishers, Amsterdam, NL, vol. 216, No. 3, May 15, 2002, pp. 249-255.

Wu, Chengyin et al., Laser-Induced Dissociation and Explosion of Methane and Methanol, J. Phys. B. At. Mol. Opt. Phys; Journal of Physics B: Atomic, Molecular and Optical Physics, Jun. 14, 2002, vol. 35, No. 11, pp. 2575-2582.

X. Chen et al.; "Temporally and spectrally resolved amplitude and phase of coherent four-wave-mixing emission from GaAs quantum wells"; Physical Review B, vol. 56, No. 15; Oct. 15, 1997; pp. 9738-9743.

Xu, B et al.; "Quantitative Investigation of the Multiphoton Intrapuse Interference Phase Scan Method for Simultaneous Phase Measurement and Compensation of Femtosecond Laser Pulses;" J. Opt. Soc. Am. B, vol. 23, No. 4, Apr. 2006; pp. 750-759.

Xu, C. et al.;"Two photon optical beam induced current imaging through the backside of integrated circuits"; Appl. Phys. Lett. 71; 1997; pp. 2578-2580.

Xu, J.H., et al., "Study of Pulse Compression from 1.5 µm Distributed Feedback Lasers by a Gires-Tournois Interferometer", Fiber and Integrated Optics, vol. 13, (1994), pp. 365-372.

Y. Ding et al.; "Time-Domain Image Processing Using Dynamic Holography"; IEEE Journal of Selected Topics in Quantum Electronics, vol. 4, No. 2; Mar./Apr. 1998; pp. 332-341.

Y. Oishi, A. Suda, F. Kannari, K. Midorikawa, Intense Femtosecond Pulse Shaping Using a Fused-Silica Spatial Light Modulator, Optics Communications, ScienceDirect, 2006/2007, pp. 305-309.

Y.J. Yan et al.; "Pulse shaping and coherent Raman spectroscopy in condensed phases"; J. Chem. Phys 94 (2); Jan. 15, 1991; pp. 997-1001.

Yan, Y.J. et al.; "Electronic dephasing, vibrational relaxation, and solvent friction in molecular nonlinear optical line shapes"; J. Chems. Phys.; Oct. 15, 1988; pp. 5160-5176.

Yang, W. et al.; "High-ratio Electro-optical Data Compression for Massive Accessing Networks Using AOM-based Ultrafast Pulse Shaping"; Journal of Optical Communications; vol. 22, No. 1; 2001; pp. 694-697.

Yaron Silberberg; "Physics at the attosecond frontier"; Nature, vol. 414, Nov. 29, 2001; pp. 494-495.

Yelin, D. et al.; "Laser scanning third-harmonic-generation microscopy in biology"; Optics Express; vol. 5, No. 8; Oct. 11, 1999; pp. 169-175.

Yoshihiro Takagi et al.; "Multiple- and single-shot autocorrelator based on two-photon conductivity in semiconductors"; Optics Letters, vol. 17, No. 9; May 1, 1992; pp. 658-660.

Yu, Huang, et al., Application of Adaptive Feedback Loop for Ultra-Violet Femtosecond Pulse Shaper Control, Optics Express Opt. Soc. America USA, vol. 14, No. 21, Oct. 2006.

Yu-Chen Shen et al.; "What can short-pulse pump-probe spectroscopy tell us about Franck-Condon dynamics?"; Journal of Chemical Physics, vol. 110. No. 20; May 22, 1999; pp. 9793-9806.

Yu-hui Chiu et al.; "Vibrational mode effects, scattering dynamics and energy disposal in reaction of C2H2 with methane"; J. Chem. Phys., vol. 102, No. 3; Jan. 15, 1995; pp. 1199-1216.

Yuri T. Mazurenko; "Spectral Holography and Spectral Nonlinear Optics of Ultrashort Pulses"; Journal of the Chinese Chemical Society, vol. 47, No. 4A; 2000; pp. 679-683.

Z.W. Shen et al.; "Selective preparation of ground state wave-packets: a theoretical analysis of femtosecond pump-dump-probe experiments on the potassium dimmer"; The European Physical Journal D 14; 2001; pp. 167-172.

Zang, Hegui, et al., "Study on Frequency-doubling Effect of the Dually Doped KTP Crystals," Journal of Synthetic Crystals vol. 29, No. 2 (May 2000).

Zeek, Erik; "Pulse Shaping for High-Harmonic Generation;" Dissertation Submitted in Partial Fulfillment of the Requirements for the Degree of Doctor of Philosophy (Applied Physics) in the University of Michigan, 2000; 126 pages.

Zeidler, D. et al.; "Adaptive compression of tunable pulses from a non-colinear-type OPA to below 16 fs by feedback-controlled pulse shaping"; Appl. Phys. B 70 (Suppl); 2000; pp. S125-S131.

Zhang, Q. et al.; "Concerted Elimination Dynamics From Highly Excited States;" Faraday Discussions, 108, 1997; pp. 63-80.

Zhang, Q. et al.; "Femtosecond Dynamics of Photoinduced Molecular Detachment From Halogenated Alkanes. II. Asynchronous Concerted Elimination of $I_2$ From $CH_2I_2$;" J. Chem. Phys., vol. 109, No. 11, Sep. 15, 1998; pp. 4428-4442.

Zheng, Z. et al. "Spectral phase correlation of coded femtosecond pulses by second-harmonic generation in thick nonlinear crystals"; Opt. Lett. 25; 2000; pp. 984-986.

Zheng, Z. et al.; "Coherent control of second harmonic generation using spectrally phase coded femtosecond waveforms"; Chem. Phys. 267; 2001; pp. 161-171.

Zhenwen Shen et al.; "Pump-dump control and the related transient absorption spectroscopies"; Journal of Chemical Physics, vol. 110, No. 15; Apr. 15, 1999; pp. 7192-7201.

Zhou, Jianping, et al., "Generation of 21-fs millijoule-energy pulses by use of Ti:sapphire", Optics Letters, vol. 19, No. 2, (Jan. 15, 1994), pp. 126-128, Optical Society of America.

Zipfel, W.R. et al; "Nonlinear magic: multiphoton microscopy in the biosciences"; Natire Biotechnology, 121 (11); Nov. 2003; pp. 1369-1377.

Zohar Amitay et al.; "Phase-tailoring molecular wave packets to time shift their dynamics"; Chemical Physics 267; 2001; pp. 141-149.

Zeek, E. et al., "Pulse Compression by Use of Deformable Mirrors," Optics Letters, OSA, Optical Society of America, vol. 24, No. 7, Apr. 1, 1999, pp. 493-495.

Sardesai, H et al. "A Femtosecond Code-Division Multiple-Access Communication System Test Bed," Journal of Lightwave Technology, IEEE Service Center, vol. 16, No. 11, Nov. 1, 1998, p. 1953-1964.

"Coherent® Silhouette, Ultrafast Pulse Shaper," Key Features brochure. Web. Jan. 29, 2008 http://www.coherent.com/Lasers/index.cfm?Fuseaction=show.print&ID=1485.

"Coherent® Silhouette, Ultrafast Pulse Shaping and Measurement," brochure, (2007) 2 pages. Coherent, Inc.

Takasago, Kazuya, et al., "Design of Frequency-Domain Filters for Femtosecond Pulse Shaping," Part 1, No. 2A (Feb. 1996)pp. 624-629. Jpn. J. Appl. Phys.

Fowles, "Introduction to Modern Optics," 1989, Dover 2e, pp. 2-19.

Ogawa et al, Dependence of the Laser Two-Photon Ionization Process in Solution on the Laser Pulse Width, Analytical Chemistry, vol. 73, Mar. 20, 2001, pp. 2066-2069.

* cited by examiner

DIRECT ULTRASHORT LASER SYSTEM

CROSS REFERENCE TO RELATED APPLICATIONS

This application claims priority to U.S. Provisional Application Ser. No. 61/015,976, filed Dec. 21, 2007, which is incorporated by reference herein.

STATEMENT OF GOVERNMENT INTEREST

A portion of this invention was made with U.S. Government support under Major Research Instrumentation grant CHE-0421047 awarded by the National Science Foundation. The U.S. Government may have certain rights in this invention.

BACKGROUND AND SUMMARY

The present invention generally relates to laser systems and more particularly to a direct ultrashort laser system.

Recent ultrashort laser devices use optimization calculation approaches for pulse compression that do not require phase measurement, and that are able to characterize the phase after pulse compression, provided a calibrated pulse shaper is used. Pulse shapers such as an adaptive, pixelated SLM, traditional MEMS deformable membrane mirror, and a Dazzler acousto-optic crystal, and the related components, however, can be relatively expensive. Additionally, the ability to measure and correct the spectral phase of a laser becomes more challenging as the spectral bandwidth increases, such as for a sub-5 femtosecond duration pulse.

A challenge in ultrashort pulse characterization is the accurate measurement of abrupt (discontinuous) phase changes that may be introduced by pulse shapers and to some extent by dieletric optics. The curvature of the phase changes that can be measured by Multiphoton Intrapulse Interference Phase Scan ("MIIPS") increases with the optical resolution of the pulse shaper being used. For example, a $\pi$-phase step to be accurately measured using 10 or 100 nm FWHM pulses and a 640 pixel pulse shaper should have a run longer than 0.15 or 1.5 nm, respectively. Another issue is that the minimum amount of chirp that can be measured increases for narrower bandwidths. For example, the uncertainty of a $\phi(\omega)$ measurement for pulses spanning 10 or 100 nm FWHM would be ~±500 or ±5 $fs^2$, respectively. When MIIPS is implemented by using a spatial light modulator ("SLM")-based pulse shaper, the maximum phase delay that can be introduced limits the measurable phase range. By phase wrapping and double passing the SLM, maximum delays of up to 1000 rad are possible. Furthermore, noteworthy improvements in laser pulse control are disclosed in U.S. Patent Publication No. 2006/0056468 entitled "Control System and Apparatus For Use With Ultra-Fast Laser," and PCT International Application Serial No. PCT/US07/24171 filed on Nov. 16, 2007 entitled "Laser System Employing Harmonic Generation," both of which were invented by Marcos Dantus et al. and are incorporated by reference herein.

In accordance with the present invention, a direct ultrashort laser system is provided. In another aspect of the present invention, a method of measuring laser pulse phase distortions is performed using passive optics, such as a prism-, grating- or prism-pair arrangement, and without requiring an adaptive pulse shaper or overlap between two or more beams. In another aspect of the present invention, a method for directly displaying the second derivative of the spectral phase distortions is performed without requiring a pulse shaper, overlap between two or more beams or an interferometer. In yet another aspect of the present invention, a system, a method of operating, a control system, and a set of programmable computer software instructions perform Multi-photon Intrapulse Interference Phase Scan processes, calculations, characterization and/or correction without requiring a spatial light modulator or such other expensive, adaptive pulse shaper. Furthermore, another aspect of the present invention employs methods, control systems and software instructions for calculating, measuring and/or characterizing an unknown phase distortion of a laser beam through use of the second derivative of the spectral phase and/or using a series of second harmonic spectra obtained under different chirp conditions to determine the spectral phase distortion. A further aspect of the present invention provides for automatic, real time and computer-controlled adjustment of optics associated with a femtosecond laser, stretcher and/or compressor to compensate for phase distortions based on calculations and/or measurements of the spectral phase distortions in ultrashort laser beam pulses without the use of a pulse shaper. Additionally, another aspect of the present invention allows for directly measuring the second derivative of an unknown phase.

The direct ultrashort laser system of the present invention is advantageous over conventional devices in that the present invention system is considerably less expensive to implement. For example, in certain embodiments, traditional optical hardware can be employed without expensive pulse shapers, or separate optical devices such as FROG or SPIDER, but will still allow for accurate measurement and/or characterization of otherwise unknown phase distortions within the laser pulse. This system can then be upgraded in a relatively easy manner by providing for higher level calculations of the measured phase distortions. Moreover, the system can be further upgraded to provide automatically controlled adjustments and compensation for the measured and/or characterized phase distortions to essentially eliminate undesired distortions. Accordingly, a low cost, easily upgradable and easy to practically implement system is achieved, while also providing excellent accuracy of results. For example, a non-adaptive and passive phase adjustable mirror is a reflective macroscopic optic which does not employ pixelation. By way of another example, a non-adaptive and passive pulse shaper has a single bendable optic. A further example of a non-adaptive and passive pulse shaper includes a manually adjustable actuator(s) that is not voltage driven. Such an optic is very efficient and is expected to return greater than 95% of the incident light (excluding other components such as gratings). In another example, a non-adaptive and passive pulse shaper has a single adjustable parameter. Furthermore, a piezoelectric actuator provides an additional exemplary non-adaptive and passive pulse shaper. Additional advantages and features of the present invention will become apparent from the following description and appended claims, taken in conjunction with the accompanying drawings.

DETAILED DESCRIPTION

Figure 1A:
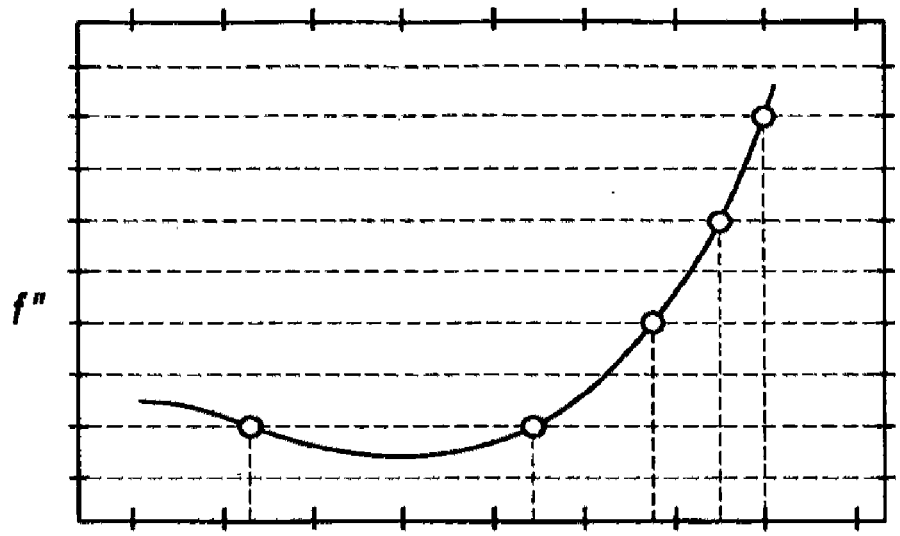
FIGS. 1(a) and 1(b) are a set of graphical plots showing expected data for the present invention.

An ultrashort laser system of the present invention employs an intuitive single-beam pulse characterization method that provides an accurate and direct measurement of the spectral phase of ultrashort laser pulses. In one aspect, the method requires the successive imposition of a set of quadratic spectral phase functions on the pulses while recording the corresponding nonlinear spectra. The second-derivative of the unknown spectral phase can be directly visualized and extracted from the experimental 2D contour plot constructed from the series of spectra, without the need of an inversion algorithm or mathematical manipulation. In other words, a number of MIIPS implementations for directly measuring $\phi''(\omega)$ without relying on phase retrieval algorithms are achieved with the present invention. Data acquisition for MIIPS does not require autocorrelation, interferometry, or even a computer-controlled pulse shaper. Once phase distortions are measured, it is straightforward to compensate the measured phase distortions using a passive phase adjustable mirror. Compensation of phase distortions at the target is desirable for reproducible femtosecond laser applications.

A spectral phase measurement should be simple, direct and insensitive to noise. Nonlinear optical ("NLO") processes are sensitive to the second derivative of the phase because of multiphoton intrapulse interference. In keeping with the above requirements, the direct measurement of the second derivative of an unknown phase $\phi''(\omega)$ is considered.

MIIPS spectral phase measurements are obtained without the use of an adaptive pulse shaper such as an SLM. Instead, the reference functions $f''(\omega,p)$ are introduced using standard passive optics, such as a prism-, grating- or prism-pair arrangement. Different amounts of linear chirp are introduced to amplified pulses using the built-in compressor in the regenerative amplifier by varying the spacing between the grating pair. As illustrated in FIG. 1(b), the measured linear $\phi''(\omega)$ dependence indicates the presence of a cubic phase distortion, also known as TOD, which is not eliminated.

The effect of the different terms of a Taylor expansion of the spectral phase $\phi(\omega)$ on the time profile of an ultrashort pulse are:

$$\phi(\omega)=\phi_0+\phi_1(\omega-\omega_0)+\tfrac{1}{2}\phi_2(\omega-\omega_0)^2+\tfrac{1}{6}\phi_3(\omega-\omega_0)^3 \quad (1)$$

The zeroth order phase $\phi_0$ (sometimes called absolute phase) determines the relative position of the carrier wave with respect to the pulse envelope. In most cases, the term $\phi_0$ is of little interest. This is due to the fact that when the pulse is many carrier-wave cycles long, which is the most common situation, a change in $\phi_0$ has a very small effect on the pulse field. None of the pulse characterization methods mentioned in this paper are able to measure the zeroth order phase. The first order phase $\phi_1$ corresponds to a shift of the pulse envelope in time. Given that the interest is typically centered on the pulse shape and not on the arrival time of the pulse, the $\phi_1$ term is also of little interest. The second and higher order terms do have an effect on the time profile of the pulses. Therefore, the second derivative of the spectral phase $\phi''(\omega)$ is the parameter that determines the pulse shape.

MIIPS measures $\phi''(\omega)$ by successively imposing a set of parametrized (p) reference spectral phases $-f(\omega,p)$ to the pulses with unknown phase distortion $\phi(\omega)$ and acquiring the corresponding NLO spectra, for example SHG. In the second derivative space, the set of reference functions $f''(\omega,p)$ can be visualized as a grid used to map the unknown $\phi''(\omega)$, i.e., to find which $f''(\omega,p)$ intersects $\phi''(\omega)$ at any desired frequency $\omega_i$;

$$\phi''(\omega_i)=f''(\omega_i,p_{max}). \quad (2)$$

Note that for each such point the reference function cancels the local chirp and, therefore, the NLO signal is maximized at $\omega_i$; hence the required parameter is labeled $p_{max}$.

Figure 1B:
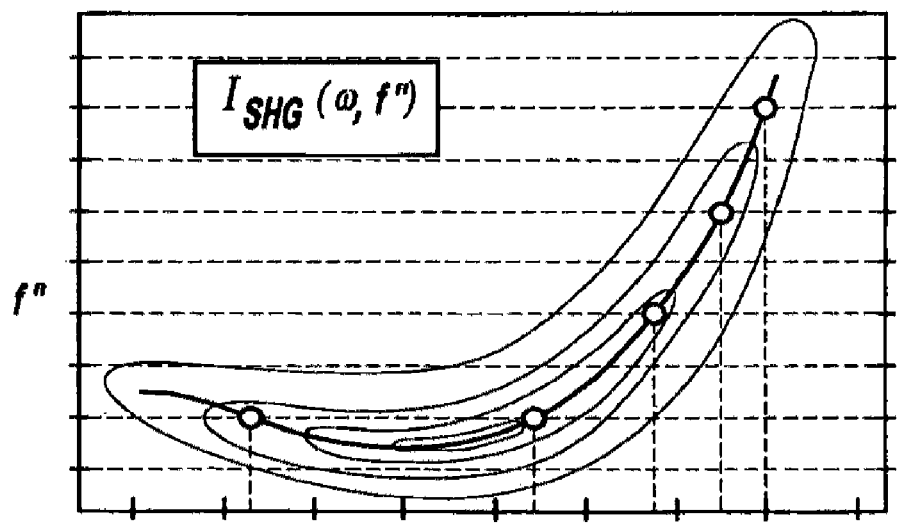

FIG. 1 illustrates a set of reference functions $f''(\omega,p)$ which provides a reference grid that is used to map the unknown $\phi''(\omega)$ in a programmable controller. FIG. 1a shows a conceptual diagram based on a horizontal reference grid (dashed lines) corresponding to different amounts of linear chirp. The solid curve represents the unknown $\phi''(\omega)$. FIG. 1b illustrates a MIIPS trace corresponding to a horizontal grid. Note that the unknown $\phi''(\omega)$ is directly revealed by the contour plot calculated by the controller.

The most simple grid for mapping the unknown second derivative of the phase in the controller consists of constant functions $f''(\omega,p)=p$, see FIG. 1a, which correspond to linear chirp. In this case, different amounts of linear chirp can be imposed on the pulses using passive or adaptive optics. For each reference phase, an NLO spectrum is plotted as a function of p in a two-dimensional contour map as shown in FIG. 1b. The feature of interest is $p_{max}(\omega)$, which can be visualized by drawing a line through the maxima in the contour plot, here the solid curve in FIG. 1b. The spectral phase information is directly obtained by finding $p_{max}(\omega)$ and using Equation (2). In the case of chirp MIIPS, Equation (2) reads $\phi''(\omega)=f''(\omega, p_{max})=p_{max}(\omega)$. Therefore, the unknown $\phi''(\omega)$ is directly obtained by the controller from the contour plot without any mathematical retrieval procedure as shown in FIG. 1b.

A MIIPS scan takes between 5 and 15 seconds depending on the device used to introduce the reference phases and the number of phases used. Although not necessary, an iterative measurement-compensation routine can be used to achieve the maximum possible accuracy, especially in the case of complex spectral phases. Double integration of the measured $\phi''(\omega)$ results in $\phi(\omega)$. Once $\phi(\omega)$ is obtained by the controller, the controller then causes the shaper to introduce $-\phi(\omega)$ by the shaper in order to eliminate the measured phase distortions to achieve TL pulses.

Figure 3A:
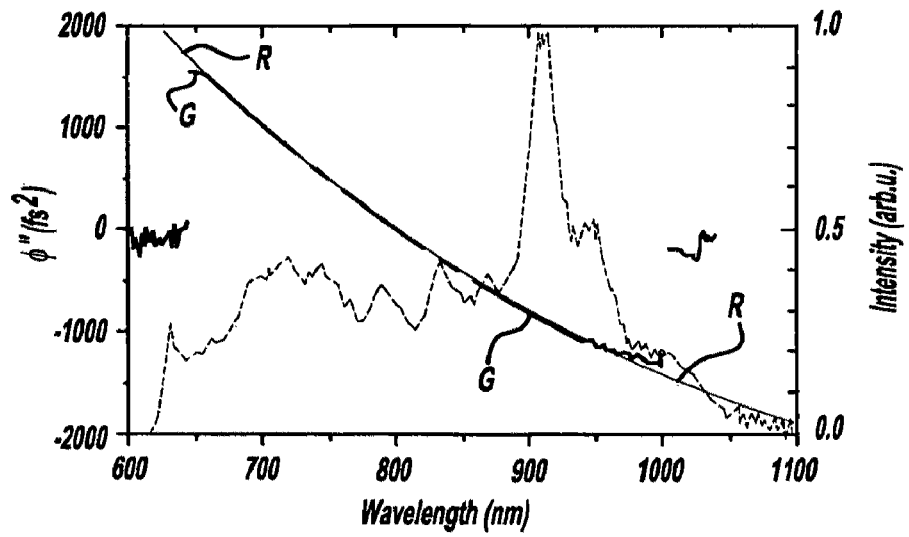
FIGS. 3(a) and (b) are graphical plots showing expected spectral phase measurements for the present invention.
Figure 3B:
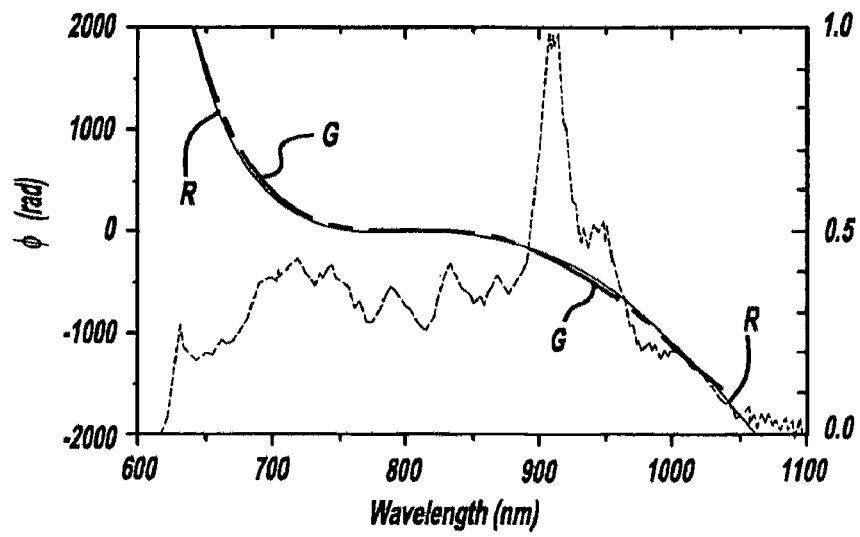
Figure 10A:
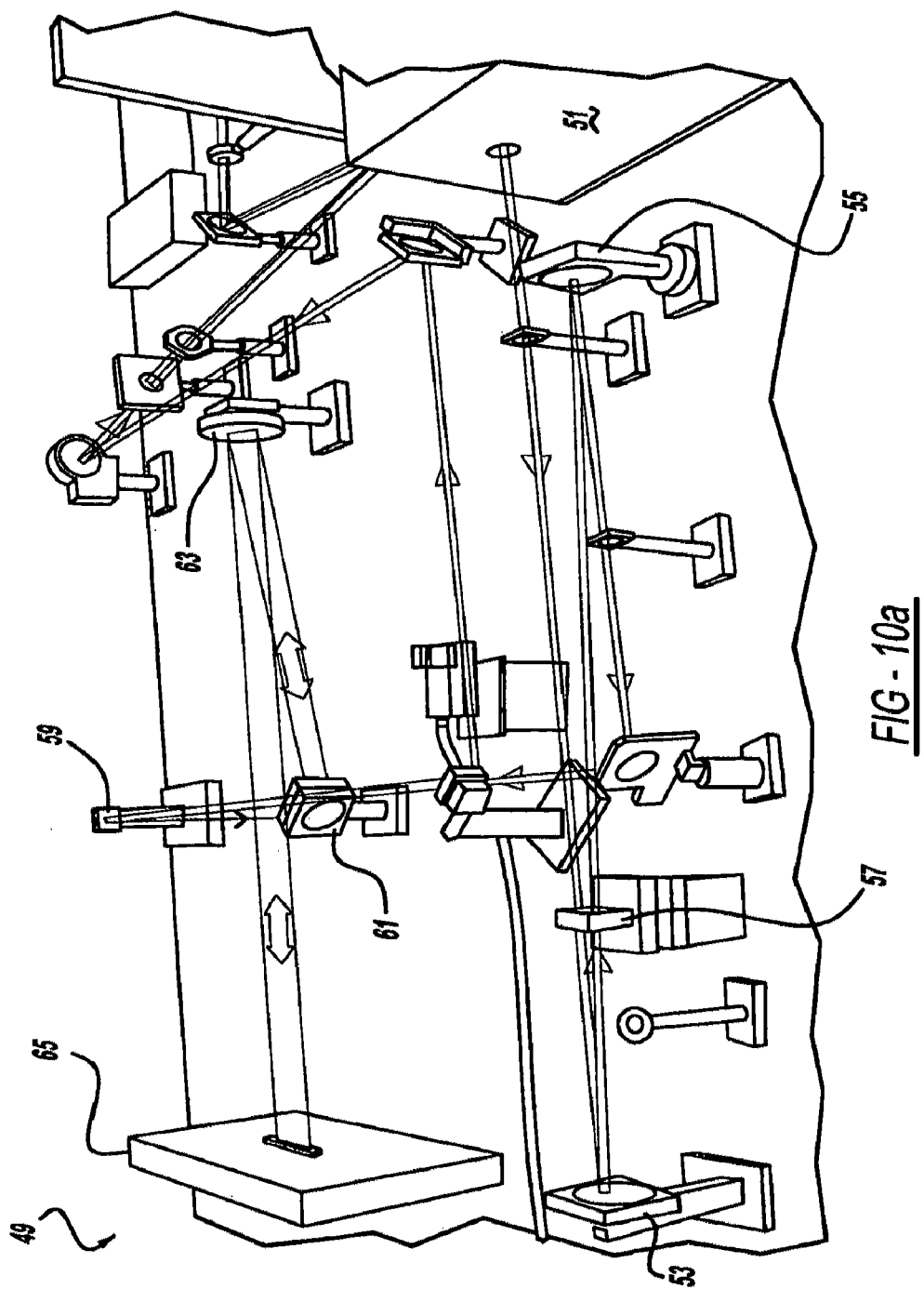
FIGS. 10a and 10b are perspective views showing the hardware for the present invention.
Figure 10B:
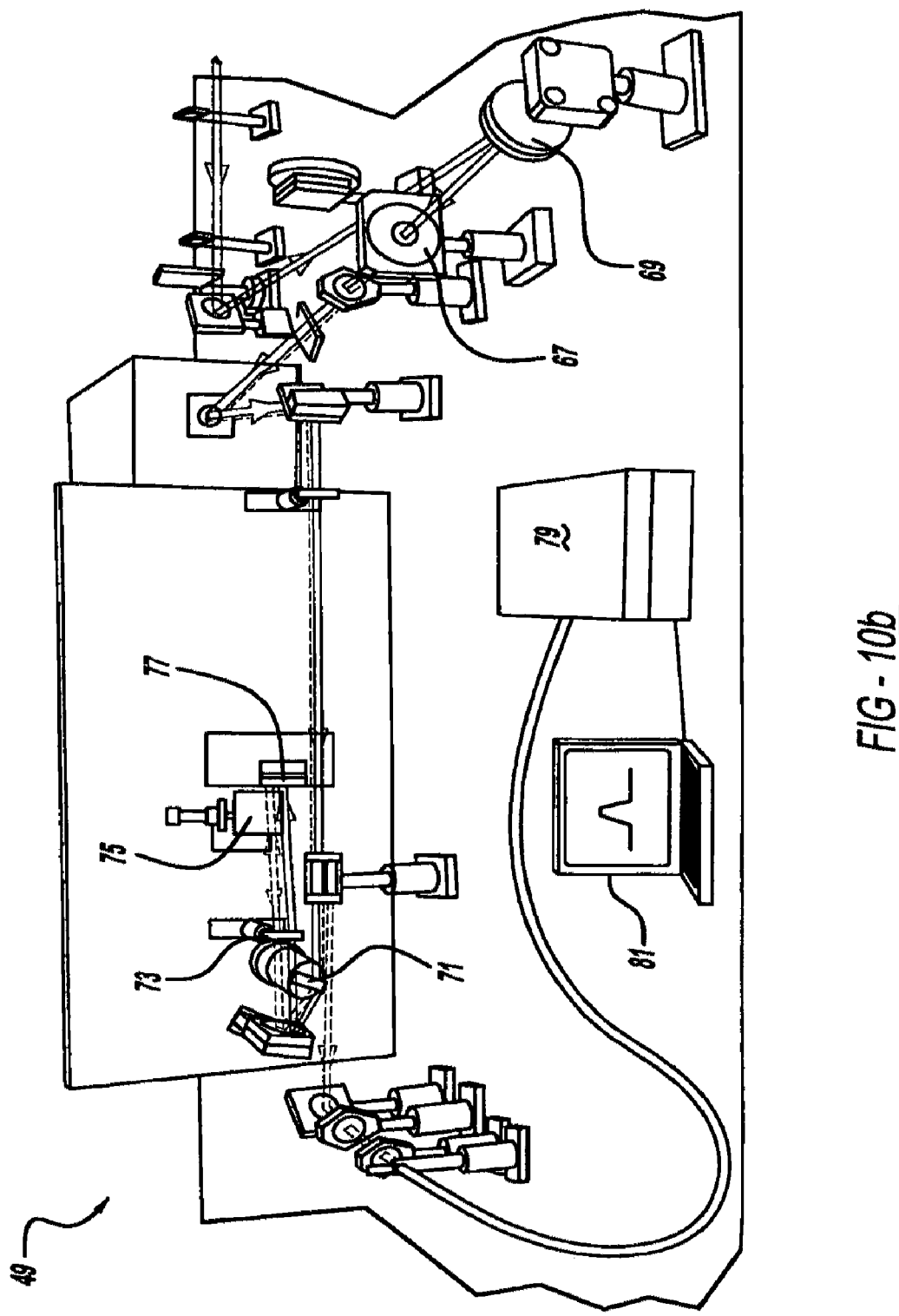

Example:

Referring to FIG. 3, an ultrabroad-bandwidth femtosecond Ti:Al$_2$O$_3$ laser oscillator with a double chirped mirror pair is used, whose spectrum spans 620-1050 nm and generates a SHG spectrum spanning almost 200 nm. The pulse shaper for introducing the spectral phase $-f(\omega)$ is a folded all-reflective grating-based system containing a 150-lines-per-mm grating, a 762-mm-focal-length spherical mirror, and a non-adaptive and passive optic that can be slightly bent so that its surface achieves the desired phase retardation upon reflecting the dispersed beam. After the shaper, the pulses are focused onto a 20-μm type-I KDP crystal, and the SHG signal is separated from the fundamental before it is directed to a spectrometer. A spectrometer model QE65000 from Ocean Optics Inc. would be satisfactory. FIG. 3 illustrates an expected spectral phase measurement. The introduced (R) and measured (G) phase functions agree without adjusting the parameter. FIG. 3a shows the second derivative of the spectral phases and FIG. 3b shows the spectral phases. The spectrum of the pulses is also shown in the dashed line. As shown in FIGS. 10a and 10b, the system setup is of the type disclosed in B. W. Xu, Y. Coello, V. V. Lozovoy, D. A. Harris, and M. Dantus, "Pulse Shaping of Octave Spanning Femtosecond Laser Pulses," Opt. Express 14, 10939-10944 (2006), which is incorporated by reference herein.

FIG. 10a illustrates a proposed exemplary experimental setup for the laser system 49 including an oscillator 51, reflective mirrors 53 and 55, a pinhole 57 of a 2.5 telescope, a grating 59, a folding mirror 61, a spherical mirror 63, and a spatial light modulator 65 (or more preferably a non-adaptive, manually adjustable front surface mirror optic, such as that shown in FIGS. 11-17). The SLM 65 can be merely used for a proof of concept test but does not realize most of the benefits and advantages of the non-adaptive and passive optic apparatuses otherwise disclosed herein. The FIG. 11 construction is preferred for measuring phase distortions and is also desirable for correction when used with the optic apparatuses of FIGS. 14-16. It is noteworthy, however, that the measuring-only system employs a controller while a correction-only system does not require a controller since it can be manually adjusted. Referring to FIG. 10b, laser system 49 specially designed for sub-10 fs pulses, further includes a KDP crystal 67, a spherical mirror 69, a prism 71, a lens 73, a razor blade 75, a mirror 77, and a spectrometer 79 connected to a programmable computer controller 81. The computer program instructions of FIGS. 5-8 and the data matrix of FIGS. 1-4 are stored in memory in the computer and/or calculated by the microprocessor of the computer.

The laser pulses from oscillator 51 are first directed to spherical mirrors 53 and 55 in order to expand the beam radius to 4 mm and collimate the beam. 150-μm pinhole 57 is placed at the focal point of the first spherical mirror to reduce the fluorescence from the oscillator, and to ensure better collimation. The laser was then directed into a pulse shaper consisting of an enhanced-aluminum coated 150 line-per-mm grating 59, folding mirror 61, 762-mm-focal-length gold coated spherical mirror 63 and 640-pixel double-mask SLM (CRI, SLM-640) in a folded geometry chosen to double the retardance that can be introduced by the SLM. It is noteworthy that a nonadaptive pulse shaper is preferred instead of the much more expensive SLM disclosed in this exemplary construction. The optical resolution on the SLM depends on the diameter of the beam and the focal length of the spherical mirror and here, is approximately one SLM pixel width (100 μm). The SLM is calibrated pixel by pixel with 0.05 rad accuracy due to the large bandwidth of our laser. After the pulse shaper, the laser is focused onto a 20-μm type-1 KDP crystal 67 by 200-mm-focal-length spherical mirror 69. The SHG signal along with the fundamental laser pulses are collimated by a thin quartz lens and directed to the detection apparatus. The beam is first dispersed by a quartz prism 71 to separate the SHG light from the fundamental frequencies. All the frequency components are then focused by a quartz lens 73 with focal length 15 cm. Razor blade 75, located at the Fourier plane, is used to block the fundamental frequency components without loss of SHG light. The second harmonic frequencies are then retro-reflected by mirror 77 and directed into a spectrometer 79 (for example, Model No. OE65000 from Ocean Optics Inc.). Since the SHG signal is S-polarized, the detection apparatus is placed on a plate vertical to the optical table to avoid the use of polarization rotators that could not adequately manage the large spectral bandwidth.

Figure 2:
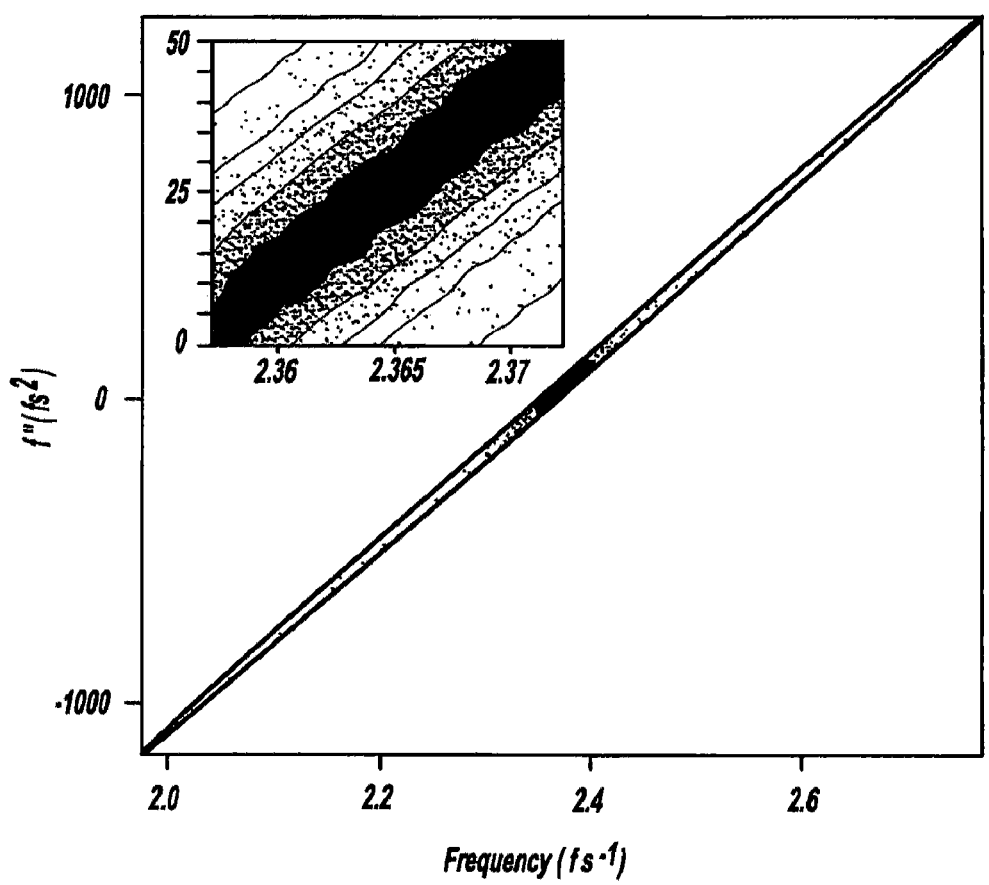
FIG. 2 is a graphical measurement expected for the present invention.

Transform-limited pulses are obtained by measuring and compensating the spectral phase of the system using the sinusoidal MIIPS method by the controller. To demonstrate the performance of this method a cubic spectral phase function defined as $\Phi(\omega)=500$ fs$^3$ $(\omega-\omega_0)^3$, which corresponds to a linear $\Phi''(\omega)$, is introduced to the pulses and measured with the method described herein. The trace is shown in FIG. 2. The dashed line indicates the spectral maxima, which directly correspond to the expected measurement $\Phi''(\omega)$. Note that both the accuracy and precision of the measurement are ~1-2 fs$^2$, and results are obtained from a single chirp scan with grid-step of 5 fs$^2$. FIG. 2 shows expected measurement of a cubic phase to be obtained by a single chirp scan where a contour plot of the expected SHG spectra is measured at each value of applied chirp. The feature revealed by the spectral maxima corresponds to the second derivative of the cubic phase introduced. The second derivative is linear with frequency and the inset shows a magnified portion of the trace.

Once $\Phi''(\omega)$ is obtained, the controller uses double integration to calculate $\Phi(\omega)$. FIG. 3 shows the measured and the introduced functions, together with the spectrum of the laser. Excellent accuracy of the results is expected, which is obtained from a single chirp scan. The expected data shown in FIG. 3 projects the third-order dispersion (TOD) with 0.5% accuracy.

Figure 4A:
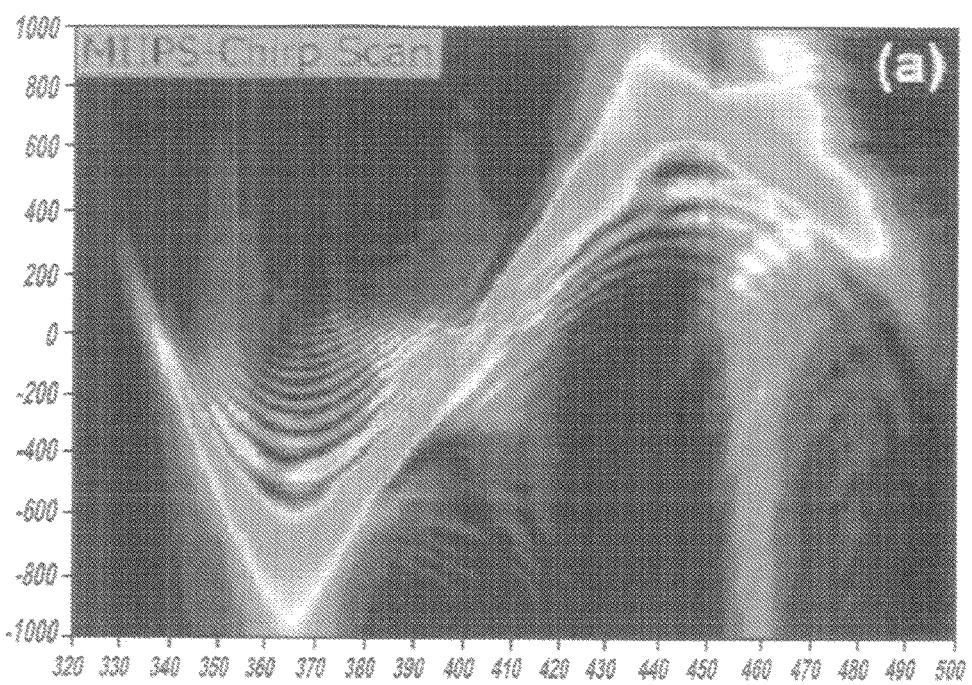
FIGS. 4(a) and (b) are measurements of a sinusoidal spectral phase expected for the present invention.
Figure 4B:
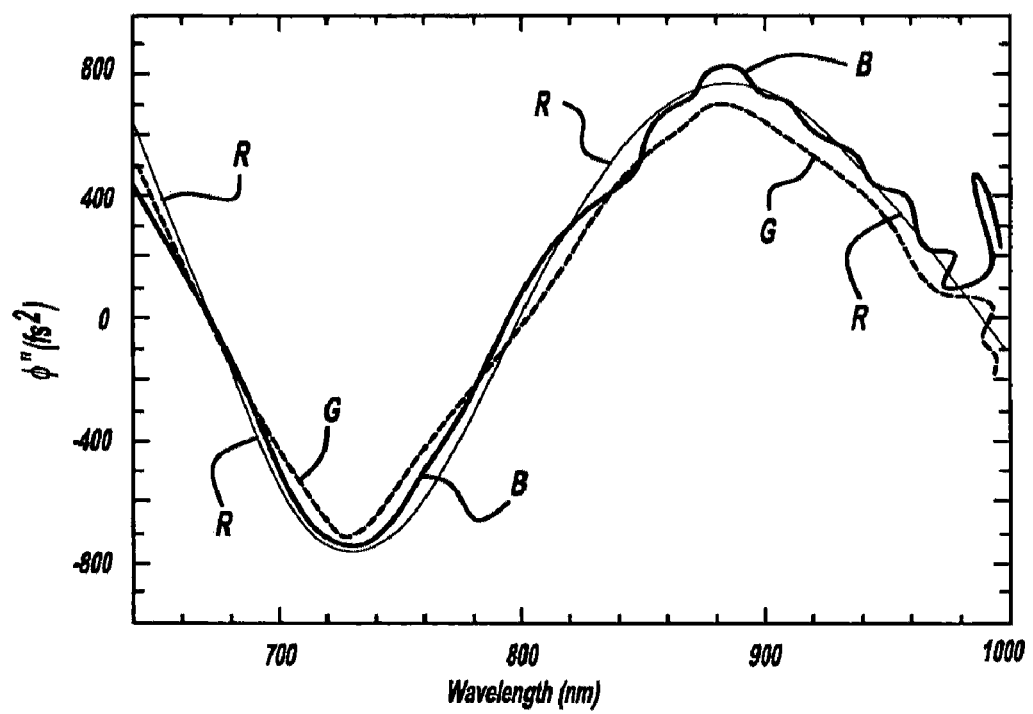

The method presented is able to measure arbitrarily complex spectral phases. A sinusoidal spectral phase function defined by $\Phi(\omega)=5\pi \sin [7 \text{ fs } (\omega-\omega_0)]$, is introduced using a pulse shaper and then measured by the method described herein. As evident from the screen shot shown in FIG. 4a, the second derivative of the introduced phase is to be obtained from a chirp scan. In FIG. 4b, the projected measured phase (G-dashed line) is very close to the phase to be introduced by the comparative pulse shaper (R-thin line). To improve the quality of this method, an iterative measurement-compensation routine can be used. In other words, FIG. 4a shows the expected experimental trace where the measured second-derivative of the phase can be directly visualized from the feature corresponding to the spectral maxima. Furthermore, FIG. 4b shows the measured second-derivative after a chirp scan (G) and after one measurement-compensations iteration (B). The curve (R) corresponds to the introduced sinusoidal function.

The MIIPS implementation of the present invention does not necessarily require the use of an adaptive pulse shaper. Given that different amounts of chirp can be applied using passive optics, the method can be conveniently, and is preferably, implemented using these devices. If an adaptive pulse shaper is used, however, compression can be accomplished by applying $-\Phi''(\omega)$ to nullify the measured phase distortions.

In addition to linear chirp, other reference functions can be employed when using an adaptive pulse shaper for comparative purposes. Even though the simplicity of the measurement resulting from using a constant $f''(\omega)$ has been highlighted herein, there are as many variations of the method as reference functions one can implement. For example, the accuracy of the use of a sinusoidal $f''(\omega)$ has been proven, but requires a special optic or shaper to introduce such a phase. Other options include adding a fixed amount of cubic reference phase while scanning a quadratic phase, This corresponds to a diagonal grid. Adding a negative cubic reference phase produces the complementary diagonal grid. Cubic phase causes the horizontal dashed lines of FIG. 1 to become diagonal lines. This approach can be implemented on arbitrarily complex distortions and allows improved and fine-tuned accuracy.

The MIIPS chirp scan implementation is especially suitable for sub-50 fs pulses. For a measurable distortion $\Delta\Phi''$, the corresponding change $\Delta I_{SHG}(\Delta\Phi'')=I_{SHG}(\Delta\Phi''=0)\times\beta^2/2 (\Delta\Phi''/\tau_0^2)^2$ needs to be bigger than the noise N, where $\tau_0$ is the time duration of the pulses. For a Gaussian pulse, $I_{SHG}(\Delta\Phi''=0)\times\beta^2/2(\Delta\Phi''/\tau_0^2)^2 \approx N$, is obtained, where $\beta=4 \ln 2$. Typically, the noise of the SHG signal is about a few percent. Therefore, the precision of the $\Phi''$ measurements is about $0.1\tau_0^2$. $\tau_0 \approx 5$ fs and a 2.5 fs$^2$ precision is calculated for the present laser system which should be in excellent agreement with expected experimental results.

There can be an instruction that outputs parameters to be used with a pulse shaper that can compensate the measured phase distortions to eliminate them. The calibration step can be accomplished by introducing a known amount of group velocity dispersion. For example, introducing one centimeter of quartz. Furthermore, the spectrum of the pulse and the measured phase can be used to calculate the ratio $\tau/\tau_{TL}$. The first value is calculated from the Fourier transform of the spectrum including the phase distortions measured, the second value is obtained from the Fourier transform of the spectrum assuming there are no phase distortions. This fraction gives the user a sense of how far from transform limited the pulses are. As part of an automated system, this value indicates if the equipment is performing within an acceptable range or it needs to be optimized.

When this method is used for microscopy, as will be further discussed hereinafter, the user should use a thin 10-100 μm second harmonic generation crystal (for example KDP, KTP, BBO, LBO) encased between a thin 100 μm quartz cover slip and a microscope slide. The crystal should be protected from phase matching fluid used in microscopy by sealing the space between the cover slip and the microscope slide with a polymer such as silicon glue.

A grisms based optical setup allows for the measurement and compensation disclosed herein, and is well suited for microscopy. The prism, grisms, gratings, offset mirrors or other optics can be adjusted manually based on information provided by the MIIPS can obtained by introducing a series of linear chirps. The adjustments can be computer controlled and automated based on information calculated from the measurements performed by the scan, in a fully automated fashion.

For communications, there is a great need to measure third and higher order dispersion and then to design a phase mask (or a special fiber) to cancel the third order dispersion. Therefore, the system of the present application is ideally suited for just measuring phase distortions and for measuring the dispersion in an optical fiber used in communications, and also an optical fiber used for microscopy and endoscopy. Moreover, an aspect of the present invention pertains to the use of an acoustic optical programmable filter to introduce the linear chirp for the method disclosed herein, to get the phase information. Another aspect of the present laser system is well suited for solely measuring a chromatic dispersion of optics such as dielectric mirrors, chirped mirrors, microscope objectives, optical substrates, and target substances. The performance of the present laser system can also be tested at specified intervals of time to ensure that it is in optimal condition when used in micromachining or surgical stations, by way of example and not limitation; the controller can automatically send a malfunction warning alert, or alternately, automatically adjust itself by changing the deformation of an optic depending on the test results.

Example:

Intense sub-10 fs laser pulses are desired in high-field laser science for applications, such as single attosecond pulse generation. Because of spectral narrowing in the conventional amplification process, the shortest pulses that can be obtained from a conventional Ti:sapphire-based chirped-pulse amplification ("CPA") system are usually limited to ~15 fs. In one embodiment, the spectrum and the spectral phase of continuum generated in an Argon-filled hollow-core fiber are characterized by MIIPS without an adaptive pulse shaper. The time duration of the laser pulses should be 166 and 4.8 fs before and after MIIPS compression, respectively. The pulse energy of the compressed pulses is ~150 μJ/pulse. The phase-corrected continuum can be used for the remote detection of chemicals. For this use, part of the spectrum is blocked at the Fourier plane of the pulse shaper. The present direct laser system is ideally suited for this end use.

Example:

Knowledge of the dispersive properties of optical media is helpful for femtosecond laser applications. The second-order dispersion k", referred to as GVD, is an especially critical parameter because it determines the temporal broadening experienced by ultrashort pulses after traveling through a material. GVD measurements of water and seawater have been obtained using MIIPS with an accuracy comparable only to that of white-light interferometry. An ultrabroadbandwidth femtosecond laser (620-1025 nm) is transmitted through water-containing cuvettes with 5, 10, 20 and 30 mm path lengths. In each case, MIIPS can directly measure the GDD introduced by the sample, and from the slope of a linear fit to the data as a function of path length, a measurement of k" is obtained by the controller. The controller calculates values based on the knowledge of the refractive index of water as a function of frequency. The present direct laser system is ideally suited for this end use.

Example:

Femtosecond laser pulses are useful for nonlinear biomedical imaging. Methods such as two-photon microscopy take advantage of the ability of near-IR lasers to travel through scattering biological tissue and provide high-resolution images. The development of techniques for optimized depth-resolved imaging, as well as surgical procedures involving femtosecond lasers, will require accurate characterization of pulses after they transmit through biological samples. After propagation through scattering biological tissue, the majority of the beam is scattered making it impossible to use pulse characterization methods that depend on overlapping, two or more pulses. Pulse characterization through scattering biological tissue is an illustrative example of MIIPS performance regardless of beam-mode quality. Spectral phase characterization is employed after the pulses traveled through a 1 mm thick chicken breast tissue slice and a cow-eye cornea-lens complex.

The effect of noise on a MIIPS measurement, for example, the noise from the source (pulse-to-pulse and mode quality), is an advantage of the present laser system and method. Through the use of averaging, the influence of pulse-to-pulse fluctuations can be substantially minimized. Given that MIIPS is preferably a single-beam method, mode quality plays no role. The second contribution to noise comes from the detector. A 1:1 signal-to-noise ratio is expected in the detected signal with minimal influence on the measured phase. Because MIIPS directly measures $\phi''(\omega)$, the integrated phase is relatively immune to noise in the measurement. The present direct laser system is ideally suited for this end use.

Another aspect of the present invention system, method, control system and computer software instructions, is as follows. Amplified lasers typically have a compressor stage that is used to compensate linear chirp. There is an actuator in the compressor stage that is motorized that the user manually moves to find the optimal position where linear chirp is minimized. Making adjustments to minimize quadratic chirp in traditional devices are only carried out by experts because it is typically very difficult to measure and very difficult to know which knob to adjust in the laser. With the present laser system, a linear chirp scan is advantageously achieved by scanning this actuator. The systematic scanning of this actuator while detecting at each position the spectrum of the second harmonic of the laser pulses, the user is now able to characterize the laser pulses. The system includes a nonlinear optical source, a spectrum detector, a computer controller that synchronizes data acquisition with the position of the actuator, a computer program to convert the actuator position into linear chirp value, the same program to display the collection of spectra as a function of linear chirp, for a program to extract the second derivative of the phase from the measured signals in a direct manner, and to convert that function in to the spectral phase of the pulse.

A first embodiment of the present invention system, method, control system and software instructions is the simplest and readily usable with conventional laser devices but without requiring the expense of an adaptive pulse shaper. This embodiment allows for qualitative analysis by the programmed instructions in the computer control, and associated method, in order to measure and characterize phase distortions in a laser beam pulse and display them in a graphical manner. This allows the user to manually adjust the laser optics until the user is visually satisfied that the desired phase distortions have been reduced or eliminated. The method, controller and computer software act as follows by:

a. Introducing linear chirp, typically in the range of (−10,000 to +10,000 $fs^2$). This value depends on the laser bandwidth and the estimated distortions; the smallest I imagined is +−1000 $fs^2$ and the largest 100,000 $fs^2$. Laser optics such as a pair of prisms, a pair of gratings, one grating with an associated reflector, a pair of grisms, or a Trebino prism, by way of example and not limitation, can be used.

b. Acquiring a signal with a laser from a nonlinear optical process such as second harmonic generation. For example, focusing on a second harmonic generation crystal, or powder from such a crystal, starch, or SHG generated from the surface plasma as the femtosecond pulse interacts with a solid can be employed, by way of example and not limitation.

c. Dispersing the spectrum of the nonlinear optical signal, such as with a spectrometer, a grating, a prism or grism, by way of example and not limitation.

d. Detecting the spectrum, such as with a CCD camera, a linear array of detectors or a rotating grating with a fixed detector, by way of example and not limitation.

e. Calculating and displaying the resulting collection of spectra with the controller as a function of chirp, as a three dimensional plot in which intensity is the z axis, the y axis is linear chip and the x axis is wavelength. The three dimensional plot can then be displayed as a contour plot. This should provide fantastic pulse characterization.

A second and upgraded embodiment of the present invention system, method, control system and software instructions, is based on the first embodiment above and provides quantitative analysis. This second embodiment, however, introduces a calibrated amount of linear chirp in step (a) of the first embodiment by using one or more known thicknesses of quartz for comparison, by way of example. Additional steps and software instructions are as follows with reference to FIGS. 5 through 8, performed by:

f. Calculating and fitting resulting three-dimensional data to extract, for each wavelength, the linear chirp that causes a maximum in the nonlinear optical spectrum, with the controller g. Calculating, constructing and displaying the second derivative of the measured phase as a function of wavelength obtained from (f) with the controller.

h. Graphically displaying and storing the result from (g).

i. (optional) Calculating by integrating twice the result from (g) as a function of wavelength to obtain the spectral phase as a function of wavelength with the controller.

j. (optional) Determining and displaying the phase obtained in (i) together with the spectrum of the laser with the controller.

k. (optional) Calculating and determining a fast Fourier transform using the spectrum of the laser pulse and the measured phase, and then determining and displaying a graphical function that describes the pulse and/or phase distortions in the time domain. Thereafter, calculating the performance of the laser compared to the transform limited value to determine the amount of phase distortion, if any. This is carried out with the programmable software instructions stored in the controller.

Figure 5:
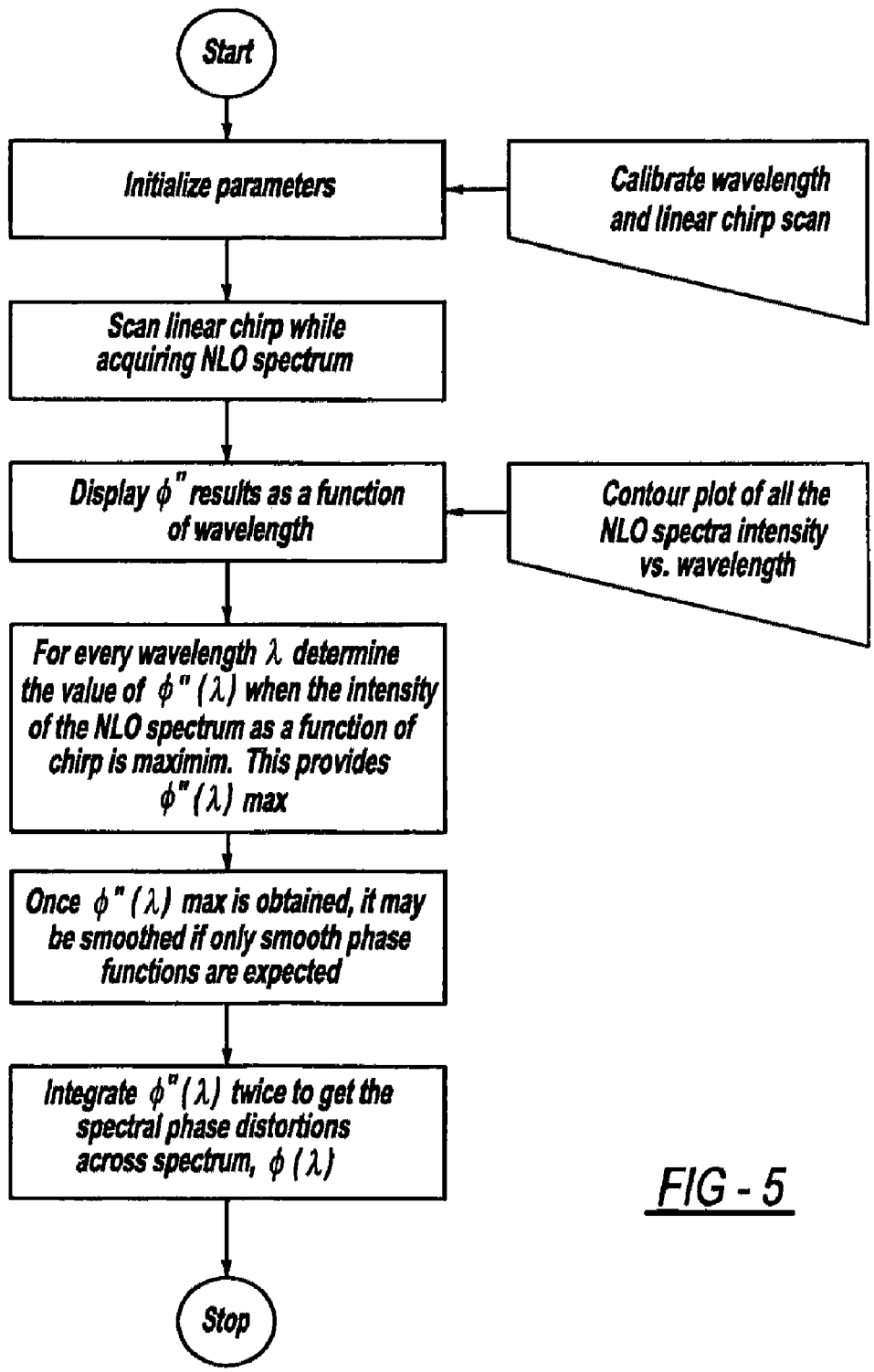
FIG. 5 is a computer software flow diagram for a quantitative, non-pulse shaper MIIPS embodiment of the present invention.

FIG. 5 illustrates programmable software instruction steps including the physical movement of optics to change the distance between two gratings, or two prisms so as to introduce linear chirp, when using MIIPS. The program needs to calibrate the step size to make the measurement quantitative. By scanning linear chip, one can measure the spectral phase of the laser pulses. This requires recording of the NLO spectrum for each linear chirp value.

Figure 6A:
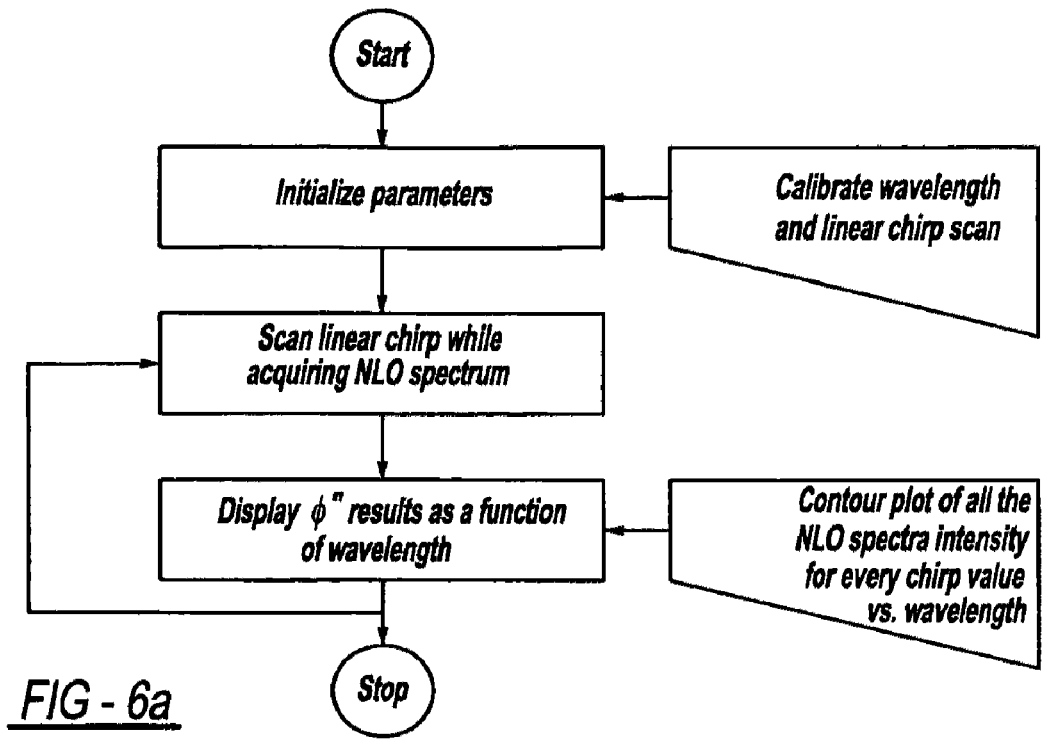
FIGS. 6a and 6b are computer software flow diagrams for a monitoring non-pulse shaper MIIPS embodiment of the present invention.
Figure 6B:
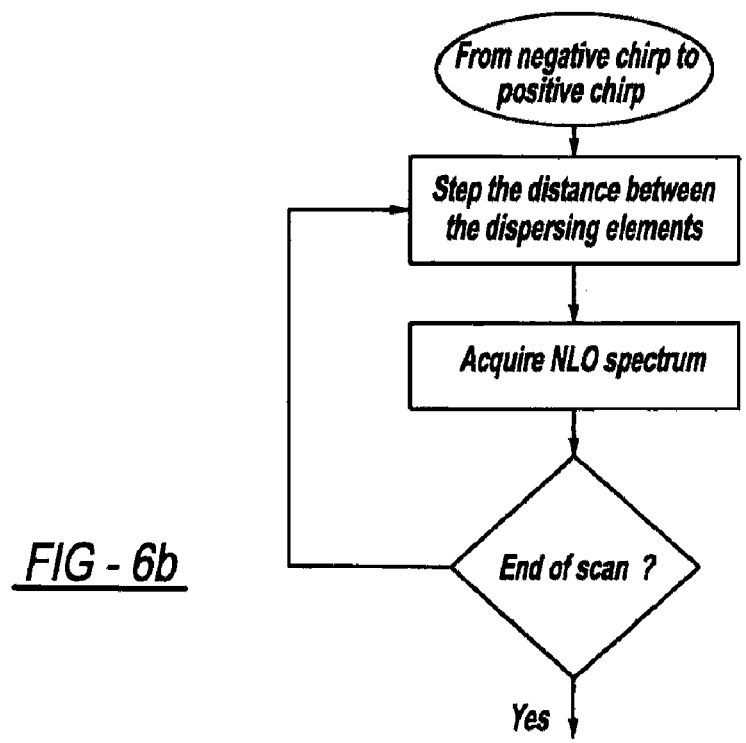

FIG. 6 discloses programmable software instruction steps including the physical movement of optics to change the distance between two gratings, or two prisms so as to introduce linear chirp. The program needs to calibrate the step size to make the measurement quantitative. Measuring the spectral phase of the laser pulses can be achieved by scanning linear chirp. This requires recording of the NLO spectrum for each linear chirp value. This program continuously provides a visual diagnostic of the laser pulses and it shows the second derivative of the spectral phase when used for MIIPS monitoring.

Figure 7:
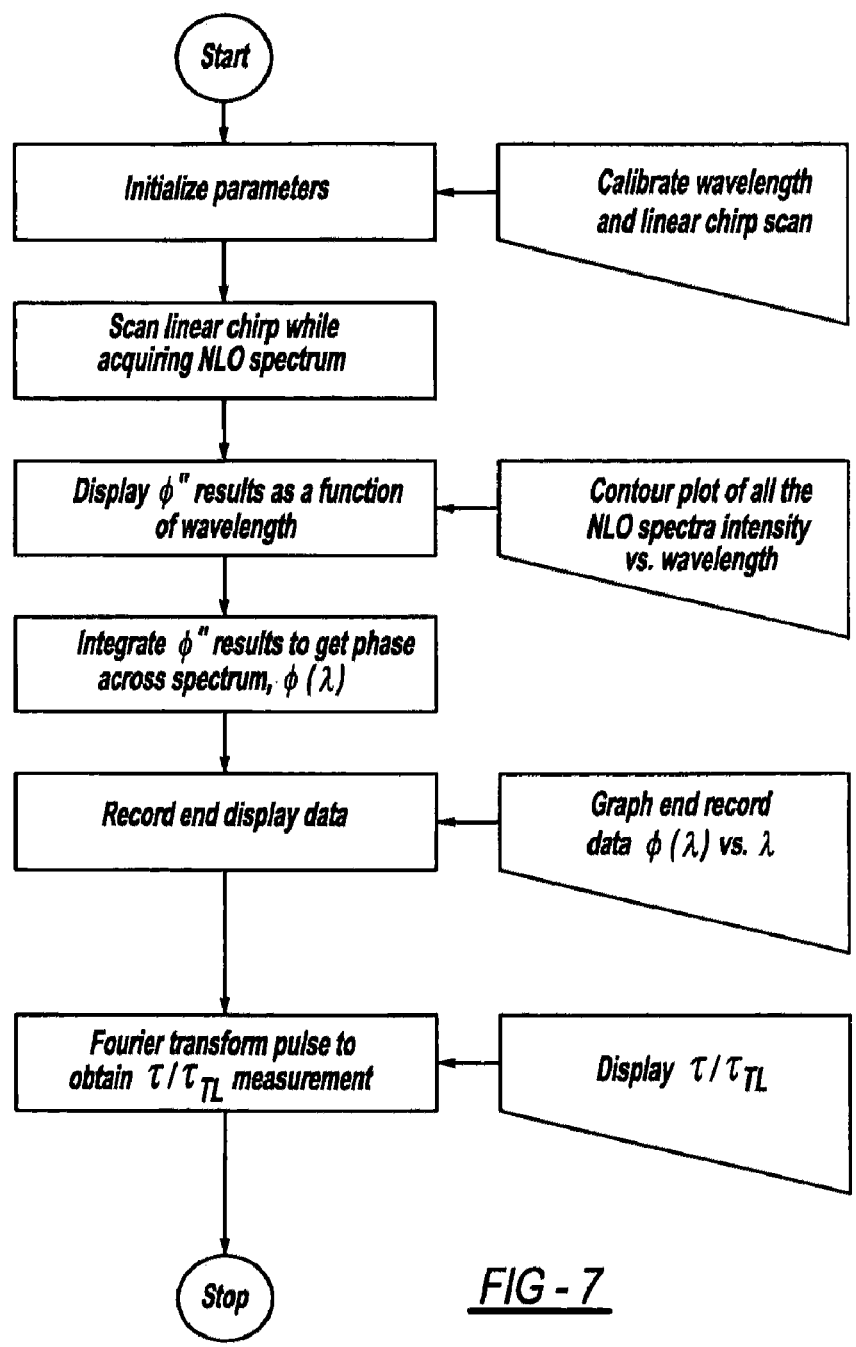
FIG. 7 is a computer software flow chart for a quantitative non-pulse shaper MIIPS embodiment of the present invention.
Figure 8:
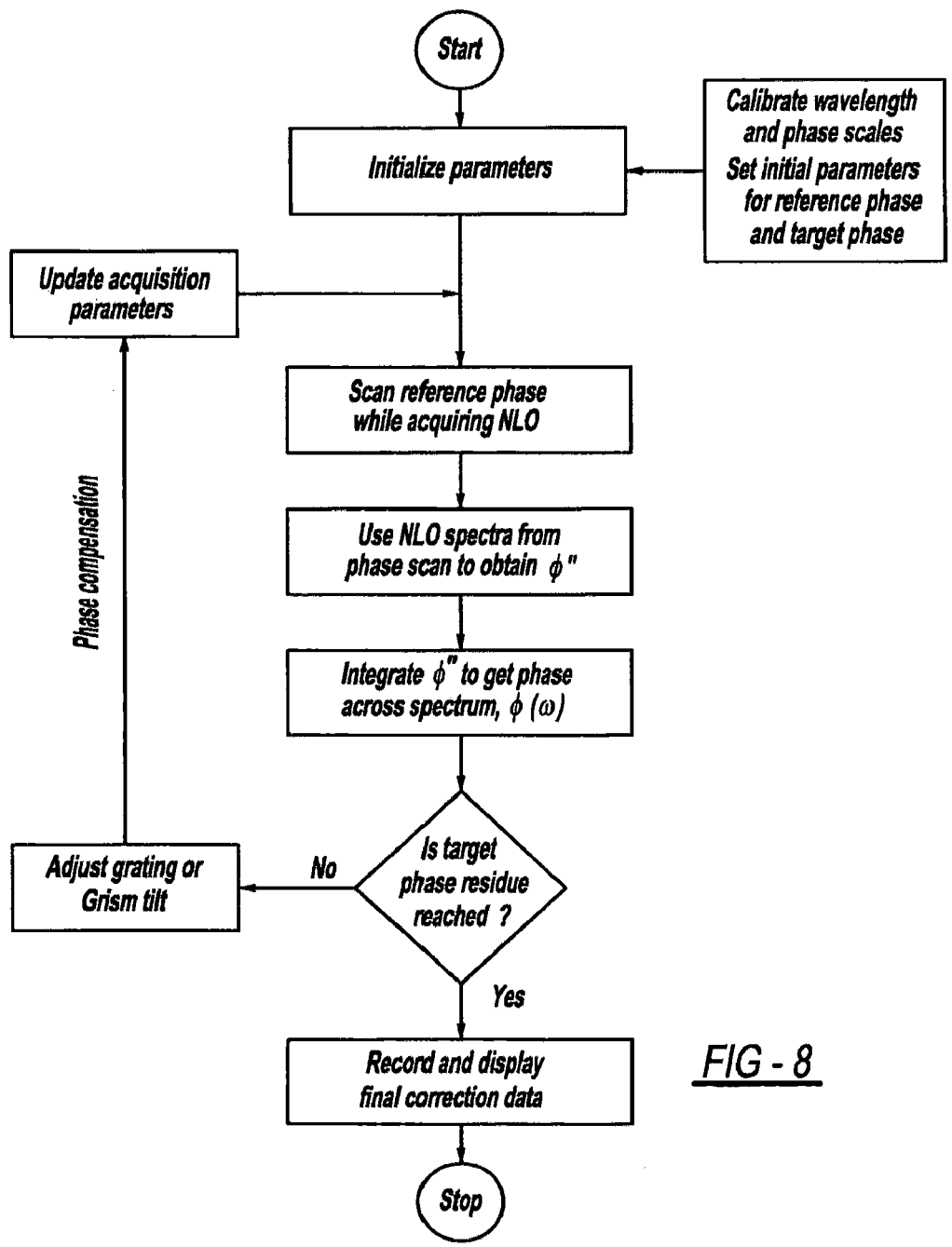
FIG. 8 is a computer software flow chart for a non-pulse shaper, iterative MIIPS embodiment of the present invention.

FIG. 7 shows programmable software instruction steps including the physical movement of optics to change the distance between the prism and a corner cube to introduce linear chirp, when used with MIIPS for an oscillator with Deep Seam™ compensation or similar dispersion compensation. Measurement of the spectral phase of the laser pulses can be achieved by scanning linear chirp. This requires recording of the NLO spectrum for each linear chirp value using a spectrometer and typically a second harmonic generation ("SHG") crystal. The Deep Sea™ device is sold by Spectra Physics, and is a prism arrangement with a stepper motor to adjust chirp to compensate for group velocity dispersion. This system and method characterize the spectral phase of pulses and by Fourier transformation, calculate their pulse duration. FIG. 8 is a set of programmable software instruction steps used with iterative MIIPS which automatically adjusts the tilt orientation on a grating or grism to minimize cubic phase.

A third embodiment of the system, method, control system and software instructions, is an additional upgrade to the first embodiment above. This exemplary embodiment repetitively performs the methods and instructions of the first embodiment, and employ the hardware of steps (a)-(d) therein. The hardware for step (a), however, should be constructed in such a way as to scan the linear chirp fast, repetitively, and with minimum vibrations. This can be achieved with linear actuators, such as stepper motors, for manual adjustment. It could also be achieved with an off-axis wheel that pushes the position of the optics (a) certain distance as it rotates depending on its position. Electromagnetic actuators, such as those found in loud-speakers could also be used. Conventional tilting of gratings and prisms to compensate for cubic dispersion typically causes other unknown problems. In contrast, the present embodiment measures, calculates and displays the phase distortion results, including displaying the horizontal of the maximum multiphoton intrapulse interference intensities, as shown in FIG. 1, thereby allowing for much more educated and informative optic adjustments by the user. This will lead to more accurate and faster compensation and correction of the phase distortions.

A fourth embodiment system, method, control system and software instructions, employs the second embodiment above. Additionally, the computer controller and its associated programmed instructions, automatically adjust the laser optics based on the calculations and determinations. For example, an optic will deflect a small portion of the laser beam output, the computer will calculate its characteristics as previously explained for the second embodiment, and the controller will automatically actuate the actuators to move the optics if they are not meeting the desired specifications and minimized phase distortions. If these adjustments are still not satisfactory in comparison to predetermined target values, then the controller can automatically display a warning, shut down the laser system and/or automatically contact a technician for servicing the machine.

Although these implementations do not require an adaptive pulse shaper, when alternately and less preferably used with an adaptive pulse shaper, the present system and method reduce the burden on the shaper. The above method can be used to reduce linear and quadratic chirp in order to let the pulse shaper deal with higher order dispersion and to introduce calibrated arbitrary phase functions.

A known method to introduce linear chirp is disclosed in U.S. Patent Publication No. 2007/0070485 to Trebino, which is incorporated by reference herein. The Trebino setup can be used for scanning linear chirp according to step (a) of the first embodiment herein. This system, which is now sold commercially by Spectra Physics as the "Deep Sea" model, provides an actuator that is calibrated. Note that this system is intended only for pulse compression (only linear chirp). For one aspect of the present invention, the operator first takes the entire beam output and uses it for second harmonic generation. It is the output of the SHG that needs to be dispersed and recorded as a function of linear chirp. In conclusion, a new MIIPS implementation based on a simple chirp scan is presented. The corresponding trace directly yields the second derivative of the unknown spectral phase, without any mathematical treatment.

A second known method to introduce linear chirp is disclosed in the publication by Oron et al, "Scanningless Depth-Resolved Microscopy," Optics Express, Vol. 13, No. 5, p. 1468 (Mar. 7, 2005), which is incorporated by reference herein. The Oron method improves depth resolution and speeds up laser scanning microscopy. It involves the dispersion of a beam and collimating it, and then focusing it as shown in Oron FIG. 2. At the second focal plane, the beam is not chirped but away from the focal plane, according to Oron FIG. 1. This optical setup allows the introduction of linear chirp and can be used for pulse characterization if one follows the methods disclosed in the present invention. The advantage of using the Oron optical setup for introducing linear chirp, in combination with the present invention, is that the entire linear chirp scan is accomplished for each laser shot, thus allowing single shot spectral phase characterization.

Figure 9:
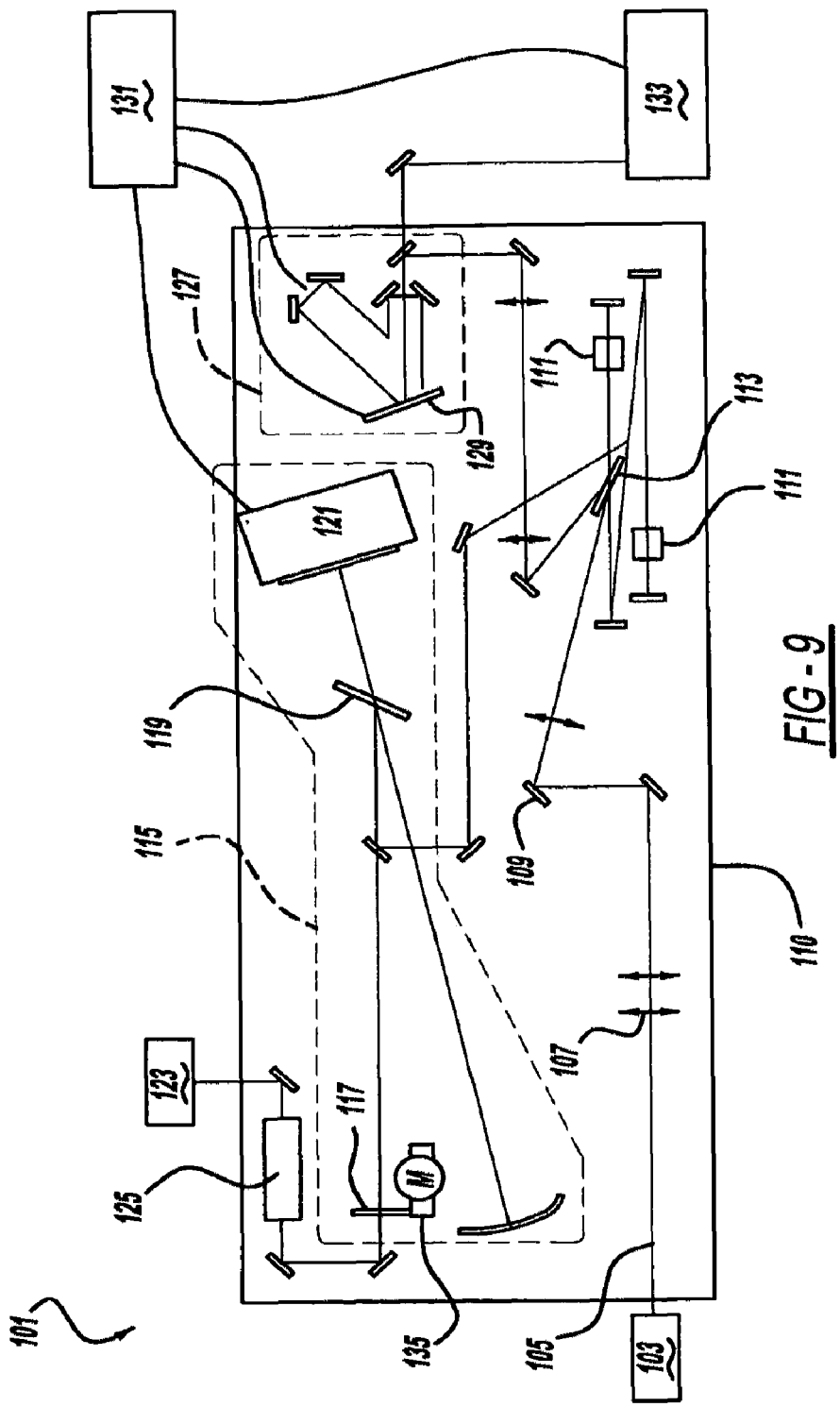
FIG. 9 is a schematic diagram showing a regenerative amplifier for the present invention.

FIG. 9 illustrates another exemplary laser system 101 in which a pump laser 103 emits laser beam pulses 105. Lenses 107 and high reflection mirrors 109 are present within a regenerative amplifier 110. Pockel cell crystals 111 and a Ti-doped sapphire crystal 113 are also employed. A stretcher 115 includes a retroreflecting mirror pair 117, a dating 119 and a manually adjustable front surface mirror 121. Input pulses from an oscillator 123 are transmitted through a faraday isolator 125 and to stretcher 115. A compressor 127 includes a grating 129 which is operably tilted or otherwise reoriented through energization of an electromagnetic actuator or translator, automatically or manually controlled by a programmable controller 131. This allows the operator to adjust third-order dispersion in the pulse. A MIIPS spectrometer 133, coupled to controller 131, detects undesired distortions in the pulse.

An electromagnetic actuator, such as a stepper motor 135, operably changes the distance of retroreflector mirrors 117, under automatic or manual control of controller 131. This movement introduces different amounts of linear chirp into the pulse. Scanning the distance from one end to the other allows the controller to accurately characterize the laser pulses for second and higher order spectral phase distortion. The MIIPS detector or spectrometer 133 can obtain a NLO spectrum.

The nonadaptive optic member or pulse shaper of the present laser system operably introduces reference phases in the laser beam pulse. A detector, e.g. spectrometer, operably detects harmonic frequency intensities of the pulse and the controller automatically determines a matrix or data collection of the detected intensities versus the references phases. The controller then automatically determines a maximum intensity in the matrix for each frequency of the pulse and the controller assigns a value corresponding to each maximum intensity. Thereafter, the controller automatically determines a second derivative of a spectral phase from the maximum intensity values for each frequency and the controller then calculates, by double integration, a spectral phase function of distortions in the pulse. The controller subsequently controls the nonadaptive optic member, such as by moving or changing the position of a retroreflective mirror pair, tiling a grating, or the like, to cancel the determined distortion in a subsequent pulse by introducing a negative value of the spectral phase function of distortions.

Figure 11:
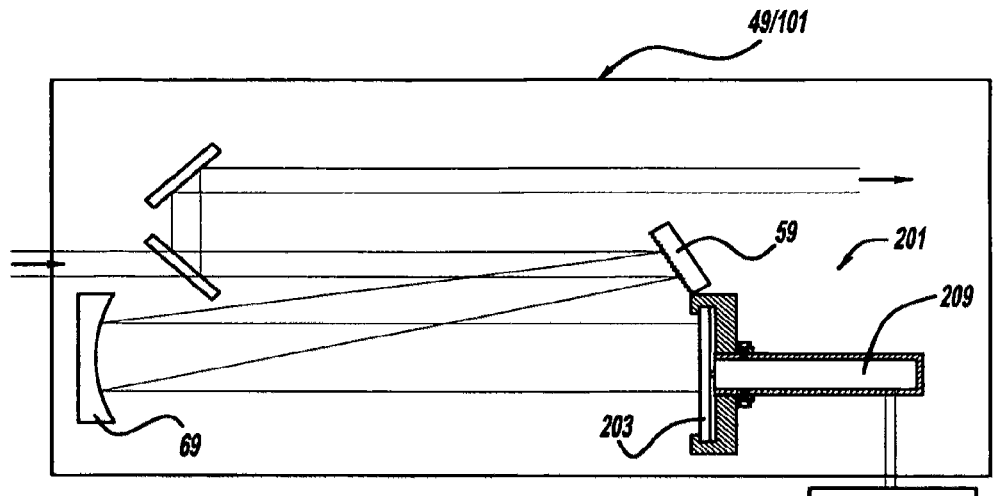
FIG. 11 is a diagrammatic view showing a laser system employing a first embodiment variation of a reflective optic apparatus of the present invention.
Figure 12:
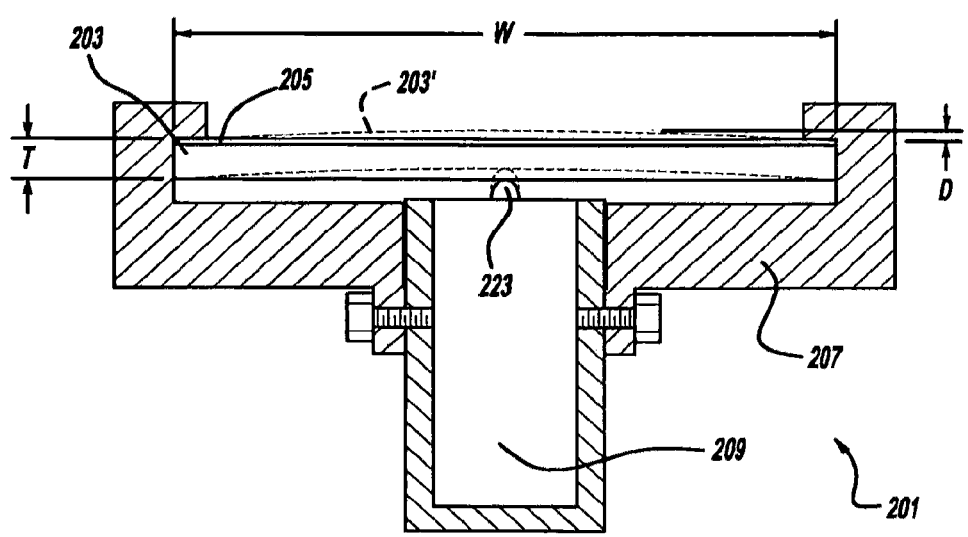
FIG. 12 is an enlarged cross-sectional view showing the apparatus of FIG. 11.
Figure 13:
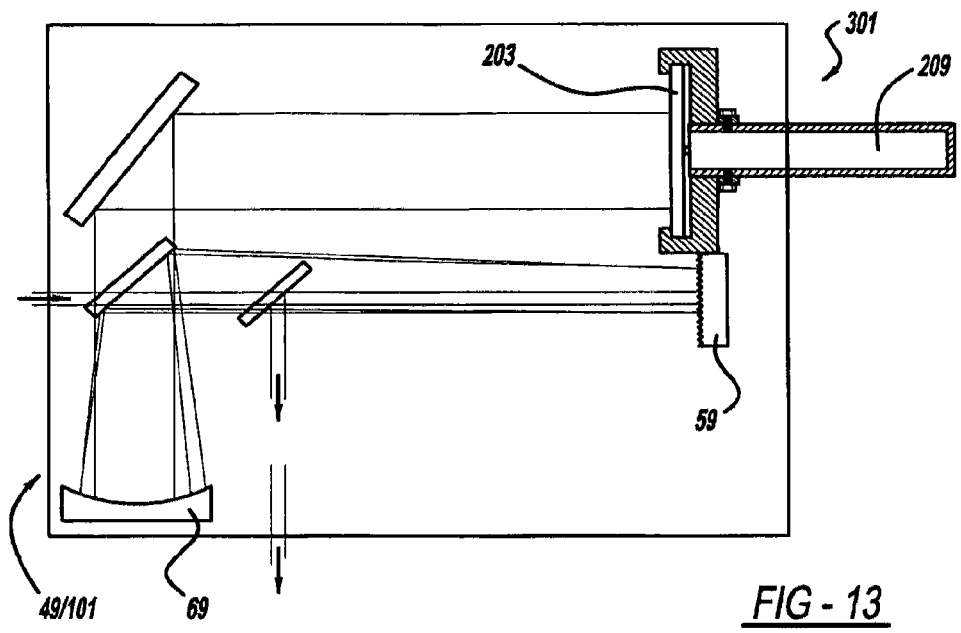
FIG. 13 is a diagrammatic view showing a laser system employing a second embodiment variation of a reflective optic apparatus of the present invention.

A first embodiment variation of a nonadaptive deformable optic apparatus 201 is shown in FIGS. 11 and 12 and a second embodiment variation of an optic apparatus 301 is shown in FIG. 13. These optic apparatuses can be placed inside the cavity of an ultrafast laser oscillator, or in the stretcher of an amplifier. These optic apparatuses 201 and 301 each include a transparent substrate 203, a reflective layer 205, a holder 207 and an adjustable actuator 209. Substrate 203 and reflective layer 205 serve as a wavefront adjustable mirror or a phase front adjustable mirror. Substrate 203 is preferably a sheet of normally flat BK7 glass having a thickness dimension T of approximately 5 mm, and a width dimension W of approximately 100 mm. More preferably, substrate 203 has a thickness T of 0.1-3 mm and a width dimension W of 10-20 mm.

Reflective layer 205 is preferably a coating of MgO protected silver, gold, aluminum, or a highly reflective dichroic material. In this embodiment, holder 207 is a polymeric housing having an opening to allow laser pulse access to reflective layer 205. An undercut ledge surrounding the opening retains substrate 203 within holder 207.

Actuator 209 is preferably a direct drive piezoelectric actuator which is controlled by a programmable computer controller connected to a voltage source 221. When energized, the piezoelectric actuator linearly advances a ball or pin 223 which, in turn, pushes against a backside of substrate 203, thereby deflecting and bending the mirror by a deflection distance D of approximately 20 μm, although it is envisioned that the deflection distance D may be as great as 200 μm. Acceptable piezoelectric actuators are model numbers NA-25 and NA-80 from Dynamic Structures & Materials, LLC of Franklin, Tenn. The actuator introduces pressure as a response to voltage from source 221 and is used with this invention, for example and not limitation, to introduce chirp or for scanning linear chirp in the laser beam pulse. Multiples of such piezoelectric actuators can be employed to mechanically deflect different portions of the mirror. Anywhere from 1 to 12 such piezoelectric actuators can be employed to bend adjacent surface areas of the mirror.

The laser system introduces a periodic function, such as a saw tooth or a sinusoidal function that causes the reflective layer and substrate to vary the amount of linear chirp, thus delivering n-different reference phases and recording n-different spectra containing the NLO intensity at m-different frequencies. The controller then uses the n×m data matrix to map the second derivative of the spectral phase function of the pulses being analyzed at the target. Once this function is obtained, the controller numerically integrates it twice as a function of frequency in order to obtain the spectral phase distortions. Furthermore, the phase front adjustable mirror application can be used in conjunction with a separate spectral phase measuring device, preferably MIIPS but alternately FROG or SPIDER, and the mirror can be automatically or manually adjusted until the desired pulse performance is delivered at the target. At that point, the mirror remains static and ensures the desired pulse characteristics for subsequent pulses. Moreover, the phase front adjustable mirror is deformable in two dimensions and can be used for single shot laser pulse characterization or to deliver a pulse having, a variable spectral phase in one dimension.

Figure 14:
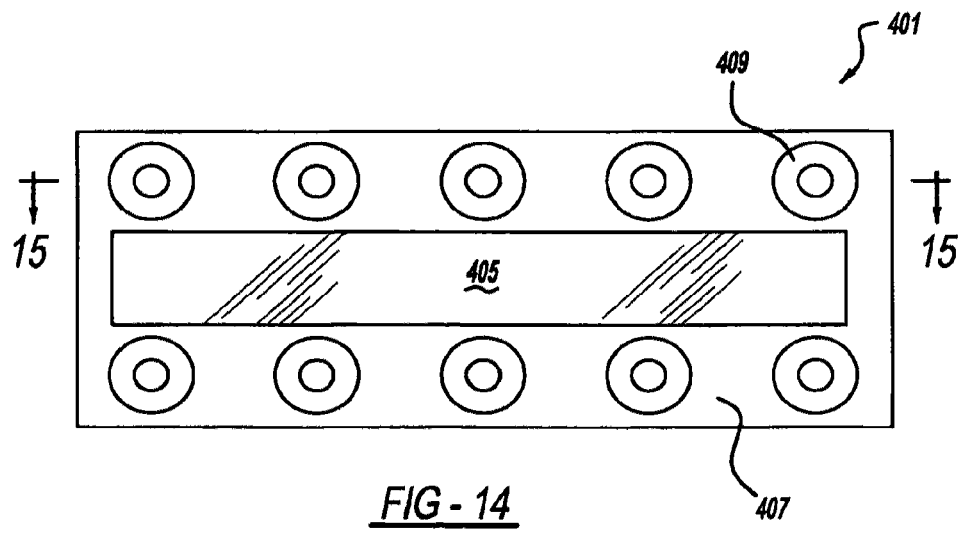
FIG. 14 is an enlarged front elevational view showing the apparatus of FIG. 13.
Figure 15:
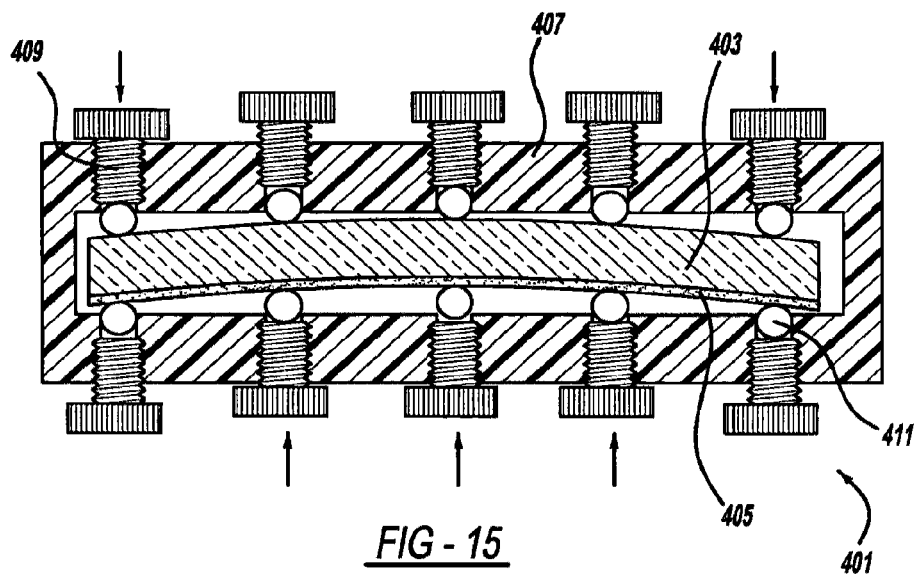
FIG. 15 is an enlarged cross-sectional view showing the apparatus of FIG. 13.

A third embodiment variation of a nonadaptive deformable optic system 401 is shown in FIGS. 14 and 15. A thick substrate 403 and reflective layer 405 are preferably of the size and material types previously disclosed regarding FIGS. 11-13. A holder 407, however, has multiple threaded bores which receive manually adjustable, threaded screw actuators 409. Screw actuators 409 are spaced apart from each other and located adjacent the peripheral edge surrounding a reflective front which is openly accessible to a laser beam pulse. A ball bearing 411 or other pressure-bearing member is placed between a leading end of each screw actuator and the adjacent surface of the mirror. A compression or Belleville spring may optionally be disposed between a head of each screw actuator and the adjacent surface of the holder to maintain the adjusted positioning during use. Accordingly, each screw actuator can be individually adjusted in an incremental manner between multiple positions in order to deflect portions of the mirror differently.

Figure 16:
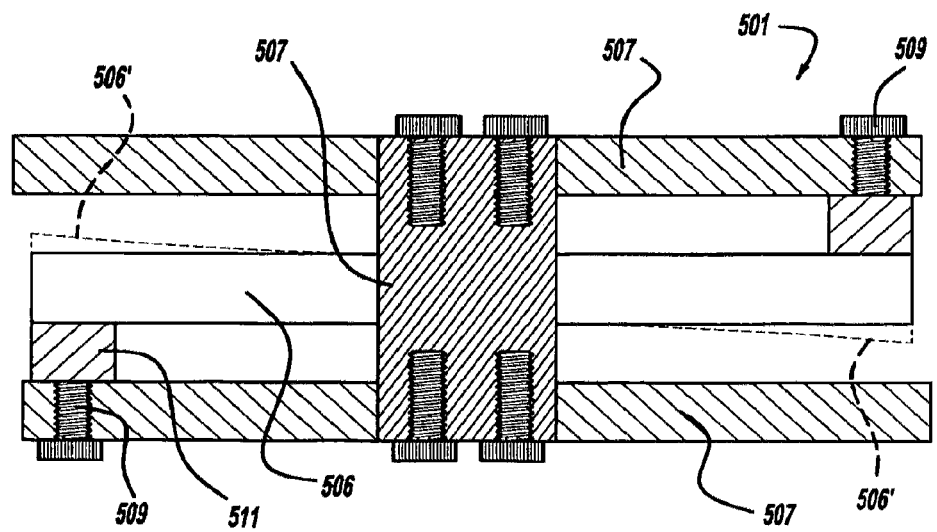
FIG. 16 is a cross sectional view showing a third embodiment variation of a reflective optic apparatus of the present invention.
Figure 17:
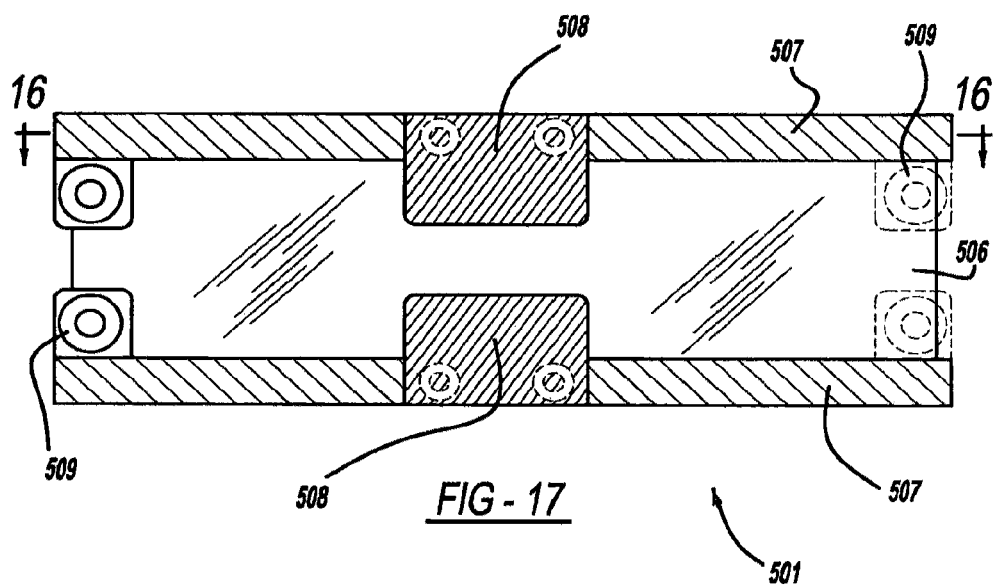
FIG. 17 is a front elevational view showing the apparatus of FIG. 16.

FIGS. 16 and 17 illustrate a fourth embodiment variation of a nonadaptive deformable optic system 501. A thick glass substrate and reflective coating layer act as a phase front adjustable mirror 506 suitable to eliminate third order distortions. A holder 507 has flanges 508 which secure and maintain the position of a central portion of mirror 506. Multiple adjustable screw actuators 509 and bearing blocks 511 push against front and back side portions adjacent outboard corners of mirror 506, thereby causing deflection of the desired portions of the substrate and reflective layer. Yet another variation adheres a phase adjustable phase mirror, having a thickness T less than 1 mm, to a metal sheet which can also be bent by threaded screws. Moreover, it should be appreciated that any of these optic apparatus embodiments can be used with any of the laser system constructions and end uses disclosed hereinabove.

Another version of the present laser system is even simpler and less expensive than many of the others, and solely measures phase distortions. This version continuously changes the distance of a dispersive optic, or bends the reflective optic and synchronously records a harmonic spectrum of the laser. It then displays in a monitor the three dimensional data consisting of a derivative of the phase (y axis), wavelength (x axis) and intensity (z axis or color in a contour map). This device does not require a programmable controller. No calculations are needed to purely display the result since it only displays real time data. Alternately, instead of moving the optic, the reflective optic is bent in such a way that different portions impart positive or negative chirp to the pulse. Then a two-dimensional CCD is used to record the spectrum of the harmonic intensities at the different chirp values all in one image. In this way, no moving parts are needed and single laser shot measurements are possible.

Yet another variation of the present laser system is used solely for correction. In this situation, the measurement is performed by a separate device (e.g., FROG, SPIDER, MIIPS) using interferometry, an SLM, a deformable passive optic, or by changing the distance of at least one dispersive optic. Subsequently, this is used to make a permanent spectral phase correction, in which a passive optic located at a place where the beam is dispersed in conformed (e.g., bent, flexed, deformed or otherwise reshaped) so that it eliminates the phase distortions of the system that are being measured by the separate device. This laser system is constructed with at least one dispersive optic and one reflective optic, although variations may be possible. It is noteworthy that no controller is required in this variation thereby reducing cost and complexity. Once the spectral phase is eliminated from the system, the entire system is corrected in a permanent manner. It is envisioned that this variation allows for correction at the manufacturing source before shipping to a customer or user, and this is applicable for femtosecond oscillators, femtosecond amplifiers, laser processing systems (such as micromachining stations, laser scribing stations, laser surgery stations, or the like), two photon microscopy systems, and the like. It is further envisioned that the present laser system may alternately be used for a combination of measuring and correcting for phase distortions.

In summary, the direct ultrashort laser system of the present application is an improvement over currently known devices, such as that disclosed in the previous significant advance of U.S. Patent Publication No. 2006/0056468 (M. Dantus, et al.). In an example of prior devices, parameters are set in the software of the controller and the controller then introduces hundreds of different voltages that approximate a desired reference phase. A collection of different reference phases is applied by the controller to acquire a phase scan, from which the phase distortions are determined. The prior controller then applies a negative of the phase distortion function whereafter the pulses are evaluated to see if the desired compression is achieved.

In contrast, a new improvement provided in the present system employs optic hardware which is arranged to introduce a definite spectral phase delay and thereby introduces the reference phases. Using a single voltage, the controller scans the optics in order to collect a phase scan. The second derivative of the spectral phase distortions is directly obtained from the phase scan without the prior sinusoidal phase to the second derivative calculations. In the present system, once the second derivative is obtained, it is used to determine the pulse duration and to make adjustments in a static and passive optic member to correct the spectral phase distortions at the point at which they are being measured (i.e., the target).

As a further point of comparison, optical hardware that can be adjusted to eliminate pulse distortions once the spectral phase corrections are known, will be contrasted. In an exemplary prior construction, the use of an adaptive pulse shaper makes it easy to introduce $-f(\omega)$. The adaptive pulse shaper, however, is expensive and has undesirable intensity, wavelength and bandwidth restrictions. This type of measurement and compression is conducted in about one minute and is often performed several times per day. But when the power of the adaptive pulse shaper is turned off, the adjustment is lost and must be retrieved from memory and re-implemented, thereby causing delay and degrading computer performance.

In contrast, a new improvement provided in certain non-limiting embodiments of the present system employs a reflective surface that is adjusted (e.g., bent, deflected or deformed) by as little as 0.1 mm and the spectral phase of the pulses can therefore be adjusted to eliminate undesired phase distortions or to introduce desired phase distortions. The adjustment is made once and is then maintained until further adjustments are desired, but without the need for electrical power or a controller command. This mechanical adjustment (e.g., threaded screws, etc.) can be made at the factory or at the location of the user.

While various embodiments of the present invention have been disclosed, it should be realized that other variations may alternatively be employed. For example, other actuators, such as solenoids or servomotors can be used in place of the disclosed piezoelectric or screw actuators. Furthermore, it is envisioned that the laser system may employ additional or less reflective mirror and differently arranged laser beam pulse paths. Moreover, threaded set screws, adjustable cams, adjustable levers, rack-and-pinion gears, or other such finely adjustable mechanical actuators can be used to deflect the optic system mirrors. It is intended by the following claims to cover these and any other departures from the disclosed embodiments which fall within the true spirit of this invention.

The invention claimed is:

1. A method of using a laser system, the method comprising:
(a) emitting at least one laser beam pulse;
(b) introducing reference phases in the at least one pulse;
(c) detecting harmonic frequency intensities of the at least one pulse;
(d) determining a matrix of the detected harmonic frequency intensities versus the reference phases;
(e) determining a maximum intensity in the matrix for each frequency of the at least one pulse;
(f) assigning a value corresponding to each maximum intensity;
(g) determining a second derivative of a spectral phase from the maximum intensity values for each frequency;
(h) calculating a double integral with respect to frequency in order to obtain a spectral phase function of distortions in the at least one pulse;
(i) canceling the distortion in the at least one pulse by introducing a negative value of that calculated in step (h); and
(j) introducing the negative value to cancel distortion using a non-programmable optic including at least one of: (a) a deformable mirror, (b) a chirped mirror, and (c) a grating.

2. The method of claim 1, wherein the optic is passive, reference phases are not introduced by a programmable SLM, and instead different amounts of linear chirp are introduced to subsequent amplified pulses using a pulse compressor.

3. The method of claim 1, further comprising deforming the optic which is the mirror by activating at least one piezoelectric actuator.

4. The method of claim 1, wherein the optic includes a deformable glass substrate having a thickness of at least 0.1 millimeters.

5. The method of claim 1, wherein the optic is a grating and varying the grating by a single adjustable parameter.

6. The method of claim 1, further comprising introducing different amounts of linear chirp to pulses as the reference phases using a built-in compressor by varying a spacing between a grating pair.

7. The method of claim 1, further comprising using a programmable controller to automatically calculate spectral phase information in a direct manner by finding $p_{max}(\omega)$ and using $\phi''(\omega_i)=f''(\omega_i,p_{max})$, where $\omega_i$ is the desired frequency and $p_{max}$ is the required parameter, and an unknown $\phi''(\omega_i)$ is directly obtained from a contour plot without any mathematical retrieval procedure from the matrix determination step.

8. The method of claim 1, further comprising using multiphoton intrapulse interference to assist with characterizing and compensating for distortions in the at least one pulse, and displaying a resulting collection of spectra as a function of chirp as a three-dimensional plot in which intensity is on a first axis, linear chirp is on a second axis and wavelength is on a third axis.

9. The method of claim 1, further comprising using the corrected at least one pulse in microscopy with the corrected at least one pulse having a duration less than 15 femtoseconds.

10. The method of claim 1, further comprising measuring the spectral phase distortion with a single laser pulse.

11. The method of claim 1, further comprising using programmable software instructions with multiphoton intrapulse interference phase scan procedures to automatically measure distortion of the pulse after the pulse has interacted with the non-programmable optic.

12. The method of claim 1, further comprising translating at least one dispersive optic to introduce the reference phases in the pulse.

13. The method of claim 1, further comprising bending the passive optic member, which includes a mirror, where the beam is spectrally dispersed to introduce the reference phases in the pulse.

14. The method of claim 1, further comprising relaying the pulse through a fiber, and measuring and correcting high-order phase distortions introduced by the fiber through software calculations without inversion or learning algorithm procedures.

15. The method of claim 1, further comprising:
introducing a spectral phase delay to introduce the reference phases;
scanning the optic to collect a phase scan by a programmable controller;
correcting the distortions at a point at which they are being measured; and
maintaining a distortion correcting condition of the optic without the need for electrical power.

16. The method of claim 1, further comprising using a programmable controller to automatically calculate spectral phase information in a direct manner by finding $p_{max}(\omega)$ and using $\Phi''(\omega_i)=f''(\omega_i,p_{max})$, where $f(\omega_i,p_{max})$ is the reference phase, $\omega_i$ is the desired frequency, $p_{max}$ is the adjustable parameter, and $\phi''(\omega_i)$ is the second derivative of the unknown phase distortion which is directly obtained from the matrix obtained from the resulting collection of spectra without the need for mathematical functions and retrieval procedures.

17. A laser system comprising:
a laser beam pulse;
a passive optic member operably introducing at least one reference phase in the pulse;
a spectrometer operably detecting harmonic frequency intensities of the pulse;
a controller operably determining a matrix of the detected harmonic frequency intensities versus the at least one reference phase;
the controller operably determining a maximum intensity in the matrix for each frequency of the pulse;
the controller operably assigning a value corresponding to each maximum intensity;
the controller operably determining a second derivative of a spectral phase from the maximum intensity values for each frequency; and
the controller operably calculating by double integration a spectral phase function of distortions in the pulse.

18. The system of claim 17, wherein the optic member is non-pixelated and has a single adjustable parameter.

19. The system of claim 17, further comprising a subsequent laser beam pulse having its distortion cancelled based at least in part on the controller's calculation, a distortion correcting condition of the passive optic member being maintained without the need for electrical power.

20. A computer program, stored in memory, the program comprising:
(a) a first set of instructions operably introducing laser beam pulse-reference phases;
(b) a second set of instructions operably determining a matrix of detected pulse-harmonic frequency intensities versus the pulse-reference phases;
(c) a third set of instructions operably determining a maximum intensity in the matrix for each pulse-frequency;
(d) a fourth set of instructions operably assigning a value corresponding to each maximum intensity;
(e) a fifth set of instructions operably determining a second derivative of a spectral phase from the maximum intensity values for each frequency in a direct manner;
(f) a sixth set of instructions operably calculating a double integral with respect to frequency in order to obtain a spectral phase function of pulse-distortions;
(g) a seventh set of instructions operably displaying three-dimensional data including a derivative of the phases, wavelength and intensity; and
(h) an eighth set of instructions operably causing physical movement of at least a portion of an optic to correct a pulse distortion.

21. The program of claim 20, further comprising another set of instructions operably canceling the distortion in a subsequent pulse by introducing a negative value of that calculated, and a further set of instructions using multiphoton intrapulse phase scan procedures to measure and correct for pulse distortions without a programmable pulse shaper.

22. The program of claim 20, further comprising another set of instructions operably automatically calculating spectral phase information in a direct manner by finding $p_{max}(\omega)$ and using $\phi''(\omega_i)=f''(\omega_i,p_{max})$, where $\omega_i$ is the desired frequency and $p_{max}$ is the required parameter, and an unknown $\phi''(\omega_i)$ is directly obtained from a contour plot without any mathematical retrieval procedure from the matrix determination instructions.

23. A method of using a laser system, the method comprising:
(a) emitting at least one laser beam pulse;
(b) introducing at least one reference phase in the at least one pulse;
(c) determining harmonic frequency intensities of the at least one pulse;
(d) determining a matrix of the detected harmonic frequency intensities versus the at least one reference phase;
(e) determining a maximum intensity value in the matrix for each frequency of the at least one pulse;
(f) determining a second derivative of a spectral phase from the maximum intensity values for each frequency;
(g) determining a double integral with respect to frequency in order to obtain a spectral phase function of distortions in the at least one pulse;
(h) shaping the at least one pulse by a nonadaptive optic including at least one of: (a) a mirror, and (b) a grating, and maintaining a desired pulse shaping condition of the optic without the need for electrical power; and
(i) using computer software instructions to automatically characterize distortion in the at least one pulse after it has been shaped by the nonadaptive optic.

24. The method of claim 23, further comprising causing physical movement of at least a portion of the optic to correct a pulse distortion.

25. The method of claim 24, further comprising carrying the at least one pulse through a fiber, and measuring high-order phase distortions introduced by the fiber.

26. The method of claim 25, further comprising deforming the nonadaptive optic which is the mirror by activating at least one piezoelectric actuator.

\* \* \* \* \*

UNITED STATES PATENT AND TRADEMARK OFFICE
CERTIFICATE OF CORRECTION

| | | |
|---|---|---|
| PATENT NO. | : 8,311,069 B2 | Page 1 of 1 |
| APPLICATION NO. | : 12/809481 | |
| DATED | : November 13, 2012 | |
| INVENTOR(S) | : Marcos Dantus, Vadim V. Lozovoy and Bingwei Wu | |

It is certified that error appears in the above-identified patent and that said Letters Patent is hereby corrected as shown below:

In the Specifications:

Column 3, line 28, "cross sectional" should be --cross-sectional--.

Column 7, line 13, "phase," should be --phase.--.

Column 7, line 58, "can obtained" should be --can be obtained--.

Column 8, line 47, "GDD" should be --GVD--.

Column 10, line 7, "linear chip" should be --linear chirp--.

Column 10, lines 21-22, after "controller" insert --.--.

Column 10, line 47, "linear chip" should be --linear chirp--.

Column 10, line 65, "Deep Seam™" should be --Deep Sea™--.

Column 12, line 26, "dating 119" should be --grating 119--.

Column 12, line 51, "references phases" should be --reference phases--.

Column 14, line 50, "in conformed" should be --or conformed--.

In the Claims:

Column 18, line 55, Claim 25, "claim 24" should be --claim 23--.

Column 18, line 58, Claim 26, "claim 25" should be --claim 23--.

Signed and Sealed this
Fourth Day of June, 2013

Teresa Stanek Rea
*Acting Director of the United States Patent and Trademark Office*

UNITED STATES PATENT AND TRADEMARK OFFICE
CERTIFICATE OF CORRECTION

Page 1 of 1

PATENT NO. : 8,311,069 B2
APPLICATION NO. : 12/809481
DATED : November 13, 2012
INVENTOR(S) : Marcos Dantus, Vadim V. Lozovoy and Bingwei Wu It is certified that error appears in the above-identified patent and that said Letters Patent is hereby corrected as shown below:

In the Specification:

STATEMENT OF GOVERNMENT INTEREST

Column 1, Line 12, delete "A portion of this invention was made with U.S. Government support under Major Research Instrumentation grant CHE-0421047 awarded by the National Science Foundation. The U.S. Government may have certain rights in this invention." and insert therefor:

--This invention was made with government support under CHE0421047 awarded by the National Science Foundation. The government has certain rights in the invention.--

Signed and Sealed this
Twenty-second Day of December, 2015

Michelle K. Lee
*Director of the United States Patent and Trademark Office*